US010965735B2

(12) United States Patent
Olive

(10) Patent No.: US 10,965,735 B2
(45) Date of Patent: *Mar. 30, 2021

(54) METHODS AND SYSTEMS FOR FACILITATING INFORMATION AND EXPERTISE DISTRIBUTION VIA A COMMUNICATIONS NETWORK

(71) Applicant: Bentley J. Olive, Apex, NC (US)

(72) Inventor: Bentley J. Olive, Apex, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/565,440

(22) Filed: Sep. 9, 2019

(65) Prior Publication Data

US 2020/0007614 A1 Jan. 2, 2020

Related U.S. Application Data

(63) Continuation-in-part of application No. 15/432,882, filed on Feb. 14, 2017, now Pat. No. 10,412,153.

(60) Provisional application No. 62/295,137, filed on Feb. 14, 2016.

(51) Int. Cl.
*H04L 29/08* (2006.01)
*G06Q 40/02* (2012.01)

(52) U.S. Cl.
CPC .......... *H04L 67/10* (2013.01); *G06Q 40/025* (2013.01); *H04L 67/141* (2013.01); *H04L 67/18* (2013.01)

(58) Field of Classification Search
CPC ....... H04L 67/10; H04L 67/141; H04L 67/18; H04L 67/305; G06Q 40/025; G06Q 30/00
See application file for complete search history.

(56) References Cited

U.S. PATENT DOCUMENTS

| | | | |
|---|---|---|---|
| 5,999,826 A | * | 12/1999 | Whinnett ................ H01Q 3/26 455/561 |
| 6,064,978 A | | 5/2000 | Gardner et al. |
| 6,697,849 B1 | | 2/2004 | Carlson |
| 7,013,303 B2 | | 3/2006 | Faybishenko et al. |
| 7,209,895 B2 | | 4/2007 | Kundtz et al. |
| 8,281,033 B1 | | 10/2012 | Riordan et al. |
| 8,380,709 B1 | | 2/2013 | Diller et al. |
| 8,396,054 B2 | | 3/2013 | Altberg et al. |
| 8,438,386 B2 | | 5/2013 | Hegli et al. |

(Continued)

OTHER PUBLICATIONS

Response to Office Action dated Jul. 26, 2018 for related U.S. Appl. No. 15/432,882.

(Continued)

*Primary Examiner* — Michael Won

(57) ABSTRACT

Disclosed herein are methods and systems for facilitating information and expertise distribution via a communication network. A method at a first computing device may include receiving a request for information from a second computing device, determining at least one third computing device based on an analysis of the request for information, communicating the request for information to the determined at least one third computing device, receiving a response corresponding to the request for information from the determined at least one third computing device, adjusting a credit level of a user associated with the determined at least one third computing device based on the received response, and communicating the response to the second computing device. The credit level of the user may indicate one or more credits earned by the user.

19 Claims, 29 Drawing Sheets

(56) References Cited

U.S. PATENT DOCUMENTS

| | | |
|---|---|---|
| 8,521,688 B1 | 8/2013 | Belwadi et al. |
| 9,779,144 B1* | 10/2017 | Hampson ................. G06F 16/93 |
| 10,229,164 B1* | 3/2019 | Hampson ............ G06F 16/9535 |
| 10,700,964 B1* | 6/2020 | Yuan ..................... H04L 47/283 |
| 2002/0065922 A1 | 5/2002 | Shastri |
| 2002/0083179 A1 | 6/2002 | Shaw et al. |
| 2003/0079056 A1 | 4/2003 | Taylor |
| 2006/0184617 A1 | 8/2006 | Nicholas et al. |
| 2007/0250383 A1 | 10/2007 | Tollinger et al. |
| 2008/0058999 A1 | 3/2008 | Khodorkovsky et al. |
| 2008/0255977 A1 | 10/2008 | Altberg et al. |
| 2009/0276419 A1* | 11/2009 | Jones .................. G06F 16/3322 |
| 2010/0332615 A1 | 12/2010 | Short et al. |
| 2011/0082881 A1 | 4/2011 | Chunilal |
| 2011/0185401 A1* | 7/2011 | Bak ..................... G06F 16/9024 726/5 |
| 2012/0207098 A1 | 8/2012 | Cooley et al. |
| 2013/0279326 A1 | 10/2013 | Dunne et al. |
| 2014/0122574 A1 | 5/2014 | Lee et al. |
| 2014/0244712 A1 | 8/2014 | Walters et al. |
| 2014/0372529 A1 | 12/2014 | Marcucci et al. |
| 2015/0100660 A1* | 4/2015 | Flack .................. H04L 67/1095 709/213 |
| 2015/0254248 A1 | 9/2015 | Burns et al. |
| 2016/0094445 A1 | 3/2016 | Sella |
| 2016/0170998 A1* | 6/2016 | Frank .................... H04W 4/021 707/748 |
| 2016/0179955 A1* | 6/2016 | Delli Santi ............ G06Q 30/00 707/709 |
| 2016/0255139 A1 | 9/2016 | Rathod |
| 2017/0078186 A1 | 3/2017 | Thyni et al. |
| 2017/0200342 A1 | 7/2017 | Meyerhofer et al. |
| 2017/0237806 A1 | 8/2017 | Olive |
| 2018/0139606 A1 | 5/2018 | Green et al. |
| 2018/0182001 A1* | 6/2018 | Ghoshal ................. G06Q 50/01 |
| 2018/0185759 A1 | 7/2018 | Torres et al. |
| 2018/0203934 A1* | 7/2018 | Hampson ........... G06Q 30/0264 |

OTHER PUBLICATIONS

Response to Office Action dated Jun. 14, 2019 for related U.S. Appl. No. 15/432,882.

Response to Office Action dated Feb. 5, 2019 for related U.S. Appl. No. 15/432,882.

Notice of Allowance dated Jul. 23, 2019 for related U.S. Appl. No. 15/432,882.

Office Action dated Jul. 16, 2018 for related U.S. Appl. No. 15/432,882.

Office Action dated May 2, 2019 for related U.S. Appl. No. 15/432,882.

Office Action dated Oct. 5, 2018 for related U.S. Appl. No. 15/432,882.

* cited by examiner

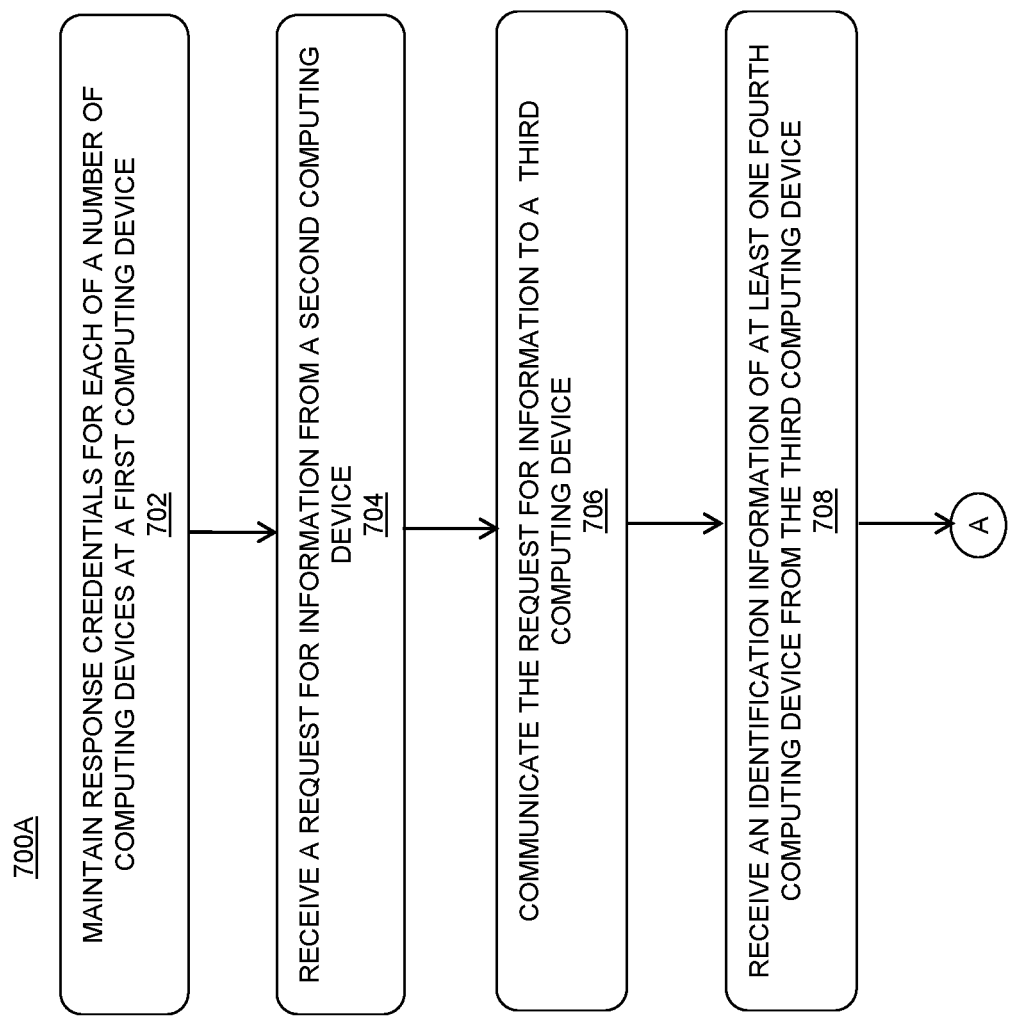

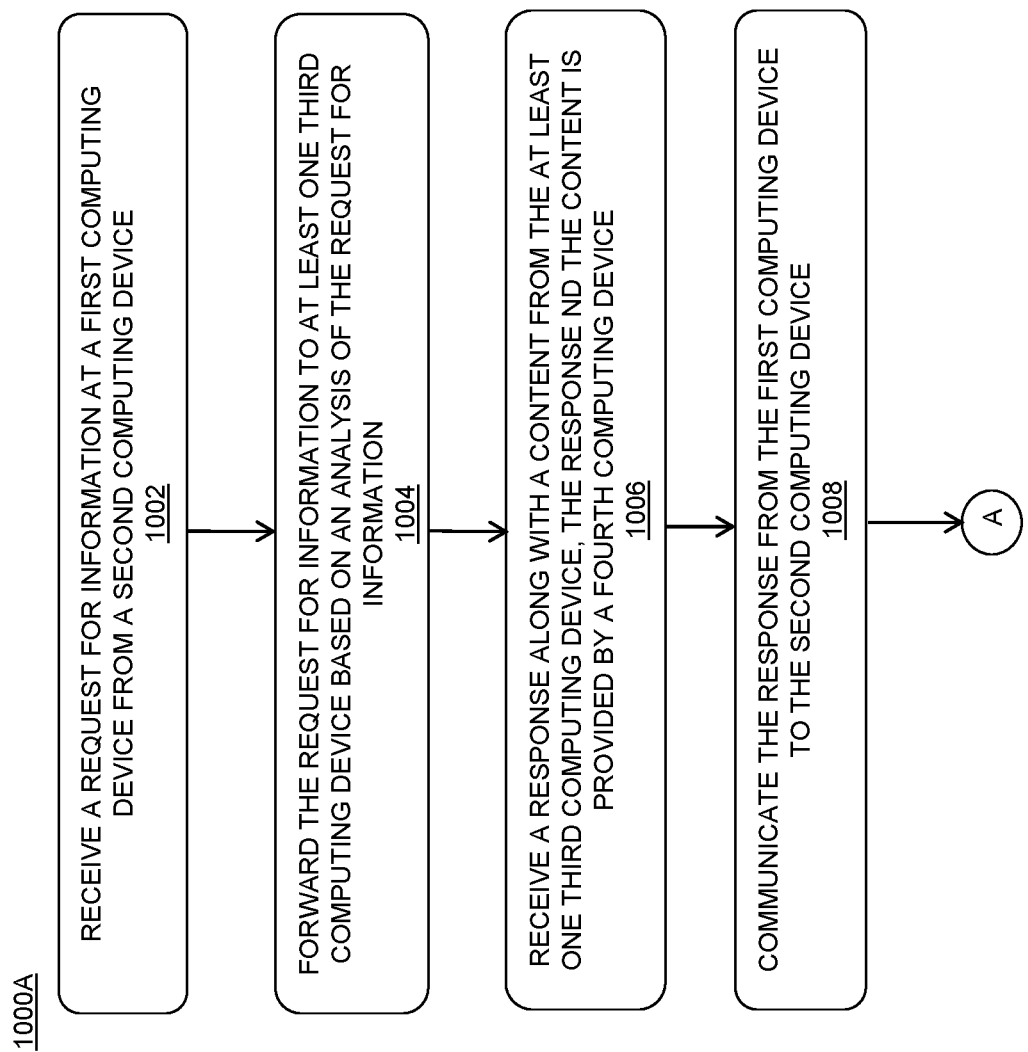

METHODS AND SYSTEMS FOR FACILITATING INFORMATION AND EXPERTISE DISTRIBUTION VIA A COMMUNICATIONS NETWORK

CROSS REFERENCE TO RELATED APPLICATIONS

This continuation-in-part patent application claims priority to U.S. Non-Provisional patent application Ser. No. 15/432,882, filed on Feb. 14, 2017, and titled METHODS AND SYSTEMS FOR FACILITATING INFORMATION AND EXPERTISE DISTRIBUTION VIA A COMMUNICATIONS NETWORK (now U.S. Pat. No. 10,412,153), which claims priority to U.S. Provisional Patent Application No. 62/295,137, filed on Feb. 14, 2016, and titled METHODS AND SYSTEMS FOR FACILITATING INFORMATION AND EXPERTISE DISTRIBUTION VIA A COMMUNICATIONS NETWORK; the contents of which are hereby incorporated by reference herein in their entireties.

TECHNICAL FIELD

The present disclosure generally relates to network communications. Particularly, the present subject matter relates to methods and systems for facilitating information and expertise distribution via a communication network.

BACKGROUND

Use of the Internet and other communication networks to share information has increased dramatically over time. As Internet publishing and communication tools improved, more content is available and shared online. In addition, as more content is published, more services emerge to help people and businesses to find and consume that content. As the amount of content increased, search engines such as the GOOGLE® search engine available from Google Inc. and the YAHOO!® search engine available from Yahoo! Inc. became available to make it easier for users to seek, search, and consume content.

Currently, there exist many techniques for sharing or distributing information via the Internet or other communications networks. More recently, content may be shared and distributed by use of tools such as website links, text messaging, and email. In addition, social networking websites such as FACEBOOK® social network service available from Facebook, Inc., TWITTER® social network service available from Twitter, Inc., and INSTAGRAM® social network service available from Instagram, LLC have made it easier for people to share content. Further, for example, various websites can provide content via websites. Moreover, there are search engines for helping users to find websites as per his/her interests. In addition, there are many existing platforms such as blogs, webcasts, podcasts, and the like to allow the user to publish content via the Internet.

The existing techniques for sharing information suffer from multiple limitations. For example, the existing information sharing techniques are very static and do not allow a user to easily and quickly request information, knowledge, and expertise of others via a communications network. Therefore, there is a continuing need for improved techniques and systems for facilitating information and expertise distribution.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are various embodiments of the present disclosure providing methods, systems, and computer program products for facilitating information and expertise via a communications network.

Disclosed herein are methods and systems for facilitating information and expertise distribution via a communication network. According to an aspect, a method at a first computing device among multiple computing devices may include receiving a request for information from a second computing device. The method also include determining at least one third computing device based on an analysis of the request for information. Further, the method includes communicating the request for information to the determined at least one third computing device. The method also includes receiving a response corresponding to the request for information from the determined at least one third computing device. Further, the method includes adjusting a credit level of a user associated with the determined at least one third computing device based on the received response. The credit level of the user may indicate one or more credits earned by the user. The method also includes communicating the response to the second computing device.

According to another aspect, a method includes steps implemented at a first computing device among multiple computing devices. The method includes maintaining response credentials for each of the plurality of computing devices. Further, the method includes receiving, from a second computing device of the plurality of computing devices, a request for information. The method also includes communicating, to a third computing device of the plurality of computing devices, the request for information. Further, the method includes receiving, from the third computing device, an identification information of at least one fourth computing device of the plurality devices for communication of the request for information. The method also includes communicating, to the at least one fourth computing device, the request for information.

According to another aspect, a method may be implemented at a first computing device. The method includes maintaining a ranking associated with each of the plurality of users based on a plurality of communication response credentials. The method also includes receiving, from a second computing device, a communication including a request for information. Further, the method includes determining one or more of the plurality of users to send the request for information based on the communication response credentials. The method also includes communicating the request for information to at least one third computing device associated with the one or more of the plurality of users.

According to another aspect, a method may be implemented at a first computing device. The method includes receiving a request for information from a second computing device. The method also includes associating a work claim ticket with the request for information. Further, the method includes communicating the request for information to a plurality of third computing devices. The method also includes receiving a request for the work claim ticket from at least one third computing device of the plurality of third computing devices. Further, the method includes managing a credit level associated with the at least one third computing device based on a response corresponding to the request for information from the at least one third computing device.

According to another aspect, a method includes receiving, from a second computing device, a request for information at a first computing device. The method also includes forwarding, to at least one third computing device, the request for information based on an analysis of the request for information from the first computing device. Further, the method includes receiving, from the at least one third computing device, a response to the request for information and content provided by a fourth computing device at the first computing device. The method also includes communicating, to the second computing device, the response and content from the first computing device. Further, the method includes receiving, from the second computing device, a feedback to at least one of the response and the content at the first computing device. The method also includes receiving, from a user of the fourth computing device, a credit for a user of the third computing device based on the feedback received from the first computing device.

According to another aspect, a method may be implemented at a first computing device. The method includes receiving requests for information from a plurality of second computing devices. Further, the method includes associating the received requests based on the information. The method also includes generating a joined request for information based on the received requests for information. Further, the method includes determining at least one third computing device based on the received requests for information. The method also includes communicating the joined request for information to the determined at least one third computing device. Further, the method includes receiving a response corresponding to the joined request for information from the determined at least one third computing device. The method also includes communicating the response to the second computing devices.

According to another aspect, a method may be implemented by a first computing device. The method includes receiving a communication including information associated with an input by a user at a second computing device. Further, the method includes determining at least one third computing device to provide a response to the input based on the input, a credit level of one or more users associated with the at least one third computing device, and a subject associated with the information. The method also includes communicating the information associated with the input to the determined at least one third computing device. Further, the method includes receiving, from the at least one third computing device, a response corresponding to the information. The method also includes communicating the response to the second computing device.

According to another aspect, a method may be implemented at a first computing device. The method includes receiving, from a second computing device associated with a user, a request for establishing a communication connection for information. The method also includes determining at least one third computing device based on analysis of the request and a credit level of one or more users associated with the at least one third computing device. Further, the method includes establishing a communication connection to the at least one third computing device. Further, the method includes receiving analysis data associated with a communication connection between the user of the second computing device and the one or more users. The method also includes adjusting at least one credit level of the one or more users based on the received analysis data.

According to another aspect, a method may be implemented at a first computing device. The method includes receiving, from a second computing device associated with a user, a request for information associated with a specified geographic area. Further, the method includes determining at least one third computing device based on the request, the specified geographic area, and a credit level of one or more users associated with the at least one third computing device. The method also includes communicating the request to the at least one third computing device. Further, the method includes receiving a response corresponding to the request for information from the determined at least one third computing device. The method also includes communicating the response to the second computing device.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the present disclosure is not limited to the specific methods and instrumentalities disclosed. In the drawings:

FIGS. 12A-12C illustrate a flowchart of an example method for finding a computing device for directing a request for information based on an analysis of the request for information in a network, in accordance with an embodiment of the present disclosure;

FIGS. 15A and 15B illustrate a flowchart of another example method for enabling sharing of information among multiple computing devices in a network, in accordance with embodiments of the present disclosure;

DETAILED DESCRIPTION

Figure 1:
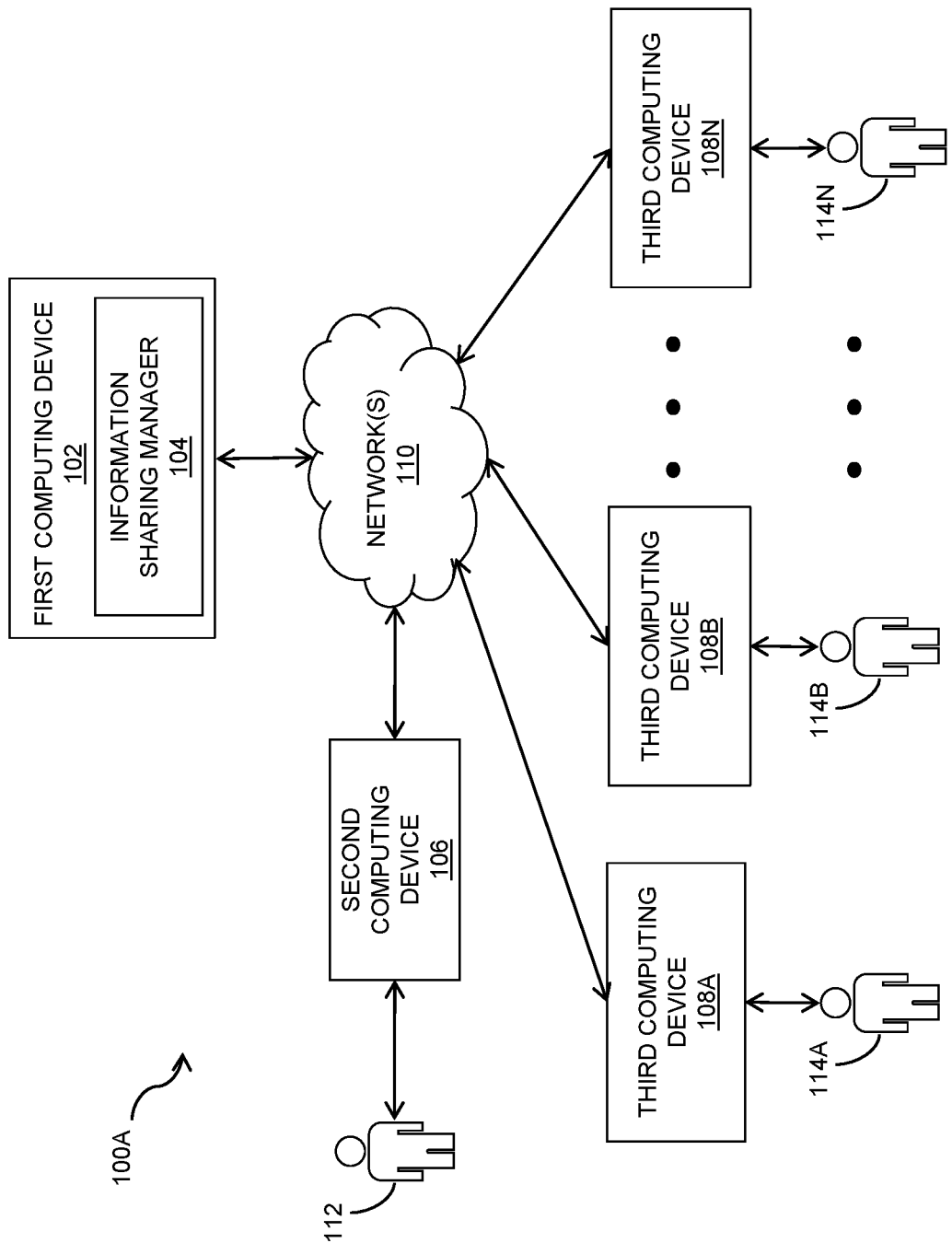
FIG. 1 is a schematic diagram of an example system within which various components may function in accordance with embodiments of the present disclosure.

The present disclosure is described with specificity to meet statutory requirements. However, the description itself is not intended to limit the scope of this patent. Rather, the inventor has contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

The functional units described in this specification have been labeled as systems or devices. A device or a system may be implemented in programmable hardware devices such as processors, digital signal processors, central processing units, field programmable gate arrays, programmable array logic, programmable logic devices, cloud processing systems, or the like. The devices may also be implemented in software for execution by various types of processors. An identified device may include executable code and may, for instance, comprise one or more physical or logical blocks of computer instructions, which may, for instance, be organized as an object, procedure, function, or other construct. Nevertheless, the executable of an identified device need not be physically located together, but may comprise disparate instructions stored in different locations which, when joined logically together, comprise the device and achieve the stated purpose of the device.

Indeed, an executable code of a device could be a single instruction, or many instructions, and may even be distributed over several different code segments, among different applications, and across several memory devices. Similarly, operational data may be identified and illustrated herein within the device, and may be embodied in any suitable form and organized within any suitable type of data structure. The operational data may be collected as a single data set, or may be distributed over different locations including over different storage devices, and may exist, at least partially, as electronic signals on a system or network. The described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

Devices and systems disclosed herein may be implemented by software, hardware, firmware, or a combination thereof. A device or a system may include or may be implemented by software or computer programs capable of performing the various heretofore-disclosed functions. For example, exemplary embodiments are intended to cover all software or computer programs capable of enabling one or more processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, and the like) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

In accordance with embodiments disclosed herein, computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

As referred to herein, the term "computing device" should be broadly construed. It can include any type of computing device such as, but not limited to, a desktop computer, a laptop computer, a tablet computer, a smartphone, a server, and the like. Other examples include a cell phone, a pager, a personal digital assistant (PDA, e.g., with GPRS NIC), a computer with a smart phone client, a television, a wireless communication-enabled photo frame, or the like. A typical mobile computing device may be a wireless data access-enabled device (e.g., an iPHONE® smart phone, a BLACKBERRY® smart phone, a NEXUS ONE™ smart phone, an iPAD® device, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks, or other client applications. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on a mobile device, the examples may similarly be implemented on any suitable computing device.

Some of the disclosed embodiments include or otherwise involve data transfer over a communications network, such as communicating various inputs or files over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. The network may include multiple networks or sub networks, each of which may include, for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice data communications. In one implementation, the network includes a cellular telephone network configured to enable exchange of text or SMS messages.

Examples of a network may also include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth.

As referred to herein, an "interface" is generally a system by which users interact with a computing device. An interface can include an input for allowing users to manipulate a computing device, and can include an output for allowing the system to present information and/or data, indicate the effects of the user's manipulation, etc. An example of an interface on a computing device (e.g., a mobile device) includes a graphical user interface (GUI) that allows users to interact with programs in more ways than typing. A GUI typically can offer display objects, and visual indicators, as opposed to text-based interfaces, typed command labels or text navigation to represent information and actions available to a user. For example, an interface can be a display window or display object, which is selectable by a user of a mobile device for interaction. The display object can be displayed on a display screen of a mobile device and can be selected by and interacted with by a user using the interface. In an example, the display of the mobile device can be a touch screen, which can display the display icon. The user can depress the area of the display screen at which the display icon is displayed for selecting the display icon. In another example, the user can use any other suitable interface of a mobile device, such as a keypad, to select the display icon or display object. For example, the user can use a track ball or arrow keys for moving a cursor to highlight and select the display object.

Operating environments in which embodiments of the present disclosure may be implemented are also well known. In a representative embodiment, a computing device, such as a mobile device, is connectable (for example, via WAP) to a transmission functionality that varies depending on implementation. Thus, for example, where the operating environment is a wide area wireless network (e.g., a 2.5G network, a 3G network, or a 4G network), the transmission functionality comprises one or more components such as a mobile switching center (MSC) (an enhanced ISDN switch that is responsible for call handling of mobile subscribers), a visitor location register (VLR) (an intelligent database that stores on a temporary basis data required to handle calls set up or received by mobile devices registered with the VLR), a home location register (HLR) (an intelligent database responsible for management of each subscriber's records), one or more base stations (which provide radio coverage with a cell), a base station controller (BSC) (a switch that acts as a local concentrator of traffic and provides local switching to effect handover between base stations), and a packet control unit (PCU) (a device that separates data traffic coming from a mobile device). The HLR also controls certain services associated with incoming calls. Of course, the present disclosure may be implemented in other and next-generation mobile networks and devices as well. The mobile device is the physical equipment used by the end user, typically a subscriber to the wireless network. Typically, a mobile device is a 2.5G-compliant device, a 3G-compliant device, or a 4G-compliant device that includes a subscriber identity module (SIM), which is a smart card that carries subscriber-specific information, mobile equipment (e.g., radio and associated signal processing devices), a user interface (or a man-machine interface (MIMI)), and one or more interfaces to external devices (e.g., computers, PDAs, and the like). The mobile device may also include a memory or data store.

In another exemplary operating environment, the computing devices described herein may communicate with each other in any suitable wired or wireless communications network. For example, the computing devices may include suitable I/O communications hardware, software, and/or firmware for communicating with each other via a wireless communications network such as BLUETOOTH® technology or IEEE 802.11 technology. The computing devices may also be suitably equipped for wired communications with one another via, for example, a telephone line.

In various embodiments of the present disclosure, definitions of one or more terms that will be used in the document are provided below.

As used herein, a "request processing module" refers to a single or multiple modules or devices including a software, hardware, firmware or combination of these that is configured to process and analyze a number of request for information in a network. Example functions of a request processing module are described in further detail herein.

As used herein, a "communication module" refers to a single or multiple modules or devices including hardware, software, firmware, or combination thereof that can be configured to transmit and receive messages or information such as, requests for information and responses to the request for information to and from a number of computing devices in a communications network.

As used herein, a "credit level managing module" refers to a single or multiple modules or devices including hardware, software, firmware, or combination thereof that can be configured to assign or adjust a credit level of users or computing devices based on responses from the users. A credit level of a user may indicate one or more credits or points earned by the user. Example functions of a credit level managing module are described in further detail herein. It is noted that the terms "credit level" and "score" as referred to herein can have the same or similar meaning and are sometimes used interchangeably herein.

As used herein, a "response managing module" refers to a single or multiple modules or devices including hardware, software, firmware, or combination thereof that can be configured to maintain response credentials such as response identifier (ID), response, and so forth for computing devices. Example functions of a response managing module are described in further detail herein.

As used herein, a "ranking managing module" refers to a single or multiple modules or devices including hardware, software, firmware, or combination thereof that can be configured to maintain a ranking for each of the users associated with a number of computing devices based on a number of communication response credentials. A ranking of a user may be where a responding user ranks among other responding users. Example functions of a ranking managing module are described in further detail herein.

The presently disclosed subject matter is now described in more detail. For example, FIG. 1 illustrates a schematic diagram of an example system 100A within which various components may function in accordance with embodiments of the present disclosure. Referring to FIG. 1, the system 100A includes a number of computing devices, such as a first computing device 102, a second computing device 106 associated with a second user 112, and a number of third computing devices 108A-108N associated with a number of third users 114A-114N. More particularly, the computing devices 102, 106, and 108A-108N may be configured to communicate with each other via one or more communications networks 110. Although a limited number of computing devices are shown in FIG. 1, it should be understood that there can be any number of computing devices that can communicate with each other via the network(s) 110. For example, there are 1-N computing devices 114, and N may be any suitable number of computing devices.

As an example, a computing device may be configured to communicate text, images, video, or other data to another computing device as will be understood by those of skill in the art. Also, as will be understood by those of skill in the art, a user may use the user interface of his or her associated computing device for interacting with the computing device. For example, an application may reside on a computing device and the associated user may be able to interact with a user interface presented by the application as will be understood by those of skill in the art.

It is noted that each user shown in FIG. 1 may have specialized expertise, information, and knowledge. It is a function of the system 100A to facilitate and promote the networking of users 112 and 114A-114N for the sharing and exchange of such information, knowledge, and expertise. More particularly, it is a function of the system 100A to serve user requests for other users' information, knowledge, and expertise, and to communicate the requests to other selected users. In addition, it is a function of the system 100A to promote responses from the other users to requests. Further, the system 100A can provide for the receipt of others' specialized information, knowledge, and expertise of others in a timely manner while also promoting the others to provide such specialized information, knowledge, and expertise. Details about the implementation of these and other functions may be implemented by the system 100A are described herein. Also, other example systems and methods for implementing these and other functions are described herein.

The first computing device 102 may be any suitable computing device configured to communicate with the network 110 and communicate with other devices, such as the second computing device 106 and the third computing devices 108A-108N, connected to the network 110. The network 110 may be a wired network, a wireless network or combination thereof. Examples of the first computing device 102, second computing device 106, and the third computing devices 108A-108N may include, such as, but are not limited to, a smartphone, a desktop computer, a laptop computer, a smart phone, a personal digital assistant (PDA), a tablet computer, a smart television, a television, and the like.

In embodiments, the first computing device 102 may be a server configured to enable other computing devices 106 and 108A-108N to interact with each other as described herein. Also, it should be understood that the functionality of the first computing device 102 may be implemented by one or more computing devices, such as multiple servers either distributed or operating together in a server farm. Further, the second computing device 106 and the third computing device 108A-108N may include an associated display device such as, a screen for displaying information. The second user 112 may access a browsing application such as, but not limited to, GOOGLE® Chrome, Internet Explorer, Mozilla Firefox, and so forth on the second computing device 106. Similarly, the third computing devices 108A-108N may include a browsing application. In another example, the computing device 102 may be an application server configured to manage and interact with applications residing on computing devices 106 and 108A-108N.

In an example use, the second user 112 may request information from other computing devices 102, 108A-108N in the network 110 by using the second computing device 106. For example, a user interface of the second computing device 106 may present an interface for the second user 112 to enter information for communicating a request to the first computing device 102. The first computing device 102 may select or determine one or more of the third computing devices 108A-108N to send the request based on an analysis of the request. The second user 112 may enter one or more inputs into user interface of the second computing device 106.

Figure 2:
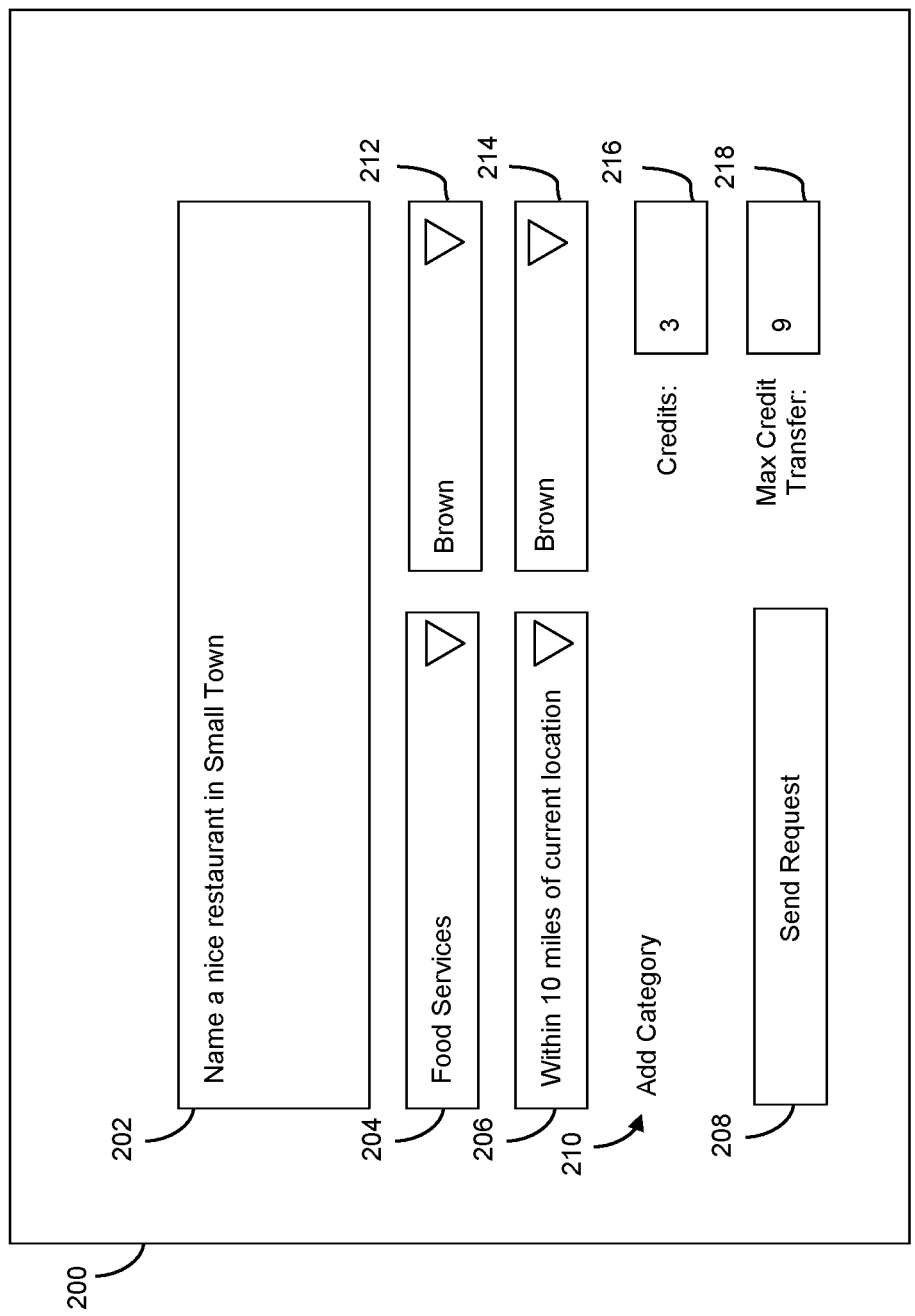
FIG. 2 is a screen display of an example display in accordance with embodiments of the present disclosure.

FIG. 2 illustrates a screen display of an example display 200 in accordance with embodiments of the present disclosure. The display 200 may be the display of the computing device 106 shown in FIG. 1, or any other suitable computing device. Referring to FIG. 2, the display 200 may present various display portions where a user can be presented with information and/or the user may enter information. For example, a text box 202 may be displayed and may be operated by an application residing on the computing device to receive entry of text by the user as will be understood by those of skill in the art. The entered text may be a part of or the entirety of a request sent to one or more other computing devices. In this example, the entered text is a request for the name of a nice restaurant in "Small Town," a town name made up for purpose of this example.

With continuing reference to FIG. 2, the display 200 may display dropdown menus 204 and 206 with which a user may interact for selecting categories for further specifying a request. Although, only two dropdown menus are shown in this example, it should be understood that any number of dropdown menus and/or other interactive elements may be utilized for selecting categories or otherwise specifying a request. In this example, a user may add another category by selection of the text "Add Category" 210.

In the example of FIG. 2, the user selected the categories "Food Services" and "Within 10 miles of current location". By selection of the "Food Services" category, the request may be directed to other users determined to have an affinity to requests in this category. In an example, these may be users who rank highly for responses to requests in the food services category. Also, by selection of the "Within 10 miles of current location" category, the request may be limited to or limited to other users determined to have an affinity to requests originating from within 10 miles of the user or computing device's current location (which may be determined by, for example, a GPS receiver of the computing device).

Subsequent to entry of text in text box 202 and selection of categories, a user may select button 208 for instructing the computing device application to communicate the request. For example, the request may be communicated to the computing device 102 shown in FIG. 1 via the network(s) 110. In this example, the communicated request may include the text entered in text box 202, the category of "Food Services," and the category of "Within 10 miles of current location". The request may also include an identifier of the user, location of the computing device, and/or other information.

FIG. 2 provides a particular example of the creation of a request by a user by use of a computing device having a display. It should be understood that a computing device may be used in any other suitable way for entering the same or other information for a request in accordance with embodiments of the present disclosure.

With reference again to FIG. 1, the first computing device 102 may be configured to receive a request from the second computing device 106. For example, the first computing device 102 may include a communications module configured to receive the request generated in the example of FIG. 2. Further, the first computing device 102 may include an information sharing manager 104 configured to receive and analyze the request from the second computing device 106. The information sharing manager 104 may analyze the request and determine one or more of the third computing devices 108A-108N to send the request based on the analysis. Using the example of FIG. 2, the information sharing manager 104 may direct the request to users present at a location within 10 miles of the second computing device 106, or otherwise associated with or having an affinity to the geographic area within the 10 miles of the second computing device 106. The recipient computing device may also be those that have an affinity to the category "Food Services". In other words, recipient computing devices may be those having some affinity or some other association with the defined geographic area and food services. Further details and examples for determining recipient computing device(s) based on a request are described herein.

In an example, the request may be sent to all the third computing devices 108A-108N via the network(s) 110. In other examples, the request for information may be sent to only one or some of the third computing devices 108A-108N. In some embodiments, the first computing device 102 determines the one or more of the third computing devices 108A-108N based on one or more determining factors such as, but not limited to, a geographic location of the second computing device 106 or/and of the one or more of the third computing devices 108A-108N, an interest of the third users 114, a rating of the third users 114A-114N or of the computing devices 108A-108N, educational background of the third users 114A-114N, a time when the request for information is received, an availability of the on or more third users 114A-114N associated with the one or more of the third computing devices 108A-108N, or other criteria. In another example, the computing device 102 may forward the requests related to programming languages to a software engineer.

In embodiments of the present disclosure, the information sharing manager 104 may be configured to associate a work claim ticket with the request for information. The work claim ticket may be an identifier used for identifying the request for information. The work claim ticket may also include details of the request for information such as, but not limited to, upper limit for responding to the request, credits for responding to the request, and so forth.

In embodiments of the present disclosure, the request may be communicated to the determined third computing devices 108A-108N automatically by the first computing device 102, and the information sharing manager 104 may determine recipient computing devices based on an analysis of the request. Alternatively, the first computing device 102 may display a list including the determined one or more of the third computing devices 108A-108N on a display of the second computing device 106. Thereafter, the user 112 can choose to whom he/she wants the request to be directed. Based on the selection of the third computing devices 108A-108N by the second user 112 received from the second computing device 106, the first computing device 102 may communicate the request for information to the selected third computing device(s) 114.

The first computing device 102 may be configured to communicate or forward the request for information to the determined one or more of the third computing devices 108A-108N. The one or more of the third computing device 108A-108N may receive the request for processing and may generate a response to the request. The request may be suitably presented to a user of a recipient computing device 108 via a user interface, such as a display.

Figure 3:
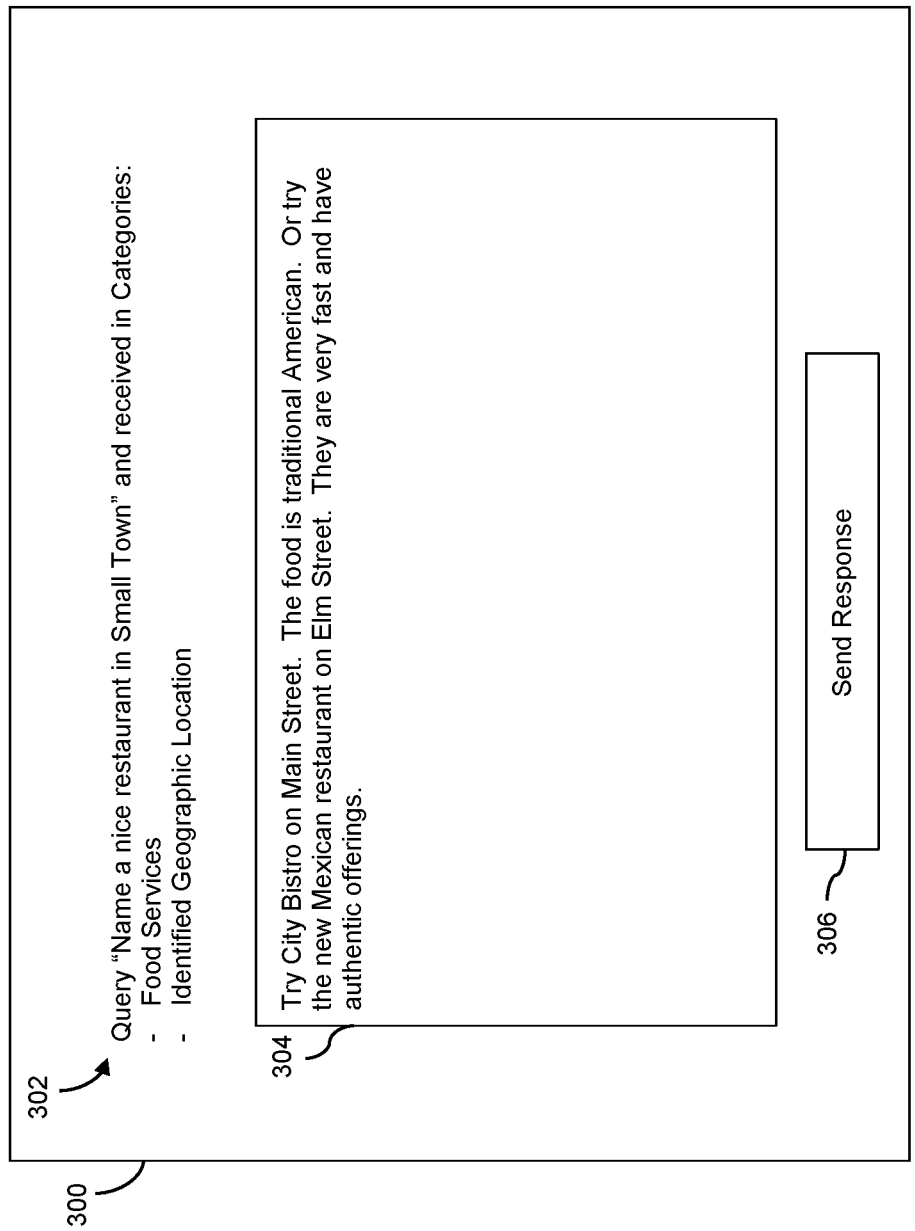
FIG. 3 is a screen display of an example display in accordance with embodiments of the present disclosure.

FIG. 3 illustrates a screen display of an example display 300 in accordance with embodiments of the present disclosure. The display 300 may be the display of a recipient computing device, such as one of the third computing devices 108A-108N shown in FIG. 1, or any other suitable computing device. This example is a continuation of the example of FIG. 2. Referring to FIG. 3, the display 300 may present various display portions where a user can be presented with information and/or the user may enter information. Reference number 302 indicates a display portion including text about the example request of FIG. 2. The text in portion 302 shows the text and categories of the request. Text box 304 provides an area for the user to type a response to the request as shown. It should be understood that information about the request may alternatively be presented in any other suitable way. Also, it should be understood that the user may alternatively input the response in any other suitable way. After entry of the response, the user may interact with the computing device to select the button 306 for instructing the computing device to communicate the response to the computing device 102 via the network(s) 110. In this example, the response may include the text entered in text box 304. The response may also include an identifier for the user or the user's computing device and any other information as described herein. The response may alternatively be entered via any suitable technique as will be understood by those of skill in the art.

The first computing device 102 may receive one or more responses from the recipient computing device(s) 108. The information sharing manager 104 may suitably process the response(s) and control communication of all or a portion of the response(s) to the second computing device 106. For example, the first computing device 106 may receive the response and present it to the user 112. In the example of FIGS. 2 and 3, a display of the second computing device 106 may display the text entered in the text box 304 of FIG. 3.

In accordance with embodiments of the present disclosure, credit level information and other information may be stored for each user. For example, credit level information may be stored and maintained in a database managed and operated by the first computing device 102 shown in FIG. 1. The maintenance and use of credit level information in accordance with embodiments of the present disclosure can provide incentive for users to respond to requests and thus promote the exchange information, knowledge, and expertise. Users may increase his or her credit level by responding to requests. In one example, the information sharing manager 104 can increase the credit level of a user when the user responds to a request. In another example, a requester can transfer his or her credits to a responder to thereby increase the credit level of the responder. In another example, a user may purchase credits that may be used to transfer to responders in exchange for their responses.

A credit level of a prospective responder may be indicative of the responder's timeliness of responding, quality of responses, and/or the like. For example, a prospective responder may have a high credit level, and this can indicate that the responder is better than others at responding to requests having a lower credit level. Responders may have a credit level assigned to them generally for his or her quality and timeliness of responses. In addition or alternatively, a credit level may be assigned to the responder in one or more categories. For example, a responder may have high credit level in the "Financial Advising" category. In this example, it may be presumed that this responder will be good at responding to requests identifying the "Financial Advising" category.

In embodiments, prospective responders may be ranked with respect to one another based on assigned credit levels. Responders may be generally ranked among each other based on their credit levels. In addition or alternatively, responders may be ranked in individual categories based on their credit levels in that category. The idea is that a responder may earn a high credit level by being responsive to other requests and by providing high quality responses. For example, a responder may have a history of providing timely and high quality responses, and as a result the user has received credits from other users and/or the information sharing manager. The receipt of credits can increase the user's credit level.

In an example, credit levels may be used for identifying responders who have achieved particular levels of achievement in responding to requests. A particular level ranges can be associated with a named achievement level group. For example, the credit level range of 0-99 for a responder in the "Financial Advising" category, and this credit level range can place the responder in a "White" achievement level group. The credit level range of 100-199 can be the "Green" achievement level group, the credit level range of 200-299 can be the "Brown" achievement level group, and the credit level range of 300 and higher can be the "Black" achievement level group. This color assignment for achievements is similar to achievement levels assigned in many martial arts.

In an example use of credit levels, a requester may indicate in his or her request that the request should only be sent to responders who have achieved a particular credit level or have been placed in a particular achievement level group. For example, the requester may indicate that he or she only wants the request sent to responders who have achieved at least a credit level range of 200 or "Brown" in the "Financial Advising" category. In this way, the responses to a request will be more limited in number than sending the request to all responders. This is depicted in the example of FIG. 2 where the "Brown" achievement level group is selected in dropdown menus 212 and 214, respectively, for both the "Food Services" category and the "Within 10 miles of current location category." In the alternative, no achievement level group may be selected such that the request may be sent to users that are not limited a particular achievement level group.

In accordance with embodiments, a requester may transfer credits to responders that meet certain criteria. In the example of FIG. 2, the requester entered 3 credits in textbox 216 as a credit transfer offer to responders who respond and that meet the criteria of having a "Brown" achievement level group in both the "Food Services" category and the "Within 10 miles of current location category." Thus, responders meeting these criteria and who send a response will receive 3 credits each as a transfer from the requester. The requester may also limit the maximum number of credits that can be transferred. In the example of FIG. 2, the requester limited the transfer of 9 credits total by entry of the number "9" in textbox 218. Therefore, in this example, a maximum of 3 responses would be sent to the requester. This can be used by a requester to avoid receiving too many responses for the agreed upon credit transfer and having to transfer more credits total than desired for the request.

Figure 4:
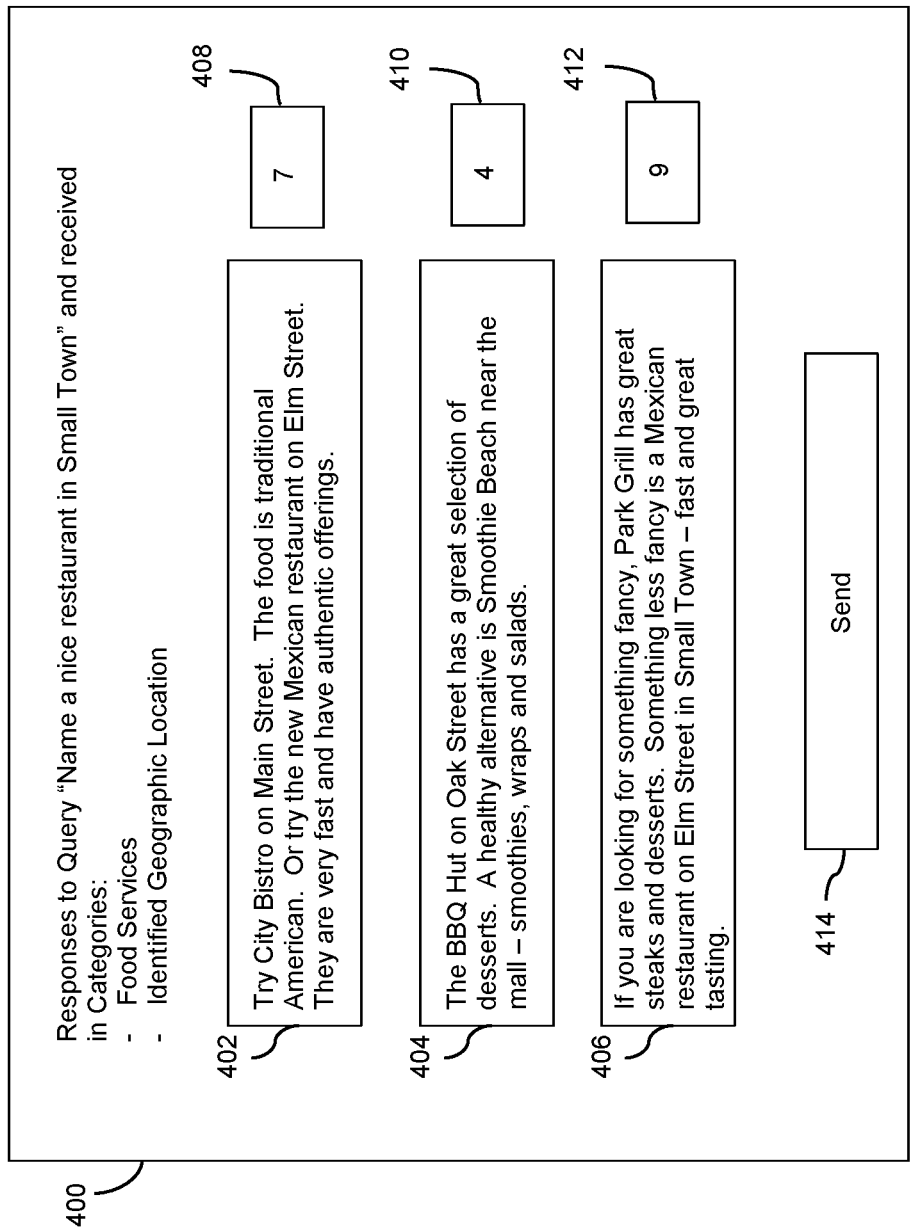
FIG. 4 is a screen display of an example display 400 in accordance with embodiments of the present disclosure.

In another example use of credit levels, credits levels assigned to responders may be used to rank responses their responses among other responders when presenting responses to a request to a requester. For example, a requester may send a request in a particular category. In this example, the requester may receive 3 responses. The 3 responders who sent the responses may have different credit levels. In this case, the 3 responses are presented to the requester, and an indication of a ranking of the responses based on the credit levels is provided. As an example, FIG. 4 illustrates a screen display of an example display 400 in accordance with embodiments of the present disclosure. The display 400 may be the display of a computing device of a requester having receiving responses, such as computing device 106 shown in FIG. 1, or any other suitable computing device. This example is a continuation of the example of FIGS. 2 and 3. Referring to FIG. 4, 3 responses are received and the text of the different responses are displayed respectively in boxes 402, 404, and 406. In this example, the responses are displayed from top to bottom in accordance with the credit levels of the responders in the category of either "Food Services" category and "Within 10 miles of current location category," or some combination of the credit levels assigned to the responder in those categories. In this way, a requester can quickly determine which response was received from a responder assigned a higher credit level than the other responders. To be clear, box 402 is associated with a credit level higher than boxes 404 and 406, and box 404 is associated with a credit level higher than box 406. The ranking can alternatively be presented in any other suitable way, such as providing a ranking number near the presented response.

In accordance with embodiments of the present disclosure, the quality and timeliness of a response to a request can increase or decrease a credit level of the responder. In an example, the credit level of a responder can be increased if the response is provided within a predetermined time period from the request, or within some range. Conversely, the credit level of a responder can be decreased if the response is provided slowly (e.g., not within a predetermined time period from the request) or not at all. In this way, responders are encouraged to provide timely responses because his or her credit level can be positively or negatively affected based on a timing of the response. The predetermined time period may be set by a requester when sending a request. For example, the requester may set for the response to be sent within 5 minutes of the request, and in that case the credit level of a responder who responds with 5 minutes can have his or her credit level increased by the timeliness of the response. The information sharing manager 104 shown in FIG. 1 may operate to determine the timeliness of a response and change the credit level accordingly.

Further, for example, the credit level of a responder can be increased in response to a determination that the response is of a high quality. Conversely, the credit level of a responder can be decreased in response to a determination that the response is of a low quality. The information sharing manager 104 shown in FIG. 1 may operate to determine the quality based on feedback received from a requester and/or other factors as disclosed herein. Further, the information sharing manager 104 may operate to change the credit level according to the determined quality.

Continuing the example of FIG. 4, the requester may use textboxes 408, 410, and 412 (associated with the responses in boxes 402, 404, and 406, respectively) to enter a quality rating for the responses 408, 410, and 412, respectively. In this example, the quality ratings may be 1-10 (with 10 being the highest quality rating and 1 being the lowest quality rating) or any other suitable metric for rating a response. In a particular example, the response in box 402 received a quality rating of 7 out of 10. The quality rating may be deemed a positive quality rating, and thus the credit level for the respective responder may be increased in one or both of the categories in this example. Conversely, in the case of a negative quality rating, the credit level for the respective responder may be decreased in one or both of the categories in this example. The assigned quality ratings for the responders may be sent to the computing device 102 for processing by the information sharing manager 104 in response to the requester selecting "Send" button 414. Subsequent to receipt of the quality ratings, the information sharing manager 104 may adjust the respective credits levels of the responders based on the quality ratings. Further, the information sharing manager 104 may control the computing device 102 to send an indication of the quality ratings and credit level change to respective responders.

In accordance with embodiments of the present disclosure, advertisers, companies, individuals, or other sponsors may associate with responders for providing their content to be included with requests. For example, financial services company or restaurant may sponsor or provide compensation to a requester in exchange for the requester to include marketing content from the company or restaurant in a response. Example marketing content includes an image of a logo or name of the company or restaurant, or a link to a web site for the company or restaurant. A company or other entity may want to associate with the responder in the case of, for example, the responder having a high credit level in one or more categories. As an example, a financial services company may want to compensate a responder who rates highly in the "Financial Services" category for content placement of the company along with responses from the responder. Further, the company or other entity may instruct the responder to only place the content when the requester responds to a particular category or categories. In this way and other described herein, the company or other entity may target content only to those requesters who may be interested in the company or entity's services or products.

In an example, content from a company or other entity for inclusion with a response may be presented to the requester in any suitable way. For example, a company logo may be placed near the response when displayed to the requester. In the example of FIG. 4, the content may be placed within one of the boxes 402, 404, or 406 or adjacent the boxes. The information sharing manager 104 may manage inclusion of content with a response, and send a response to a requester computing device along with the content for presentation to the requester.

Compensation of a responder for placement of content in a request may be suitably made after placement with a response. For example, the information sharing manager 104 may arrange for payment after sending a response. Alternatively, payment for content placement may be made through a suitable service, such as PayPal, or any other suitable service for payment of content placement as will be understood by those of skill in the art.

Figure 5:
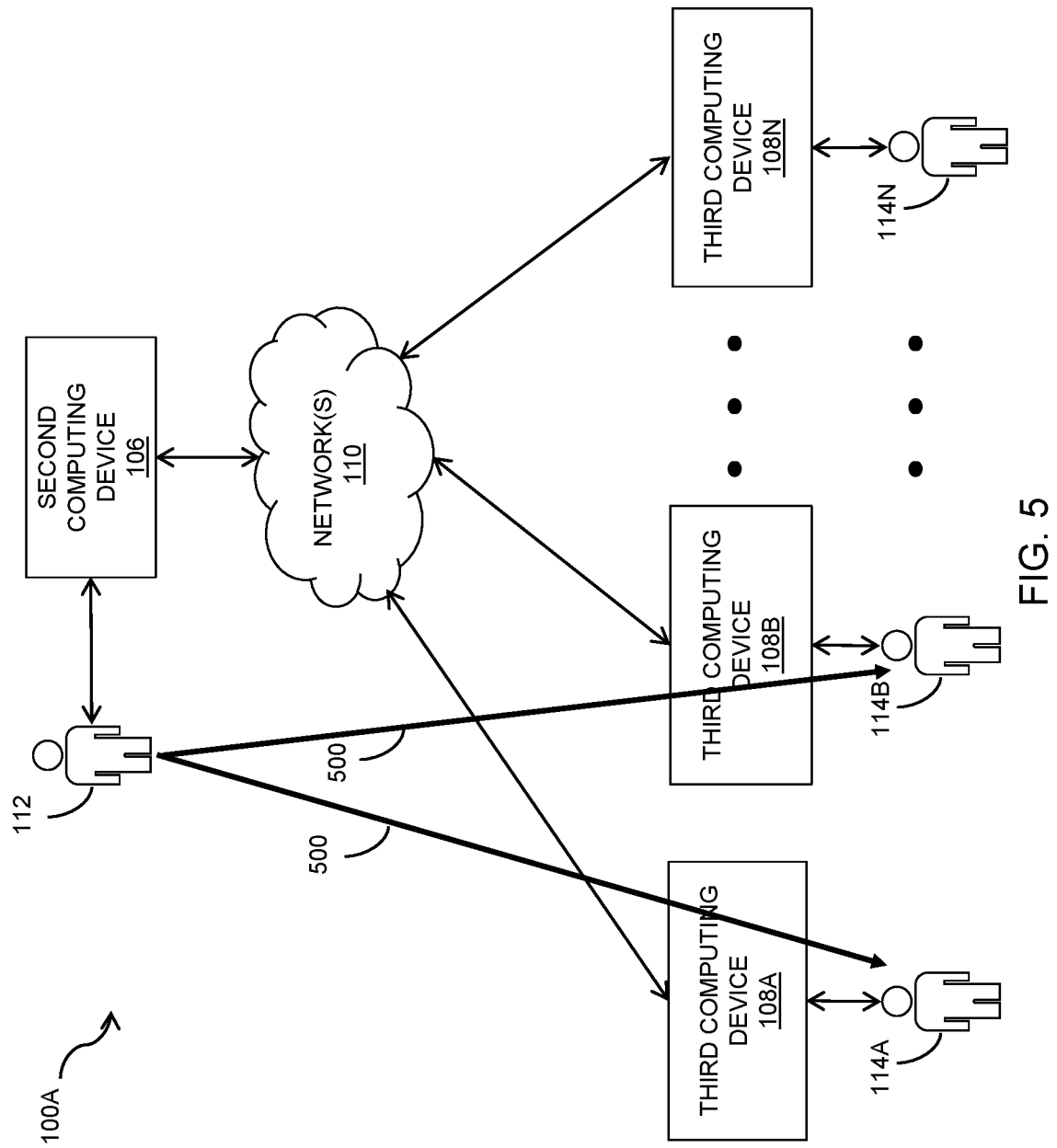
FIG. 5 is a schematic diagram of the system shown in FIG. 1 along with pathways that are generated in accordance with embodiments of the present disclosure.

In accordance with embodiments of the present disclosure, systems and methods disclosed herein may facilitate the networking and exchange of knowledge, information, and expertise of users, both requesters and responders. The connection of knowledge, information, and expertise of users by systems and methods disclosed herein may be viewed as an artificial neural network. Each user may be represented as a "neuron" in the network and pathways between nodes are facilitated by computing devices and communications network(s), such as in the system shown in FIG. 1. A pathway between one neuron and one or more other neurons may be created when a request is initiated. For example, a requester may communicate a request identifying one or more categories, and the request may be communicated to one or more prospective responders based on the request. This creates an initial pathway. For example, FIG. 5 illustrates the system shown in FIG. 1 along with pathways that are generated in accordance with embodiments of the present disclosure. In one example, the user 112 enters and sends a request using the second computing device 106 to generate pathways 500 to prospective responders 114A and 114B via their computing devices 108A and 108B, respectively. Pathways 500 are generated based on the request generated by user 112. More specifically for example, the pathways 500 can be generated based on the categories identified in the request, the credit levels of prospective responders 114A and 114B in the categories, and/or other criteria described herein for determining which prospective responders for receipt of a request. Pathway generation between a requester and one or more responders is dynamic, because the system may facilitate communication between any users of the system; however, the request can limit the users who are determined to receive the request.

Pathway generation to a prospective responder can depend on previous responses by the responder. For example, if the responder increases his or her credit level in a particular category, subsequent pathways to the responder may be more likely to be generated. Thus, the responder can improve his or her access to requesters by improving his or her responses (i.e., providing timely and quality responses). In this way, pathways in the artificial network of users can be strengthened (made more likely when a request is made) or weakened (made less likely when a request is made) based on the quality and timeliness of responses. Thereby, efficiency in exchange and communication of knowledge, expertise, and information directly between users is improved as more users participate and provide responses to requests for their knowledge, expertise, and information.

The information sharing manager 104 may maintain and manage a database indicating credit levels (or scores) and achievement level group information for each user 114A-114N. For each user, there may be a different credit level associated different categories and geographic locations. The higher the credit level for a user in a category, the higher the user is ranked in that category among other users. Conversely, the lower the credit level for a user in a category, the lower the user is ranked in that category among other users. Further, a user may be ranked based on a timeliness of response, a quality of response, the like, and combinations thereof.

TABLE 1

| User ID | Category Type | Credit Level | Achievement Level Group |
|---|---|---|---|
| User 00001 | Food Services | 250 | Brown |
|  | Small Town | 550 | Black |
| User 00002 | Food Services | 150 | Green |
|  | Mid-Size Town | 75 | White |
| User 00003 | American History | 675 | Black |
| User 00004 | Computer Technology | 925 | Black |

The first computing device 102 may adjust a credit level of the third user 114 associated with the determined third computing device 108 of the third computing devices 108A-108N based on a received response. The credit level of users, such as the third users 114A-114N, may indicate one or more credits earned by the users. In Table 1 for example, User 00001 and User 00002 have credit levels of 250 and 150, respectively, in the "Food Services" category. Thus, User 00001 has a credit level higher than User 00002 in this category. A response from User 00001 in this category will rank higher than a response from User 00002. The credits may be reward points assigned to the users based on one or more factors or response credentials associated with the response. Examples of the response credentials may include such as, but not limiting to, correctness of the response, usefulness of the response, a time taken for sending the response, and so forth. The first computing device 102 may store and maintain response credentials for each of the computing devices such as, for example, the second computing device 106 and the third computing devices 108A-108N shown in FIG. 1.

Further, in an exemplary scenario, the credits may be exchanged from one user to another for buying goods or services. The credits may be assigned to the users by the information sharing manager 104 and or by the other user, such as the second user receiving the response from the third users 114A-114N, to transfer the third users 114A-114N for responding to the requests of the second user 112. The credits may encourage the third users 114A-114N to actively respond in the future too as the credits may be used by the third users 114A-114N for availing services or requesting information from other users connected to the network 110 and/or to the information sharing manager 104.

The first computing device 102 may be configured to communicate the response to the second computing device 106. The second computing device 106 may be configured to assign a rating to the response based on a correctness of the response, a time taken for responding to the request for information, responsiveness to the request for information, and so forth. The first computing device may receive a quality rating from the second computing device 106 and may adjust the credit level of the one or more of the third users 114A-114N associated with the one or more third computing devices 108A-108N. In some embodiments, the first computing device 102 determines an adjustment of a credit level associated with the second user 112 of the second computing device 106. In such embodiments, the credit level associated with the one or more of the third users 114A-114N may be adjusted based on the adjustment of the credit level associated with the second user 112.

Further, the first computing device 102 may be configured to assign a ranking of each of the third users 114A-114N based on one or more communication response credentials. A ranking of a user may be where a responding user, such as a third user 114A, ranks among other responding users such as the third users 114B-114N. The third users 114A-114N may be assigned a ranking based on the response credentials. In an example scenario, the users may be given a ranking ranging within 1-10 based on a response time taken by the users. In an example of ranking of the third user (or other third users 114A-114N), a weighted sum model (WSM) may be used for determining a score (or credit level) for each of some or all users (or third users 114A-114N). The users may be ranked based on their score. For example, a user may be ranked higher than another user if the user's credit level (or score) is higher than the other user. Conversely, a user may be ranked lower than another user if the user's credit level (or score) is lower than the other user. Herein, ranking may be referred as rating due to similarity in their meaning with reference to disclosed embodiments. Examples of the response credentials may include such as, but are not limited to, a correctness of responses received from the third users 114A-114N, a time taken for responding to the request for information by the third users 114A-114N, availability of the users 114A-114N, responsiveness to a communication by the third users 114A-114N, and ranking of the each of the third users 114A-114N and the responses given by other users such as the second user 112. Further, the first computing device 102 may be configured to store and maintain a ranking associated with the users (i.e. the second user 112, and the third users 114A-114N) associated with the computing devices such as the second computing device 106 and the third computing devices 108A-108N) connected to the network 110.

In accordance with embodiments of the present disclosure, a suitable model may be applied for determining communication pathways among users in a system, such as the system shown in FIG. 1. As discussed herein, the system may be represented by an artificial neural network with users being neuron and the computing devices and communications network(s) of the system providing pathways between participating users. Pathways may be generated or strengthened, for example, based on credit levels assigned to prospective responders. A pathway from a requester to a prospective responder may be more likely to be generated when, for example, the prospective responder is assigned a high credit level in one or more categories, particularly categories identified in a request. Thus, pathways can be dynamic due to their dependence upon credit levels, which are dynamic.

A suitable equation or formula may be applied for determining a credit level or score of a user. The equation for determining a credit level for a user in a particular category may include one or more variables that correspond to a timeliness of a response to requests in the category, a quality of responses to requests in the category, and other criteria disclosed herein. An example equation follows for determining a credit level (or score) CL of a user in a particular category.

$$CL = \sum_{j=1}^{n} w_j c_{ij}, \text{ for } i = 1, 2, 3, \ldots, m.$$

In this equation, wj represents a relative weight of importance for criterion cij. For example, a weight for one criterion for determining the credit level CL may be higher than the weight of others. Thus, criterion with a higher weight can be assumed to be more important. Different weights may be applied to different criterion. There are m alternatives and n decision criteria in this equation. Furthermore, it is assumed that all the criteria are benefit criteria, that is, the higher the values are, the better it is. Also suppose that wj denotes the relative weight of importance of the criterion cj, and aij is the performance value of alternative Ai when it is evaluated in terms of criterion cj. Then, the total (i.e., when all the criteria are considered simultaneously) credit level CL is defined by the equation. This is one example for determining a credit level for a user in a particular category, and it should be appreciated that any suitable equation or model may be utilized for determining the credit level.

In some examples, a requester may control the criteria for selecting recipients for a request in any suitable manner. For example, the requester may require a response within a predetermined time period. In this example, such a request may only be sent to responders indicating that they can respond within the time period. In another example, the request may be limited to receipt by prospective responders who have a particular credit level in a selected category. In another example, the request may be limited to receipt by prospective responders who are within a selected geographic location (e.g., local to the requester). In another example, the request may be limited to receipt by prospective responders with whom the requester has previously communicated. In this example, the requester may suitably identify the prospective responder in the request such that the request is sent to a set of responders including the prospective responder.

In some embodiments, the responses of the third users 114A-114N and the second user 112 may be published in the network 110 based on a permission or preference of the third users 114A-114N, and the second user 112, respectively. Corresponding requests may also be published with the responses. Published responses may be readily available to the other users connected to the network 110 for viewing. In an example, such responses and requests may be made available via a website, application available for a smartphone, and/or the like as will be understood to those of skill in the art. Published requests and responses may be suitably indexed for search according to category, particular responder or requester, assigned quality of response, and the like associated with the request or response. In addition, sponsored content may be published along with published requests and responses. The users associated with the requests and responses may be compensated for permitting publication as will be understood.

In some embodiments, third users 114A-114N or the associated third computing devices 108A-108N may be divided into multiple groups based on factors, such as, but not limiting to, interests, age, location, activeness in responding, ranking, educational background and user preference. In some embodiments, the first computing device 102 may form the group or alternatively, the third users 114A-114B may form the groups. Such groups may be referred as a "network resource group." The network resource group may be a group of users acting as a single entity to respond to requests. For example, a company may form a network resource group for responding to request for information received. In such embodiments, when the request for information is received in the group of the third users 114A-114N then one or more users of this group can respond to the request. Further, when a request for information is received, all the members of the group may work together to send a response or may be a first user in the group or the designated user of the group may respond to the request for information.

Figure 6:
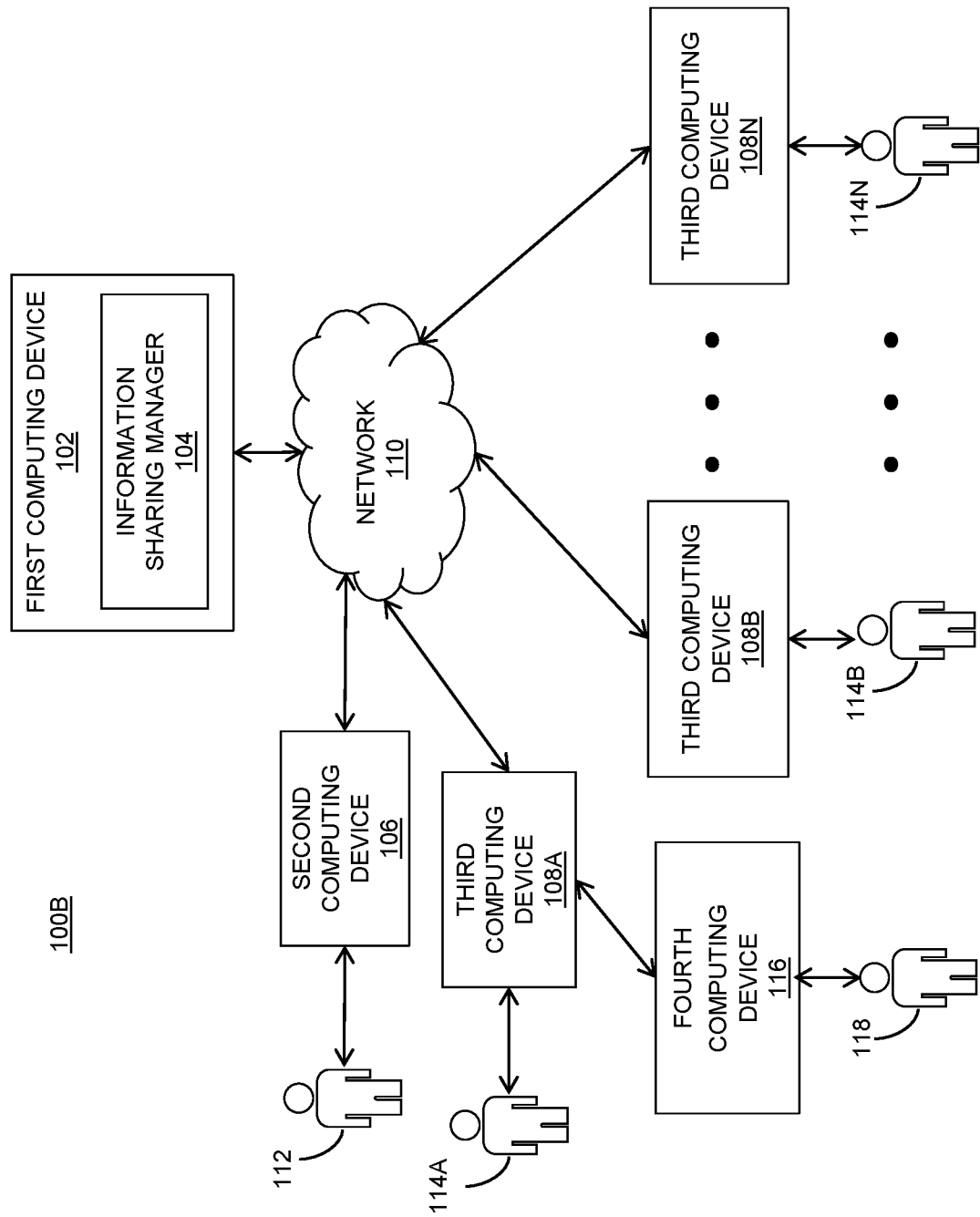
FIG. 6 is a schematic diagram of another example system within which various components may function in accordance with embodiments of the present disclosure.

FIG. 6 is a schematic diagram of another example system 100A within which various components may function in accordance with embodiments of the present disclosure. As shown, the system 100B includes a number of computing devices, such as the first computing device 102, the second computing device 106 associated with the second user 112, the third computing devices 108A-108N associated with the third users 114A-114N, and a fourth computing device 116 associated with a fourth user 118. The computing devices 102, 106, and 108A-108N, and the fourth computing device 116 are capable of communicating with each other via the network 110. As discussed with reference to FIG. 1, the first computing device 102 may be any computation device or a server capable of connecting with the network 110 and communicating with other devices, such as the second computing device 106 and the third computing devices 108A-108N, connected to the network 110. Examples of the fourth computing device 116 may include, such as, but are not limited to, a mobile phone, a desktop computer, a laptop computer, a smart phone, a personal digital assistant (PDA), a tablet computer, a smart television, a television, and so forth.

As discussed with reference to FIG. 1, the first computing device 102 may include the information sharing manager 104. The first computing device 102 may receive a request for information from the second computing device 106. In some embodiments, the request for information may include a query. The first computing device 102 may be configured to analyze the request for information and determine one or more of the third computing devices 108A-108N based on the analysis. The first computing device 102 may be configured to communicate or forward the request for information to the determined one or more or the third computing devices 108A-108N. The one or more of the third computing devices 108A-108N may receive the request for processing and may further communicate the request for information to the fourth computing device 116. The fourth computing device 116 may generate a response for the request for information based on analysis of the request for information and based on an input from the fourth user 118. In some embodiments, the fourth user 118 may enter the response at the fourth computing device 116. The fourth computing device 116 may send the response and additional content to the one or more of the third computing devices 108. The additional content may include a timestamp, an advertisement, a suggestion, a quiz, and so forth. The one or more of the third computing devices 108A-108N may forward the response and the content received from the fourth computing device 116. The first computing device 102 may be configured to receive the response corresponding to the request for information from the determined one or more of the third computing devices 108A-108N. The first computing device 102 may adjust a credit level of the third user of the third user 114A-114N associated with the one or more of the third computing devices 108A-108N based on the received response. The credit level may be adjusted by assigning (or deleting) one or more credits to the one or more of the third computing devices 108A-108N. The credit level of a user, such as the third users 114A-114N, may indicate a number of credits earned by the user. The credits may be reward points assigned to the user based on one or more factors or response credentials associated with the response. The credits may be used by the user, such as the third user 114A, for exchanging information in future. Examples of the response credentials may include such as, but not limited to, correctness of the response, usefulness of the response, a time taken for sending the response, and so forth. The first computing device 102 may store and maintain response credentials for each of the computing devices, such as the second computing device 106, the fourth computing device 116, the third computing devices 108A-108N, and so forth.

Further, in an exemplary scenario, the credits may be equivalent to money in a monetary system; the users for buying goods or services from other users may use the credits. The credits may be assigned to the users by the information sharing manager 104 and or by the other user, such as the second user receiving the response from the third users 114A-114N, to compensate the third users 114A-114N for responding to the requests of the second user 112. The credits may encourage the third users 114A-114N to actively respond in future too as the credits may be used by the third users 114A-114N for availing services or requesting information from other users connected to the network 110 and/or to the information sharing manager 104.

The first computing device 102 may be configured to communicate the response and the content to the second computing device 106. The second computing device 106 may be configured to assign a rating to the response based on a correctness of the response, a time taken for responding to the request for information, responsiveness to the request for information, and so forth. The first computing device may receive the rating from the second computing device 106 and may adjust the credit level of the one or more of the third users 114A-114N associated with the one or more third computing devices 108A-108N. In some embodiments, the first computing device 102 may determine an adjustment of a credit level associated with the second user 112 of the second computing device 106. In such embodiments, the credit level associated with the one or more of the third users 114A-114N may be adjusted based on the adjustment of the credit level associated with the second user 112.

The first computing device 102 may also be configured to receive a feedback to the response and the content from the second computing device 106. The feedback may be forwarded to the one or more of the third computing devices 108A-108N, which in turn may forward the response to the fourth computing device 116. The feedback may include such as, but not limited to, a rating of the response and an acknowledgement of viewing of content on the second computing device 106. The first computing device 102 may also be configured to receive a credit for one or more of the third users 114A-114N associated with the third computing devices 108A-108N based on the received feedback. In some embodiments, the content includes an advertisement including an image, a text, a video, a hashtag, and an audio, provided by the fourth computing device 116.

Further, in some embodiments, the first computing device 102 may be configured to assign a ranking of each of the third users 114A-114N based on one or more communication response credentials. Examples of the communication response credentials may include such as, but are not limited to, a correctness of responses received from the third users 114A-114N, a time taken for responding to the request for information by the third users 114A-114N, availability of the users 114A-114N, responsiveness to a communication by the third users 114A-114N, and ranking of the each of the third users 114A-114N and the responses given by other users such as the second user 112. Further, the first computing device 102 may be configured to store and maintain a ranking associated with the users (i.e. the second user 112, and the third users 114A-114N) associated with the computing devices such as the second computing device 106 and the third computing devices 108A-108N) connected to the network 110. In an exemplary scenario of ranking of the third user (or other third users 114A-114N), a weighted sum model (WSM) may be used for determining a score for each of some or all users (or third users 114A-114N). The users may be ranked based on their score. For example, a user may be ranked higher than another user if the user's score is higher than the other user. Conversely, a user may be ranked lower than another user if the user's score is lower than the other user.

In some embodiments, the information sharing manager 104 may be located within the first computing device 102 as shown in FIG. 1 or 6 for example, or may be located remotely on a network device (not shown) in the network 110. The network device may be connected to the network 110. In some embodiments, the network device may be registered with the network 110. Examples of the network device may include, such as, but not limited to, a computation device (for example a router, a modem, etc.) present in the network 110.

In some embodiments, the third users 114A-114N or the associated third computing devices 108A-108N may be divided into multiple groups based on factors, such as, but not limiting to, interests, age, location, activeness in responding, ranking, educational background and user preference. In some embodiments, the first computing device 102 may form the group or alternatively, the third users 114A-114B may form the groups. Such groups may be referred as network resource group. The network resource group may be a group of users acting as a single entity to respond to requests. For example, a company may form a network resource group for responding to request for information received. In such embodiments, when the request for information is received in the group of the third users 114A-114N, then one or more users of this group can respond to the request. Further, when a request for information is received, all the members of the group may work together to send a response or may be a first user in the group or the designated user of the group may respond to the request for information.

Further, the response and/or the content may be a sponsored content. The sponsored content may refer to a response or a content that is sponsored by a user or a company. For example, a user, such as the fourth user 118, may be sponsored by a company to provide responses that promote the company or advertisements from the company can be placed on the responses. The company then may provide credits to the fourth user 118 or may pay in form of money. In some embodiments, may sponsor the third computing device 108 and provide content to the third computing device 108 for sending to other devices such as the second computing device 106. In such scenario, the fourth user 118 may pay money or give credits to the third user 114. The users in the network 110 may be motivated to seek more credits as the credits may be exchanged with other users in order to gain more information, knowledge, and expertise of the other users.

In some embodiments, the third user 114 may hire another user such as the fourth user 118 for responding to all the request for information that are being directed to or picked based on the work claim requests by the third computing device 108. In some embodiments, third computing devices 108A-108N can select or pick a work claim request for responding to the request for information associated with the work claim request. The third user 114 may select the work claim request based on such as, his/her own interest, time availability, and so forth.

Figure 7:
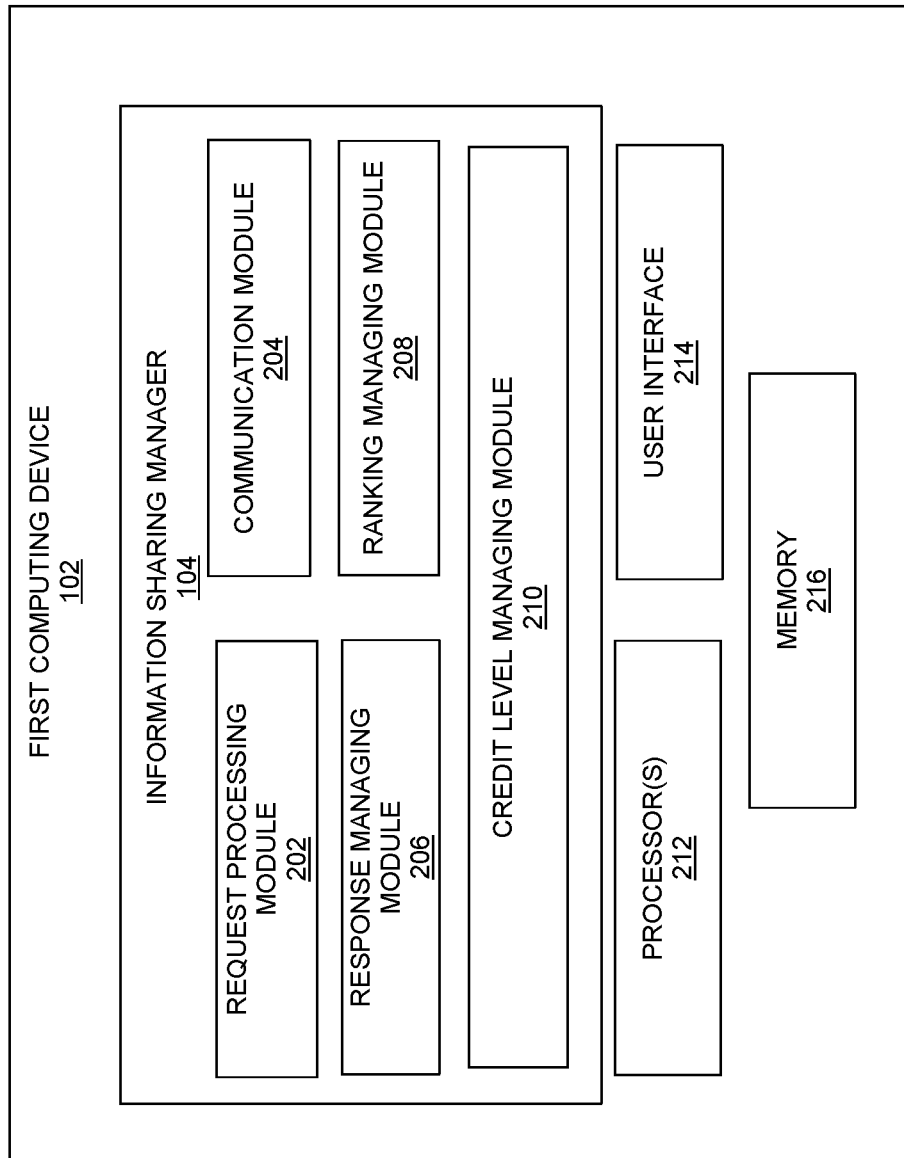
FIG. 7 is a block diagram of various system elements of an example first computing device in accordance with embodiments of the present disclosure.

FIG. 7 is a block diagram of various system elements of an example first computing device, such as the first computing device 102 of FIG. 1 or 6, for example, in accordance with embodiments of the present disclosure. As shown the first computing device 102 may include the information sharing manager 104, one or more processors 212, a user interface 214, and a memory 216. The information sharing manager 104 may further include a request processing module 202, a communication module 204, a response managing module 206, a ranking managing module 208, and a credit level managing module 210.

The processors 212 may further include one or more digital signal processors, central processing units, field programmable gate arrays, programmable array logic, programmable logic devices, cloud processing systems, or the like. The information sharing manager 104 may be a device or combination of multiple devices that may be implemented in software for execution by various types of the processors 212. The user interface 214 may enable a user such as a first user (not shown) of the first computing device 102 to interact with the first computing device 102.

As discussed with reference to FIGS. 1 and 6, the first computing device 102 may be configured to receive a request for information from the second computing device 106. The communication module 204 of the information sharing manager 104 may be configured to receive requests for information from the second computing device 106. The request processing module 202 may be configured to analyze the request for information, and determine at least one third computing device from the third devices 108A-108N based on the analysis of the request for information. Herein after, the determined at least one third computing device may be referred as the third computing device 108 without change in meaning. In some embodiments, the request processing module 202 determines the one or more of the third computing devices 108A-108N based on one or more determining factors such as, but not limited to, a geographic location of the second computing device 106 or/and of the one or more of the third computing devices 108A-108N, an interest of the third users 114A-114N, a rating of the third users 114A-114N or of the computing devices 108A-108N, educational background of the third users 114A-114N, a time when the request for information is received, and an availability of the on or more third users 114A-114N associated with the one or more of the third computing devices 108A-108N. For example, the server may forward the queries related to food to a chef or a nutritionist.

In some embodiments, the communication module 204 may further be configured to automatically communicate the request for information to the third computing device 108 based on the analysis of the request for information. In alternative embodiments, the communication module 204 may display a list including the determined one or more of the third computing devices 108A-108N on a display of the second computing device 106. Thereafter, the second user 112 can choose to whom he/she wants the request to be directed. Based on the choice or selection of the third computing devices 108A-108N by the second user 112 received from the second computing device 106, the first computing device may communicate the request for information to the selected third computing device of the third computing devices 108A-108N.

In some embodiments, the communication module 204 may be configured to associate a work claim ticket with the request for information and communicate the request for information to the third computing devices 108A-108N. The communication module 204 may be configured to receive a request for the work claim ticket from the third computing devices 108A-108N. The communication module 204 may be configured receive a response corresponding to the request for information from the third computing device 108. The communication module 204 may further be configured to communicate the response to the second computing device 106.

The communication module 204 may be further configured to receive a quality rating or ranking for the response from the second computing device 106. The second computing device 106 may assign the ranking or rating based on a response credentials including, but are not limited to, a correctness of response, and a time taken for responding to the request for information, a responsiveness to the request for information. In an exemplary scenario, the response is not correct or is not useful to the second user 112, then a negative, low or bad rating may be given to the third user 114 by the second user 112. Otherwise, when the second user 112 finds the response as correct and useful then the second user 112 may give a positive or good rating to the third user 114. In an example of ranking of the third user (or other third users 114A-114N), a weighted sum model (WSM) may be used for determining a score for each of some or all users (or third users 114A-114N). The users may be ranked based on their score. For example, a user may be ranked higher than another user if the user's score is higher than the other user. Conversely, a user may be ranked lower than another user if the user's score is lower than the other user.

In some embodiments, the communication module 204 may also be configured to receive a feedback to the response and the content from the second computing device 106. The feedback may be forwarded to the one or more of the third computing devices 108A-108N, which in turn may forward the response to the fourth computing device 116. The feedback may include such as, but not limited to, a rating of the response and an acknowledgement of viewing of content on the second computing device 106. The communication module 204 may also be configured to receive a credit for the third users 114A-114N associated with the third computing devices 108A-108N based on the received feedback from the fourth computing device 116 and/or the second computing device 106. In some embodiments, the content includes an advertisement including an image, a text, a video, a hashtag, and an audio, provided by the fourth computing device 116.

The credit level managing module 210 may be configured to adjust a credit level of the third user 114 associated with the third computing device 108 based on the received response. The credit level may indicate one or more credits earned by the third user 114. The third user 114 for exchanging information with other computing devices in future may use the earned credits. In some embodiments, the credit level managing module 210 is further configured to adjust the credit level of the third user 114 based on the rating for the response received from the second computing device 106.

In alternative embodiments, the credit level managing module 210 is further configured to determine an adjustment of a credit level associated with the second user 112. The credit level of the second user 112 may indicate one or more credits or reward points earned by the second user 112 by sharing information in the network 110. Further, the credit level managing module 210 may further be configured to adjust the credit level associated with the third user 114 based on the adjustment of the credit level associated with the second user 112. Further, in an exemplary scenario, the credits may be equivalent to money in a monetary system; the users for buying goods or services from other users may use the credits. The credits may be assigned to the users by the information sharing manager 104 and or by the other user, such as the second user receiving the response from the third users 114A-114N, to compensate the third users 114A-114N for responding to the requests of the second user 112. The credits may encourage the third users 114A-114N to actively respond in future too as the credits may be used by the third users 114A-114N for availing services or requesting information from other users connected to the network 110 and/or to the information sharing manager 104.

Further, the response managing module 206 may be configured to maintain response credentials for each of the first computing device, the second computing device 106, and the third computing devices 108A-108N. Examples of the response credentials may include responses, timestamp information of the responses, number of responses from each computing device, content received along with the responses, ranking of the responses or that of the users 114A-114N, and so forth.

The ranking managing module 208 may be configured to maintain a ranking of the users, such as the second user 112 and the third computing devices 108A-108N, based on a number of communication response credentials. In some embodiments the ranking managing module 208 may maintain a ranking for each of the computing devices such as, the second computing device 106 and the third computing devices 108A-108N. In some embodiments, the ranking managing device may be configured assign or adjust a ranking of the second user 112 and the third computing devices 108A-108N. In some embodiments, the ranking managing device may be configured assign or adjust a ranking or rating of the computing devices such as, the second computing device 106 and the third computing devices 108A-108N In some embodiments, the memory 216 may store the response credentials, rankings or ratings and credits of the users and the third computing devices 108A-108N and second computing device 106, device identifier associated with the computing devices 106, and 114A-114N, and so forth.

Figure 8:
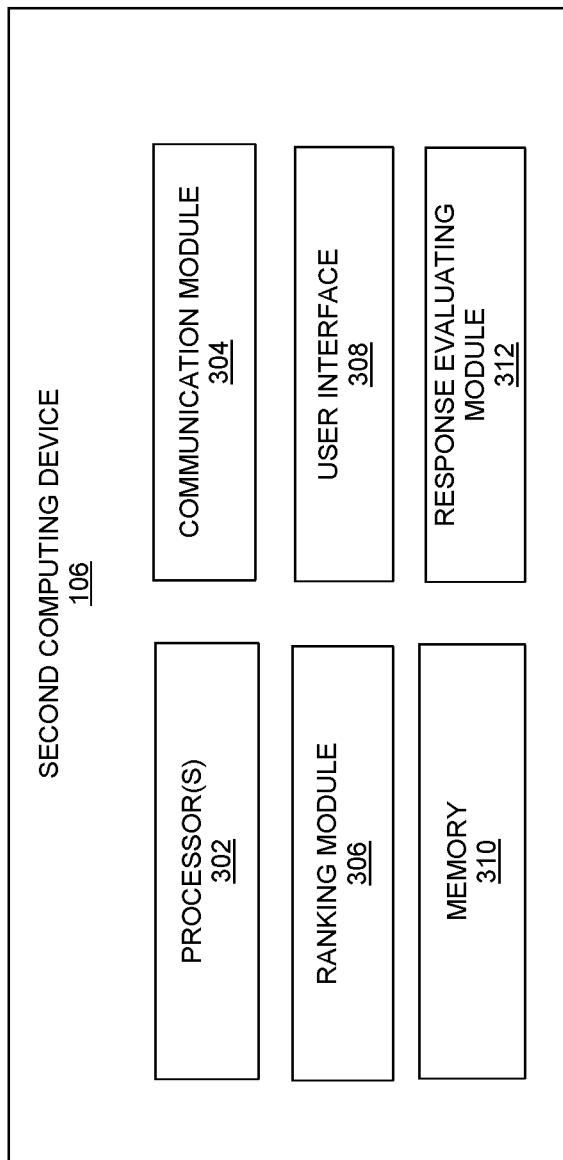
FIG. 8 is a block diagram of various system elements of an exemplary second computing device in accordance with embodiments of the present disclosure.

FIG. 8 illustrates a block diagram of various system elements of an exemplary second computing device, such as the second computing device 106 shown in FIGS. 1 and 6 for example, in accordance with embodiments of the present disclosure. Referring to FIG. 8, the second computing device 106 primarily includes one or more processors 302, a communication module 304, a ranking module 306, a user interface 308, a memory 310, and a response evaluating module 312. The processors 302 may be configured to execute or process one or instructions for allowing the other modules 304-312 to work with each other for information sharing. The instructions may be stored in the memory 310. The user interface 308 may be configured to allow the second user 112 to interact with the second computing device 106. The second user 112 may enter a request for information at the user interface 308 on a display of the second computing device 106.

The communication module 304 may be configured to send the request for information to the first computing device 102, such as a server. The communication module 304 may also be configured to receive a response and/or content for the request for information from the first computing device 102 or other devices in the network 110.

The response evaluating module 312 may be configured to evaluate the responses based on the multiple response credentials including, but are not limited to, a correctness of response, and a time taken for responding to the request for information, a responsiveness to the request for information. Based on the evaluation, the ranking module may be configured to assign a rating or ranking to the computing device such as the third computing device 108 or its associated third user 114. The communication module 204 may be further configured to send the rating or ranking for the response to the second computing device 106. In an exemplary scenario, the response is not correct or is not useful to the second user 112, and then a negative, low or bad rating may be given to the third user 114 by the second user 112. Otherwise, when the second user 112 finds the response as correct and useful then the second user 112 may give a positive or good rating to the third user 114 and in turn the ranking module may assign the rating to the third user 114. The ranking module 306 may be configured to store the rating of various third users 114A-114N.

In some embodiments, the communication module 304 may also be configured to send a feedback to the response and/or the content to the first computing device 102. In some embodiments, the memory 310 may also store the responses and the content received by the communication module 304.

Figure 9:
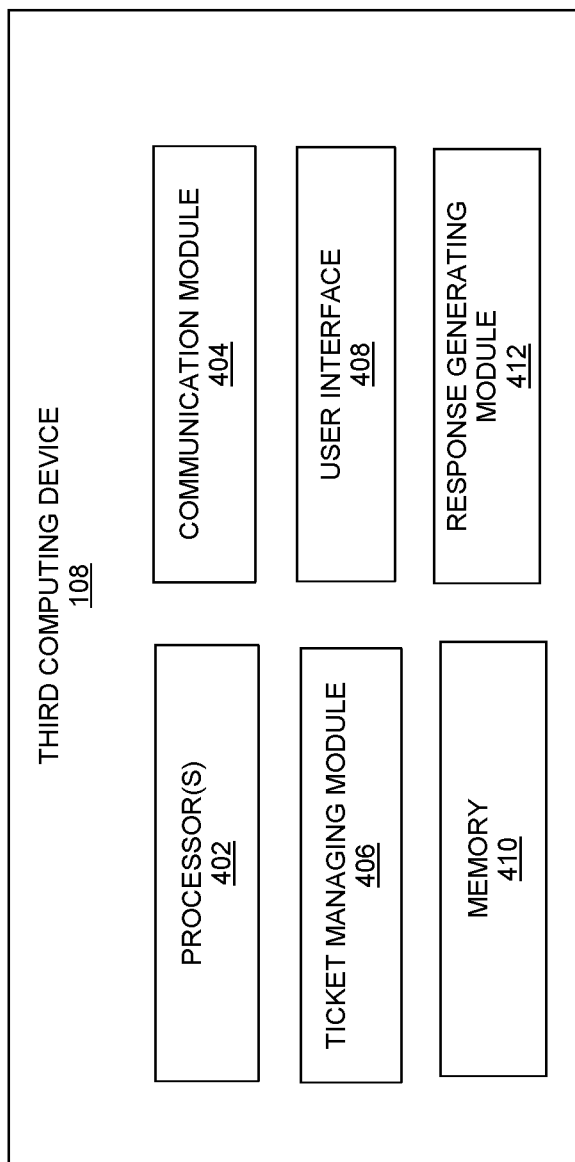
FIG. 9 is a block diagram of various system elements of an example third computing device, such as the third computing device shown in FIG. 1, in accordance with embodiments of the present disclosure.

FIG. 9 illustrates a block diagram of various system elements of an example third computing device, such as the third computing device 108, in accordance with embodiments of the present disclosure. Referring to FIG. 9, the third computing device 108 primarily includes one or more processors 402, a communication module 404, a ticket managing module 406, a user interface 408, a memory 410, and a response generating module 412. The processors 402 may be configured to process or execute one or instructions for allowing the other modules 404-412 to work with each other.

The instructions may be stored in the memory 410. The user interface 408 may be configured to allow the third users 114A-114N to interact with the third computing devices 108A-108N.

The third users 114A-114N may also select or pick a number of work claim ticket(s) associated with the requests for information from the first computing device 102. The ticket managing module 406 may be configured to manage and process one or more work claim tickets selected by the third user 114 of the third computing device 108. The response generating module 412 may be configured to generate a response corresponding to the request for information based on an analysis of the request for information and an input from the third user 114 at the user interface 408. In some embodiments, the communication module 404 may be configured to forward the request to another device such as the fourth computing device 116 and receive a response and/or content from the fourth computing device 116. The communication module 404 may communicate the response and/or content to the first computing device 102.

In some embodiments, the third user 114 may hire another user such as the fourth user 118 for responding to all or some of the request for information that are being directed to or picked based on the work claim requests by the third computing device 108. In some embodiments, third computing devices 108A-108N can select or pick a work claim request for responding to the request for information associated with the work claim request. The third user 114 may select the work claim request based on factors such as, his/her own interest, time availability, and so forth.

Figure 10:
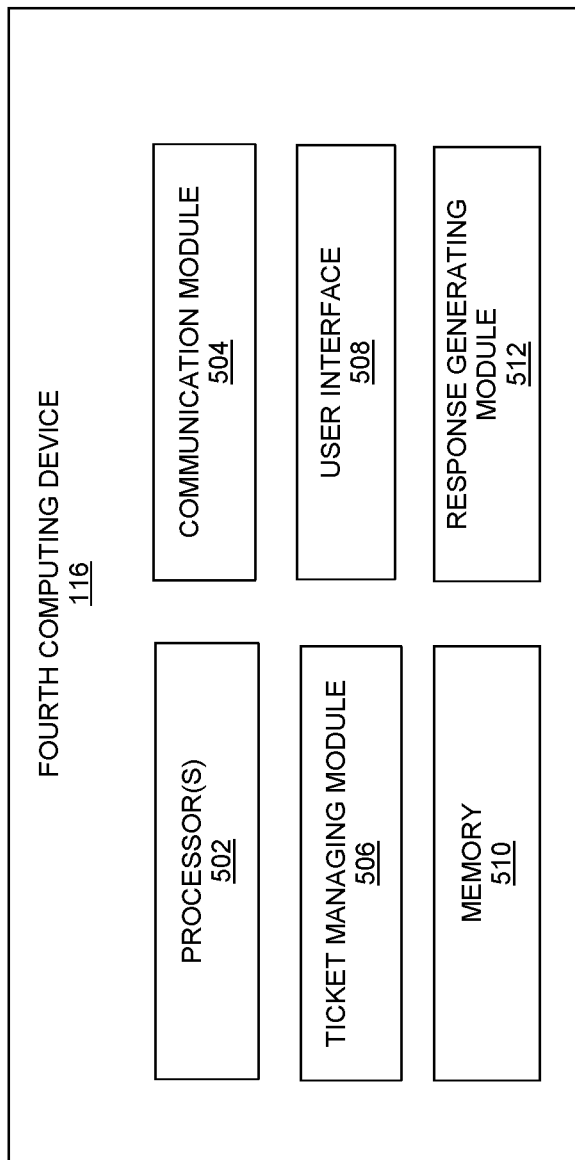
FIG. 10 is a block diagram of various system elements of an example fourth computing device, such as the fourth computing device of FIG. 6, in accordance with embodiments of the present disclosure.

FIG. 10 illustrates a block diagram of various system elements of an example fourth computing device, such as the fourth computing device 116 of FIG. 6, in accordance with embodiments of the present disclosure. The fourth computing device 116 may primarily include one or more processors 502, a communication module 504, a ticket managing module 506, a user interface 508, a memory 510, and a response generating module 512. The processors are configured to one or instructions for allowing the other modules to work with each other. The instructions may be stored in the memory 510. The user interface 508 may be configured to allow the fourth user 118 to interact with the fourth computing device 116. The second user 112 may enter one or more input at the user interface 508 on a display of the fourth computing device 116.

As discussed with reference to FIG. 4, the third users 114A-114N may also select or pick a number of work claim ticket(s) associated with the requests for information from the first computing device 108. In some embodiments, the third computing device 108A-108N may be configured to forward the work claim ticket and/or the request for information to the fourth computing device 116. The communication module 504 maybe configured to receive the work claim ticket and/or the request for information. Further, the ticket managing module 506 may be configured to manage and process one or more work claim tickets selected by the third user 114 of the third computing device 108.

The response generating module 512 may be configured to generate a response corresponding to the request for information based on an analysis and processing of the request for information and an input from the fourth user 118 at the user interface 508. In some embodiments, the communication module 504 may be configured to send or transmit the response and/or content from to the third computing device 108. In alternative embodiments, the communication module 504 may further communicate the response and/or content to the first computing device 102 or other devices in the network 110.

Figure 11A:
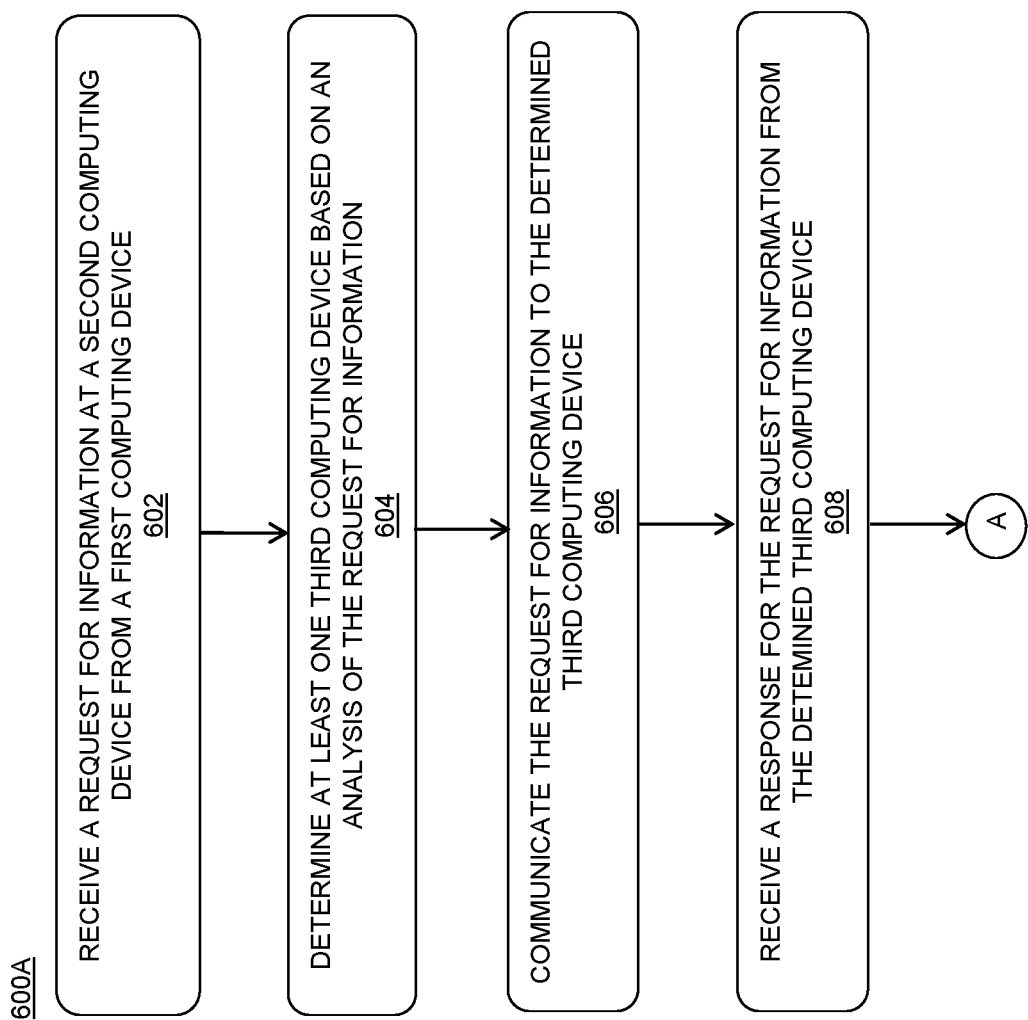
FIGS. 11A and 11B illustrate a flowchart of an example method for facilitating information and expertise distribution via a communications network in accordance with embodiments of the present disclosure.
Figure 11B:
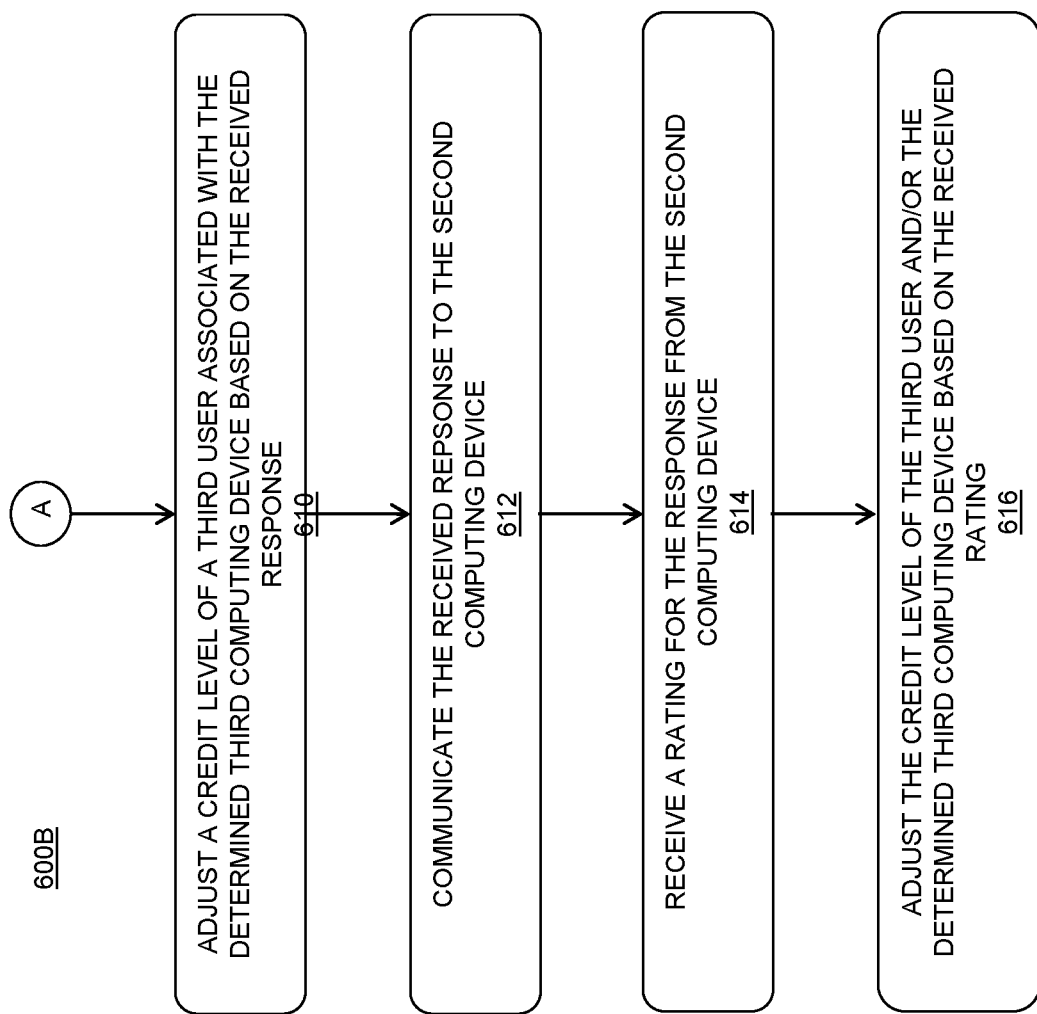

FIGS. 11A and 11B illustrate a flowchart of an example method 600A-600B for facilitating information and expertise distribution via a communications network in accordance with embodiments of the present disclosure. As discussed with reference to FIG. 1 for example, the first computing device 102 includes the information sharing manager being configured to enable sharing or exchange of information among multiple computing devices i.e. the second computing device 106 and the third computing devices 108A-108N. As further discussed with reference to FIG. 2, the first computing device 102 includes the one or more processors 212, the user interface 214 and the memory 216. The information sharing manager 104 includes the request processing module 202, the communication module 204, the response managing module 206, the ranking managing module 208, and the credit level managing module 210. The first computing device 102 may be configured to receive multiple request for information from the second computing device 106 and forward the requests to the third computing devices 108A-108N based on a determination as discussed in FIG. 2.

At step 602, a request for information is received at the first computing device 102 from the second computing device 106. In an exemplary scenario, the first computing device 102 can be a server located remotely, and the second computing device 106 can be a smart phone of the second user 112. The second user 112 may enter a request for best colleges in a particular area at the user interface of the smartphone. Then, the request may be sent to the server via the network 110. In some embodiments, the communication module 204 may receive the request for information from the communication module 304 of the second computing device 106.

At step 604, the first computing device may analyze the request for information and may determine at least one of the third computing devices 108A-108N based on factors already discussed above, such as, geographic location of the third users 114A-114N or the third computing devices 108A-108N. In some embodiments, the request processing module 206 may determine the at least one third computing device (hereinafter referred as third computing device 108).

Thereafter, at step 606, the request for information is communicated to the third computing device 108. In some embodiments, the communication module 204 sends the request for information to the third computing device 108. The communication module 404 may receive the request for information from the first computing device 102. The request may be processed at the third computing device 108 by the response generating module 412 for generating a response.

Then, at step 608, a response corresponding to the request for information is received from the third computing device 108. The communication module 204 may receive the response (and/or content) from the third computing device 108. Then, at step 610, a credit level of a user, such as the third user 114, associated with the third computing device 108 is adjusted based on the received response. In some embodiments, the credit level managing module 210 may adjust the credits of the third user 114. The credit level of the third user 114 may indicate one or more credits or reward points earned by the third user 114 by responding to the request for information.

At step 612, the received response may be communicated to the second computing device 106. In some embodiments, the communication module 204 may communicate the response to the second computing device 106. The second computing device 106 may evaluate the response and assign a rating to the user 114 or the third computing device 108 based on the evaluation. Then at step 614, the first computing device 102 may receive the rating or the ranking for the response from the second computing device 106. For example, the second computing device 106 may assign the ranking like 1 to 10, where 1 being highest and 10 being lowest or vice versa to the third computing device 108. Thereafter, at step 616, a credit level of the third user based on the received rating or the ranking. In some embodiments, the credit level managing module 210 adjusts or assigns the credit level of the third user 114.

Figure 12B:
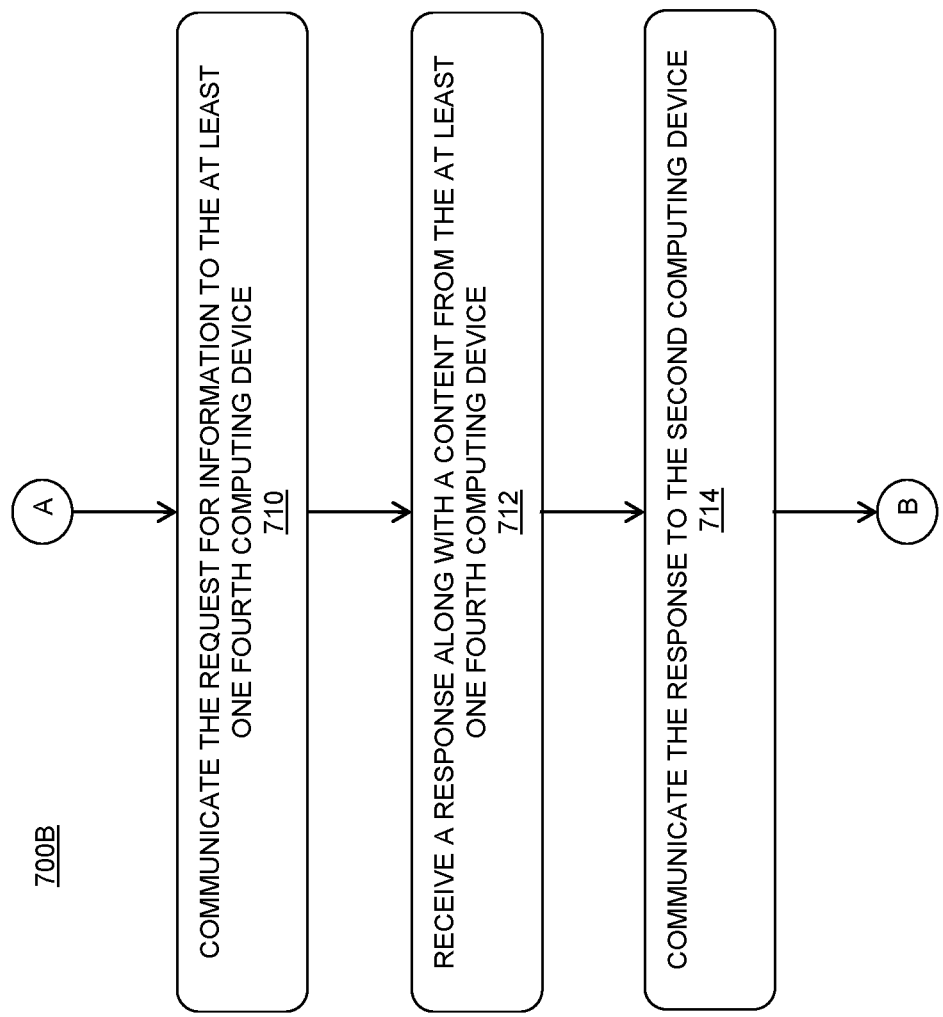
Figure 12C:
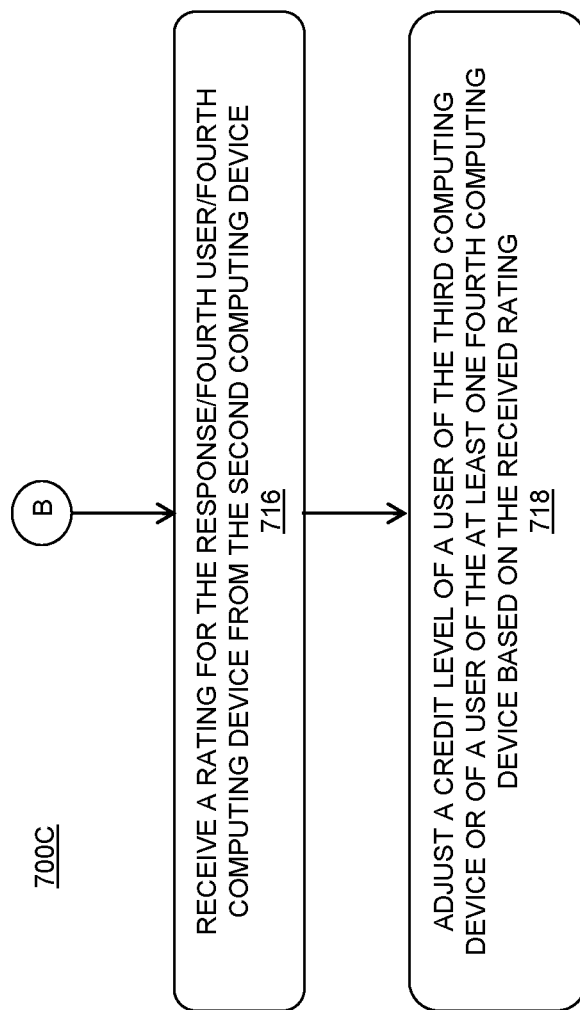

FIGS. 12A-12C illustrate a flowchart of an example method 700A-700C for finding a computing device for directing a request for information based on an analysis of the request for information in a network, in accordance with an embodiment of the present disclosure. As discussed with reference to FIG. 1, the first computing device 102 includes the information sharing manager being configured to enable sharing or exchange of information among multiple computing devices i.e. the second computing device 106 and the third computing devices 108A-108N. As further discussed herein, the first computing device 102 includes the one or more processors 212, the user interface 214 and the memory 216. The information sharing manager 104 includes the request processing module 202, the communication module 204, the response managing module 206, the ranking managing module 208, and the credit level managing module 210. The first computing device 102 may be configured to receive multiple request for information from the second computing device and forward the requests to the third computing devices 108A-108N based on a determination as discussed in FIG. 2. Based on an analysis of the request for information the first computing device 102 may determine one or more third computing devices of the third computing devices 108A-108N.

At step 702, response credentials for each of a number of computing devices such as, the second computing device 106, and the third computing devices 108A-108N, are maintained or stored. In some embodiments, the response managing module 206 maintains the response credentials. Examples of the response credentials may include, but are not limited to, correctness of the response, usefulness of the response, a time taken for sending the response, and so forth. The first computing device 102 may store and maintain response credentials for each of the computing devices i.e. the second computing device 106, the third computing devices 108A-108N, and so forth.

At step 704, a request for information is received from the second computing device 106. In some embodiments, the request for information is received at the communication module 204 of the first computing device 102. The request processing module 202 may process the request and determine one or more of the third computing device 108A-108N for communicating the request. At step 706, the request for information may be communicated to the determined third computing device 108. In some embodiments, the communication module 204 may be configured to communicate the request for information to the determined third computing device 108.

At step 708, the communication module 204 may receive an identification information of the fourth computing device 116 from the third computing device 108. In some embodiments, the third computing device 108 may hire the fourth user 118 or the fourth computing device 116 for responding to the requests on behalf of the third computing device 108. Then at step 710, the request for information may be communicated to the fourth computing device 116 by the communication module 204.

At step 712, the communication module 204 may receive a response along with content, for example an advertisement, from the fourth computing device 116. At step 714, the communication module 204 may communicate the response along with the content to the second computing device 106. Further, the second computing device 106 may assign a rating or ranking for the response by evaluating the response based on one or more response credentials. The response evaluating module 312 may evaluate the response at the second computing device 106. The rating may be sent to the first computing device 102 by the communication module 304 of the second computing device 106.

Thereafter, at step 716 the communication module 204 receives the rating or ranking for the response or the fourth user 118 or the fourth computing device 116 from the second computing device 106. Then at step 718, the credit level managing module 210 may adjust a credit level of the fourth user 118 associated with the fourth computing device 116 based on the received rating or ranking. Throughout the description the terms ranking and the rating are being used interchangeably as they refer to same meaning. In an example of ranking of the third user (or other third users 114A-114N), a weighted sum model (WSM) may be used for determining a score for each of some or all users (or third users 114A-114N). The users may be ranked based on their score. For example, a user may be ranked higher than another user if the user's score is higher than the other user. Conversely, a user may be ranked lower than another user if the user's score is lower than the other user.

Figure 13A:
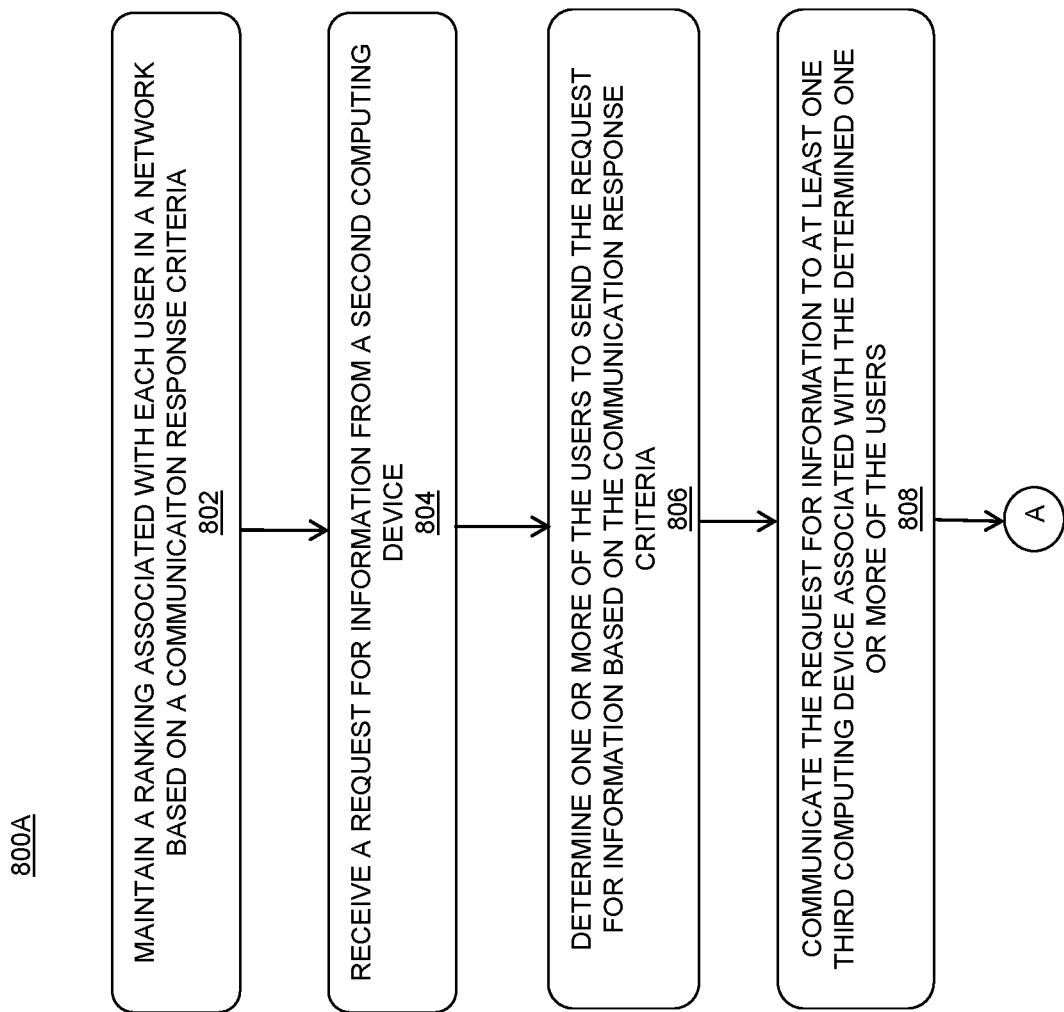
FIGS. 13A-13B illustrate a flowchart of another example method for finding a computing device for directing a request for information to the computing device based on an analysis of the request for information in a network in accordance with embodiments of the present disclosure.
Figure 13B:
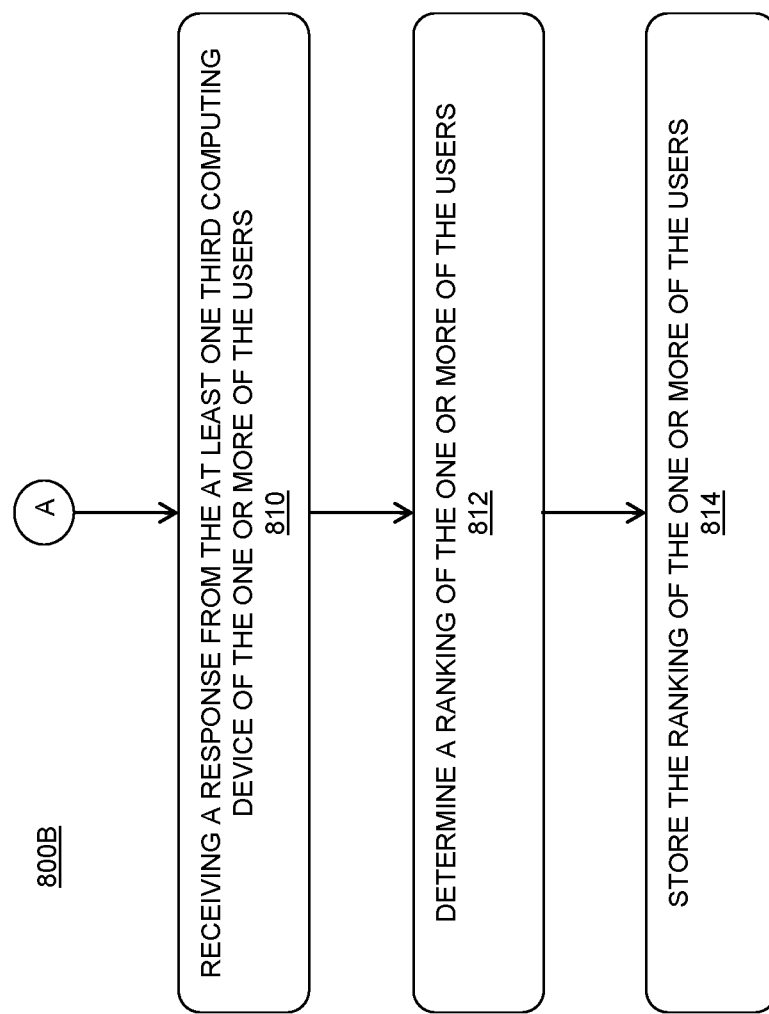

FIGS. 13A-13B illustrate a flowchart of another example method 800A-800B for finding a computing device (such as the third computing device 108) for directing a request for information to the computing device based on an analysis of the request for information in a network such as the network 110, in accordance with embodiments of the present disclosure. As discussed with reference to FIG. 1, the first computing device 102 includes the information sharing manager being configured to enable sharing or exchange of information among multiple computing devices i.e. the second computing device 106 and the third computing devices 108A-108N. As further discussed with reference to FIG. 2, the first computing device 102 includes the one or more processors 212, the user interface 214 and the memory 216. The information sharing manager 104 includes the request processing module 202, the communication module 204, the response managing module 206, the ranking managing module 208, and the credit level managing module 210. The first computing device 102 may be configured to receive multiple request for information from the second computing device and forward the requests to the third computing devices 108A-108N based on a determination as discussed in FIG. 2. Based on an analysis of the request for information the first computing device 102 may determine one or more third computing devices of the third computing devices 108A-108N.

At step 802, ranking associated with each of the users such as the second user 112, third users 114A-114N, and the fourth user 118 are maintained or stored. The ranking is based on a number of communication response credentials as discussed above. In some embodiments, the ranking managing module 208 maintains the ranking credentials. The ranking may be within a range of 1-10, where 1 being the best and 10 being worst or vice versa. Examples of the response credentials may include, but are not limited to, correctness of the response, usefulness of the response, a time taken for sending the response, and so forth. The first computing device 102 may store and maintain response credentials for each of the computing devices i.e. the second computing device 106, the third computing devices 108A-108N, and ranking of the users, and so forth. In an example of ranking of the third user (or other third users 114A-114N), a weighted sum model (WSM) may be used for determining a score for each of some or all users (or third users 114A-114N). The users may be ranked based on their score. For example, a user may be ranked higher than another user if the user's score is higher than the other user. Conversely, a user may be ranked lower than another user if the user's score is lower than the other user.

At step 804, a request for information is received from the second computing device 106. In some embodiments, the request for information is received by the communication module 204 of the first computing device 102. At step 806, the request processing module 202 may process the request and determine one or more of the third users 114A-114N for communicating the request. Hereinafter, the determined one or more of the third users 114A-114N may be referred as the determined third user 114. At step 808, the request for information may be communicated to the third computing device 108 associated with the determined third user 114. In some embodiments, the communication module 204 may be configured to communicate the request for information to the third computing device 108 associated with the determined third user 114.

At step 810, the communication module 204 may receive a response and/or content, for example an advertisement, from the third computing device 108 of the determined third user 114.

At step 812, the ranking managing module 208 may determine a ranking for the user (or one or more users 114A-114N responding to the request for information) based on an analysis of the response.

Thereafter, at step 814, the ranking managing module 208 may store the ranking of the user 114 (or the one or more users 114A-114N).

Figure 14A:
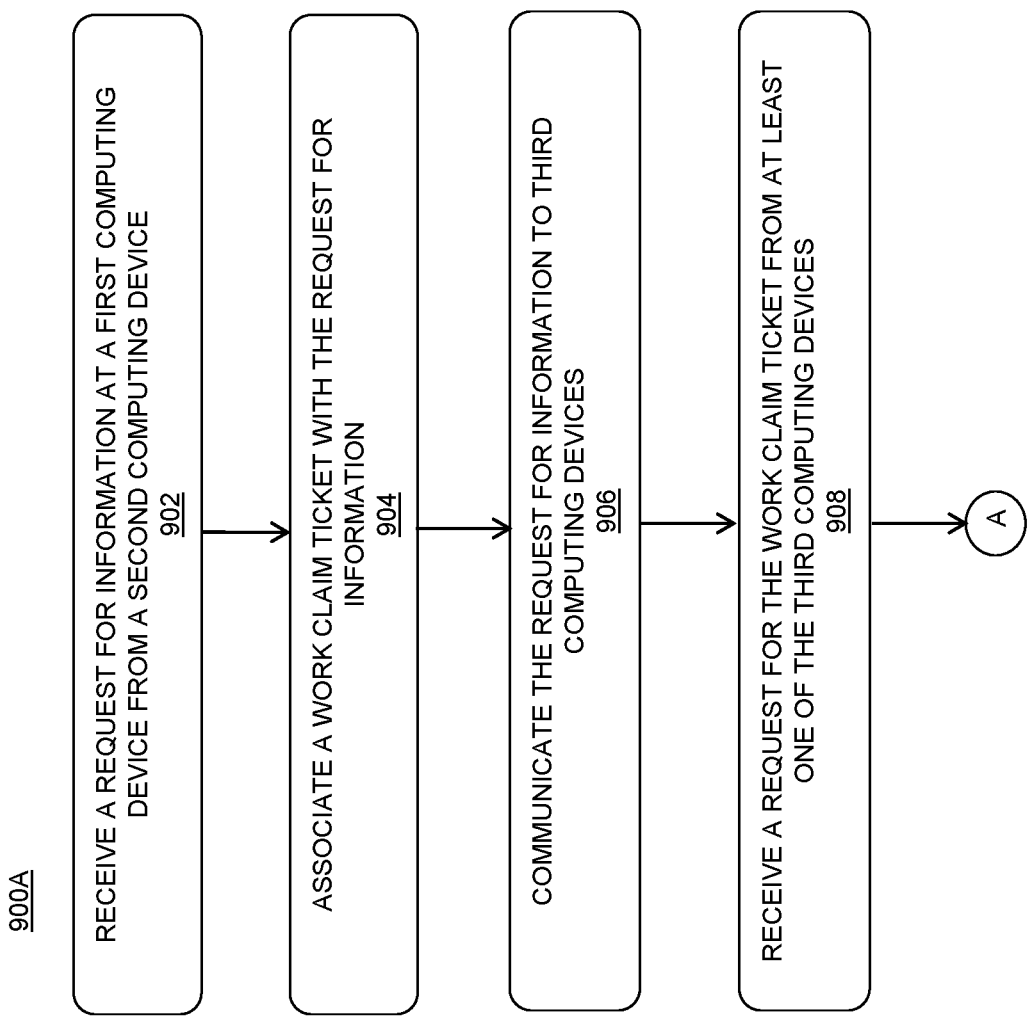
FIGS. 14A and 14B illustrate a flowchart of another example method for sharing information in a network in accordance with embodiments of the present disclosure.
Figure 14B:
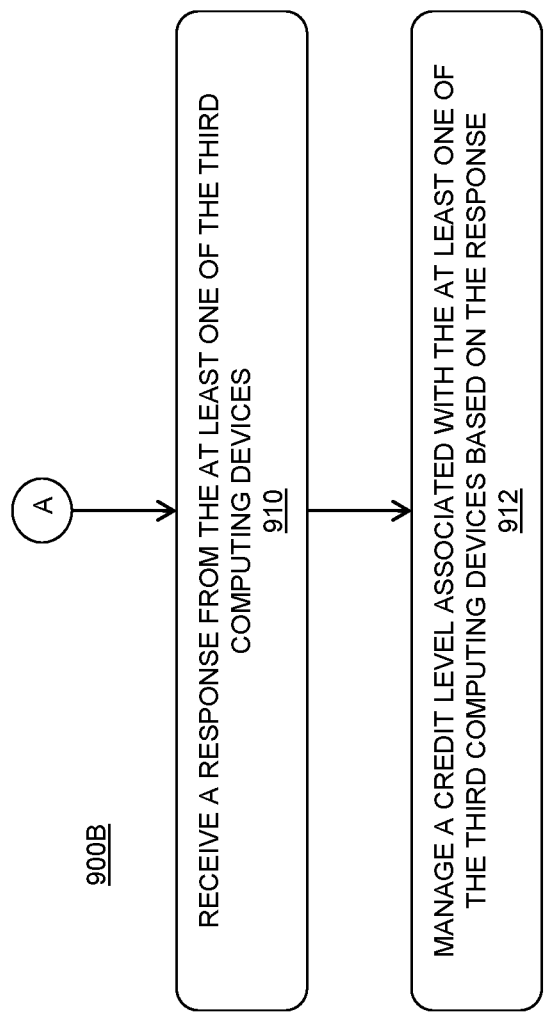

FIGS. 14A and 14B illustrate a flowchart of another example method 900A-900B for sharing information in a network, such as the network 110, in accordance with embodiments of the present disclosure. As discussed with reference to FIG. 1, the first computing device 102 may receive a number of requests from the second computing device 106 and is configured to forward the request for information to the one or more of the third computing devices 108A-108N in the network 110.

At step 902, the communication module 204 receives a request from the second computing device 106. The request for information may include a query. Then at step 904, the request processing module 202 may associate a work claim ticket with the request for information. The work claim ticket may include an identifier of the request for information, and so forth. Then at step 906, the request for information may be communicated to the third computing devices 108A-108N determined based on the analysis of the request for information by the request processing module 202. The communication module 204 may communicate the request for information to the third computing devices 108A-108N.

At step 908, the communication module 204 may receive a request for the work claim ticket from at least one third computing device 108 of the third computing devices 108A-108N. Then at step 910, the communication module 204 may receive a response from the at least one third computing device 108. Thereafter, the credit level managing module 210 may manage or adjust a credit level associated with the at least one third computing device 108 based on the received response.

Figure 15B:
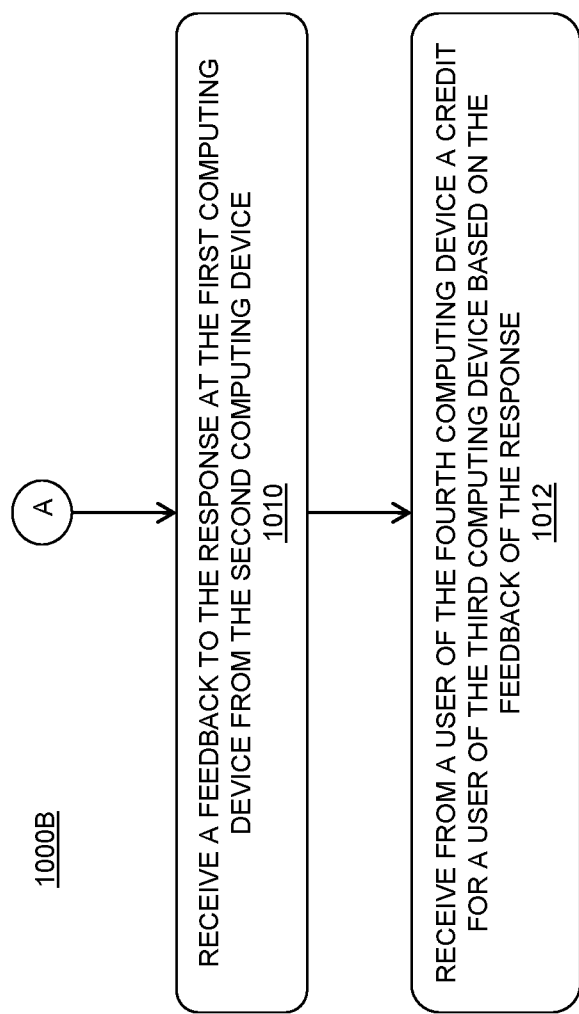

FIGS. 15A and 15B illustrate a flowchart of another example method 1000A-1000B for enabling sharing of information among multiple computing devices in a network in accordance with embodiments of the present disclosure. As discussed with reference to FIG. 1, the first computing device 102 may receive a number of requests from the second computing device 106 and is configured to forward the request for information to the one or more of the third computing devices 108A-108N in the network 110.

At step 1002, the communication module 204 of the first computing device 102 receives a request from the second computing device 106. The request for information may include a query. In an exemplary scenario, the first computing device 102 can be a server located remotely, and the second computing device 106 can be a smart phone of the second user 112. The second user 112 may enter a request for best restaurants serving Lebanese cuisine in Greece at the user interface of the smartphone. Then, the request may be sent to the server via the network 110.

At step 1004, the request for information may be forwarded to at least one third computing device 108 determined based on an analysis of the request for information. In some embodiments, the request for information may be analyzed for determining the at least one third computing device 108 by the request processing module 202 and may be forwarded by the communication module 204. Then at step 1006, the communication module 204 from the determined third computing device 108 may receive a response along with content. The response and the content may be provided to the third computing device by the fourth computing device 116.

At step 1008, the communication module 204 communicates the response and the content to the second computing device 106. The second computing device may evaluate the response and provide a feedback about the response to the first computing device 102. At step 1010, the communication module 204 receives the feedback for the response from the second computing device 106. Thereafter, the first computing device 102 receives a credit for the third user 114 of the third computing device 108 based on the feedback of the response. The fourth user 118 may send the credit for the third user 114 based on the feedback of the response. The feedback may include a rating or ranking of the fourth computing device 116 or the associated fourth user 118.

Figure 16:
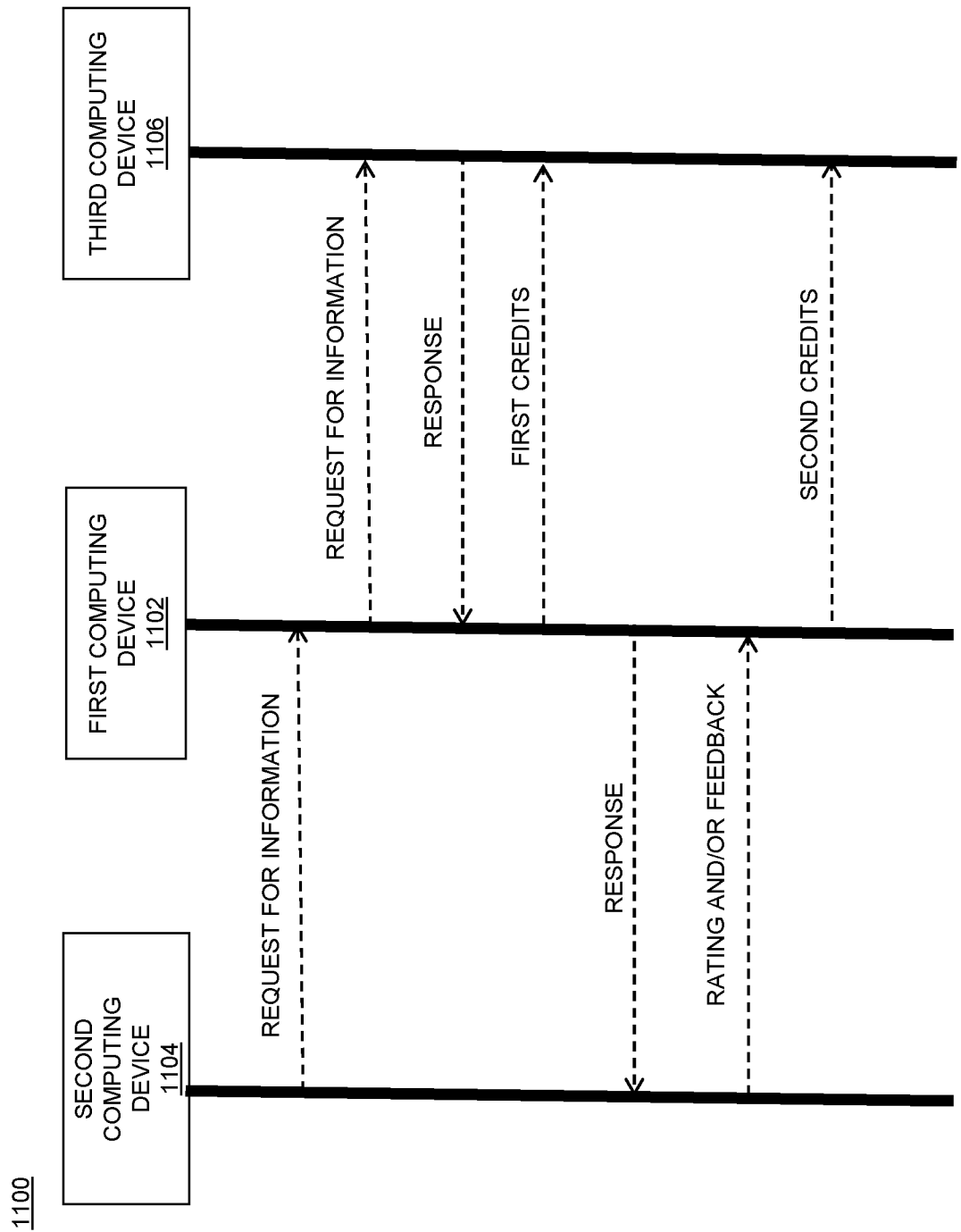
FIG. 16 is a message flow diagram illustrating flow of messages among a number of computing devices for sharing information in a network, in accordance with an embodiment of the present disclosure.

FIG. 16 is a message flow diagram 1100 illustrating flow of messages among a number of computing devices for sharing information in a network, in accordance with an embodiment of the present disclosure. As shown, a first computing device 1102 can receive a request for information from a second computing device 1104. The first computing device 1102 may analyze the request for information and determine a third computing device 1106 for forwarding the request for processing. The first computing device 1102 may then forward the request for information to the determined the third computing device 1106. In some embodiments, the third computing device 1106 may receive additional information such as a work claim ticket from the first computing device 1102. Here we have shown only one third computing device 1106, but a person skilled in the art will appreciate that the request for the information can be sent to multiple third computing devices 1106.

The third computing device 1106 can generate a response for the request for information based on one or more inputs from a third user of the third computing device 1106. The response is then sent to the first computing device 1102. The first computing device 1102 then may adjust a credit level of the third computing device 1106 based on the received response by giving first credits to the third computing device 1106.

Thereafter, the first computing device 1102 forwards the response to the second computing device 1104. The second computing device 1104 may evaluate the response and may provide a ranking/rating to the third user or the third computing device 1106. The second computing device 1104 may send a ranking/rating and/or a feedback of the response to the first computing device 1102. In an example of ranking of the third user (or other users), a weighted sum model (WSM) may be used for determining a score for each of some or all users. The users may be ranked based on their score. For example, a user may be ranked higher than another user if the user's score is higher than the other user. Conversely, a user may be ranked lower than another user if the user's score is lower than the other user. In some embodiments, the second computing device 1104 may determine the ranking based on one or more response credentials. Examples of the response credentials may include such as, but not limited to, correctness of the response, usefulness of the response, a time taken for sending the response, and so forth.

The first computing device 1102 may further adjust the credit level of the third computing device 1106 and/or of the third user by giving second credits to the third computing device 1106 based on the received ranking/rating and/or feedback from the second computing device 1104. In some embodiments, no credits may be given to the third computing device 1106, for example, when the response is evaluated as bad or have a negative or low ranking.

Figure 17:
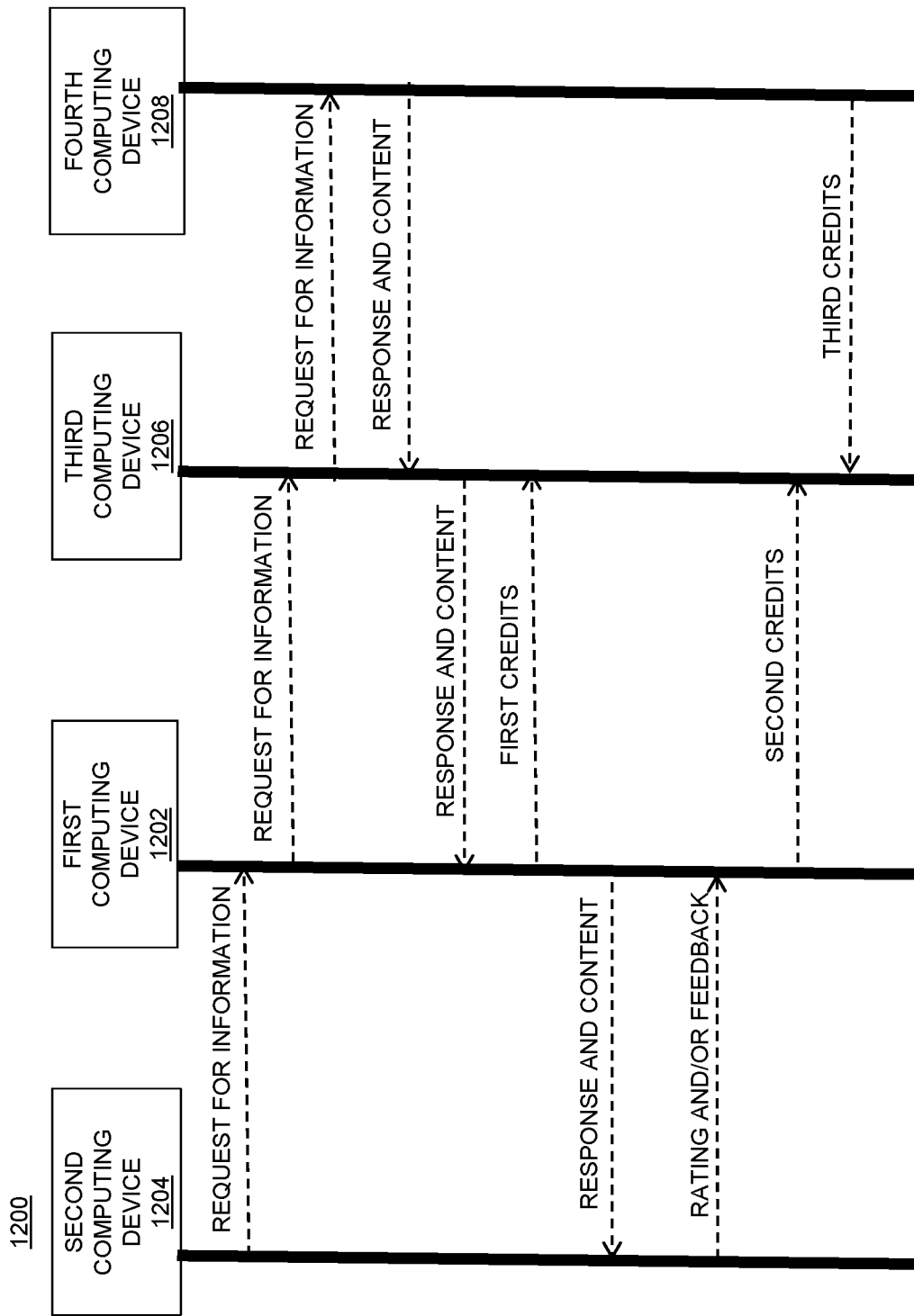
FIG. 17 is a message flow diagram illustrating flow of messages among multiple computing devices for sharing information in a network in accordance with another embodiment of the present disclosure.

FIG. 17 is a message flow diagram 1200 illustrating flow of messages among multiple computing devices for sharing information in a network in accordance with another embodiment of the present disclosure. As shown, a first computing device 1202 can receive a request for information from a second computing device 1204. The first computing device 1202 may analyze the request for information and determine a third computing device 1206 for forwarding the request for processing. The first computing device 1202 may then forward/communicate the request for information to the determined third computing device 1206. FIG. 17 shows only one third computing device 1206, but a person skilled in the art will appreciate that the request for the information can be sent to multiple third computing devices 1206. In some embodiments, the third computing device 1206 may receive additional information such as a work claim ticket from the first computing device 1202.

As shown, the third computing device 1206 may forward the request for information to a fourth computing device 1208. The fourth computing device 1208 may generate a response for the request for information based on one or more inputs from a fourth user of the fourth computing device 1208. The response and/or content may be then sent to the third computing device 1206. The first computing device 1202 then may adjust a credit level of the third computing device 1206 based on the received response by giving first credits to the third computing device 1206.

Thereafter, the first computing device 1202 forwards the response and/or content to the second computing device 1204. The content may be an advertisement. The second computing device 1204 may review and evaluate the response and may provide a ranking/rating to the third user or the third computing device 1206. The second computing device 1204 may send a ranking/rating and/or a feedback of the response to the first computing device 1202. In an example of ranking of the third user (or other users), a weighted sum model (WSM) may be used for determining a score for each of some or all users. The users may be ranked based on their score. For example, a user may be ranked higher than another user if the user's score is higher than the other user. Conversely, a user may be ranked lower than another user if the user's score is lower than the other user. In some embodiments, the second computing device 1204 may determine the ranking based on one or more response credentials. Examples of the response credentials may include such as, but not limited to, correctness of the response, usefulness of the response, a time taken for sending the response, and so forth.

The first computing device 1202 may further adjust the credit level of the third computing device 1206 and/or of the third user by giving second credits to the third computing device 1206 based on the received ranking/rating and/or feedback from the second computing device 1204. In some embodiments, no credits may be given to the third computing device 1206, for example, when the response is evaluated as bad or have a negative or low ranking.

In some embodiments, the fourth computing device 1208 also give some credits such as third credits to the third computing device 1206. The third credits may be in form of money or other services from the fourth computing device 1208.

In accordance with embodiments of the present disclosure, users may be anonymous to each other. The computing device 102, for example, may store identifying information (e.g., name, email address, or phone number) for users but may prevent it from being distributed to others. Any type of identifying information may be limited to credit level information or ranking information as described herein.

Users may register with the system using any suitable technique. For example, a user may select a user name and password for registering and logging into the system. Other information, such as a name, mailing address, email address, billing information, or the like, may be provided when logging in. Suitable social networking services, such as FACEBOOK® social networking service, may be used for registering and logging into the system as will be understood by those of skill in the art. Such services may also be used for monitoring and controlling communications among users (e.g., requests and responses) to prevent or otherwise control harassments or offensive communications among users.

Figure 18:
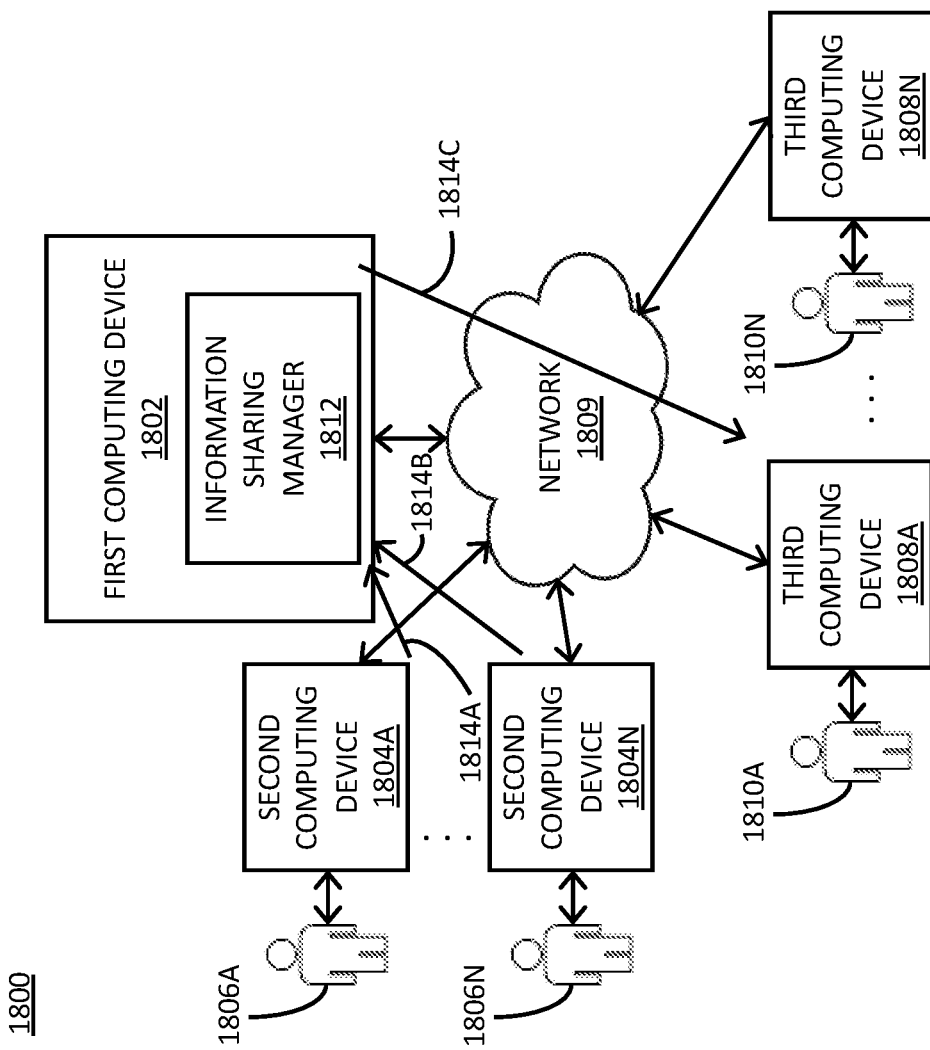
FIG. 18 is a schematic diagram of an example system within which various components may function in accordance with embodiments of the present disclosure.

In accordance with embodiments, multiple requests for information received from multiple different computing devices may be used to generate a joined request for information. The joined request may be communicated to one or more other computing devices in order to receive a response to the requests for information. Users at the other computing device(s) may be presented with the joined request and each input a response. The response of each of the other computing device(s) may be communicated to the computing devices that originated the requests. As an example, FIG. 18 illustrates a schematic diagram of an example system 1800 within which various components may function in accordance with embodiments of the present disclosure. Referring to FIG. 18, the system 1800 includes a number of computing devices, such as first computing device 1802, multiple second computing devices 1804A-1804N each associated with a different user 1806A-1806N, and multiple third computing devices 1808A-1808N each associated with a different user 1810A-1810N. The computing devices 1802, 1804A-1804N, and 1808A-1808N may be configured to communicate with each other via one or more communications networks 1809. Although a limited number of computing devices are shown in FIG. 18, it should be understood that there can be any number of computing devices that can communicate with each other via the network(s) 1809. For example, there are 1-N computing devices 1804 and 1808, and N for each group of computing devices may be any suitable number of computing devices. Users 1806A-1806N and 1810A-1810N may interact with their respective computing device to enter input, such as input described by examples provided herein.

As an example for the embodiments shown and described for FIG. 18, a computing device may be configured to communicate text, images, video, or other data to another computing device as will be understood by those of skill in the art. Also, as will be understood by those of skill in the art, a user may use the user interface of his or her associated computing device for interacting with the computing device. For example, an application may reside on a computing device and the associated user may be able to interact with a user interface presented by the application as will be understood by those of skill in the art.

It is noted that each user shown in FIG. 18 may have specialized expertise, information, and knowledge. It is a function of the system 1800 to facilitate and promote the networking of users 1806A-1806N and 1810A-1810N for the sharing and exchange of such information, knowledge, and expertise. More particularly, it is a function of the system 1800 to serve user requests for other users' information, knowledge, and expertise, and to communicate the requests to other selected users. In addition, it is a function of the system 1800 to promote responses from the other users to requests. Further, the system 1800 can provide for the receipt of others' specialized information, knowledge, and expertise of others in a timely manner while also promoting the others to provide such specialized information, knowledge, and expertise. Details about the implementation of these and other functions may be implemented by the system 1800 are described herein. Also, other example systems and methods for implementing these and other functions are described herein.

The computing devices may be any suitable computing device configured to communicate with the network(s) 1809 and communicate with other computing devices the network(s) 1809. The network(s) 1809 may be a wired network, a wireless network or combination thereof. Example computing devices include, but are not limited to, a smartphone, a desktop computer, a laptop computer, a smart phone, a personal digital assistant (PDA), a tablet computer, a smart television, a television, and the like.

In embodiments, the first computing device 1802 may be a server configured to enable other computing devices 1804A-1804N and 1808A-1808N to interact with each other as described herein. Also, it should be understood that the functionality of the first computing device 1802 may be implemented by one or more computing devices, such as multiple servers either distributed or operating together in a server farm. Further, the computing devices 1804A-1804N and 1808A-1808N may each include an associated display device such as, a screen for displaying information. A user of a computing device may access a browsing application such as, but not limited to, GOOGLE® Chrome, Internet Explorer, Mozilla Firefox, and so forth on the computing device. In another example, the computing device 1802 may be an application server configured to manage and interact with applications residing on computing devices 1804A-1804N and 1808A-1808N.

In an example use, two or more of users 1806A-1806N may request information from other computing devices 1802, 1808A-1808N in the network(s) 1809 by using their respective computing device 1804A-1804N. For example, a user interface of each computing device 1804A-1804N may be configured to present an interface for its user to enter information for communicating a request to the first computing device 1802. The users 1806A-1806N may enter the same request or a similar request into their respective computing device 1804A-1804N. In accordance with embodiments, the first computing device 1802 may be configured to associate the received requests based on information contained in the received requests. For example, the text in the requests may be the same or have similar terms or phrase(s) such that the requests are the same or meet a predetermined similarity criterion or criteria. For requests that are the same or that meet the predetermined similarity criterion or criteria, the first computing device 1802 may generate a joined request for information based on these requests. The first computing device 1802 may select or determine one or more of the computing devices 1808A-1808N to send the joined request based on an analysis of the received request. Subsequently, the first computing device 1802 may communicate the joined request for information to the determined one or more of the computing devices 1808A-1808N. Each user at a computing device 1808A-1808N receiving the joined request may enter one or more inputs into a user interface of his or her respective computing device. The entered input(s) may be communicated by the respective computing devices 1808A-1808N to the first computing device 1802. Subsequently, the first computing device 1802 may communicate some or all of the received responses (e.g., the inputs) to the computing devices 1804A-1804N that originated the requests. In this way, the same or similar requests from multiple sources (e.g., users) may be joined or combined into a single request that is distributed to multiple potential responders who may each enter a response for communication to the sources of the requests. Thereby, efficiency of both the users and the system 1800 can be improved due to the joining of the same or similar requests into a single request for management.

In accordance with embodiments, the first computing device 1802 may include an information sharing manager 1812 configured to receive requests for information from a plurality of second computing devices, to associate the received requests based on the information, to generate a joined request for information based on the received requests for information, to determine at least one third computing device based on the received requests for information, to communicate the joined request for information to the determined at least one third computing device, to receive a response corresponding to the joined request for information from the determined at least one third computing device, and to communicate the response to the second computing devices. The information sharing manager 1812 may be hardware, software, firmware, or combinations thereof for implementing the functionality described herein.

In an example use case, each of the users 1810A-1810N may be associated with a credit level that may be adjusted in accordance with embodiments disclosed herein to dynamically change one or more weighted pathways to one or more of the computing devices 1808A-1808N. The first computing device 1802 may store credit level information for users 1810A-1810N and direct joined requests for information to the users 1810A-1810N via the computing devices 1808A-1808N based on the dynamically changed weighted pathways. Table 2 below provides an example of data related to credit levels of users that may be stored by the information sharing manager 1812 shown in FIG. 18. It is noted that this stored data relates to search engines such as, but not limited to, a web search engine (e.g., GOOGLE® search engine, BING® search engine, and the like), a search engine of an advertisement hosting (e.g., Craiglist website or application), a search engine for a retailer's website (e.g., a car dealership, a furniture store, a clothing store, etc.), a search engine for a video and/or photo hosting or sharing website or application, a search engine for a social media website or application (e.g., FACEBOOK®, TWITTER®, LINKEDIN®, etc.), and the like.

Table 2 below shows an example of various users that are each identified and associated with one or more credit levels, achievement levels groups, and website and/or applications. This data may be, for example, stored in a suitable database accessible by the information sharing manager 1812 of the first computing device for use in implementing functionality in accordance with embodiments of the present disclosure.

TABLE 2

| User ID | Category Type | Credit Level | Achievement Level Group | Website or Application |
|---|---|---|---|---|
| User 00001 | Automobile Sales | 900 | Black | Fred's Car Dealership |
|  | Boat Sales | 200 | Green | Southeast Marina |
| User 00002 | Word Processing Help | 700 | Black | Word Processing Application |
|  | Spreadsheet Help | 75 | White | Spreadsheet Application |
| User 00003 | Movie Trivia | 500 | Brown | Web Search Engine Application and Website; and Social Media Application and Website |
| User 00004 | Science | 915 | Black | Web Search Engine Application and Website; and Social Media Application and Website |
| User 00005 | University Entrance Information | 750 | Black | Web Search Engine Application and Website; and Social Media Application and Website |

In Table 2 for example, User 00001 has credit levels of 900 and 200, respectively, in the "Automobile Sales" and "Boat Sales" categories, respectively. As an example use case, the information sharing manager 1812 may receive a request for information and determine a category based on the request and/or a context of the request. In an example, a request may be received from the user 1806A at the computing device 1804A, and the request may be entered by the user 1806A in a web search engine application residing on the computing device 1804A. The request, in this example, may be the text "Interested in purchasing 2015 or newer Honda Accord". The computing device 1804A may communicate the request (including some of the text, all of the text, or some other indicator of the meaning of the text) to the computing device 1802 where the information sharing manager 1812 may analyze request. In the analysis, the information sharing manager 1812 may determine that the request is related automobile sales due to the text "Interested in purchasing 2015 or newer Honda Accord" including one or more terms and phrasing indicating interest in purchasing a car, which in this case is a Honda Accord of a year model 2015 or newer. The information sharing manager 1812 may apply natural language processing to determine that the request is associated with the "Automobile Sales" category and/or one or more other categories that may be related. Subsequent to one or more categories are associated with the request, the information sharing manager 1812 may determine a pathway for communicating the request to another user. For example, User 00001 is associated with the "Automobile Sales" category, so therefore User 00001 may be a candidate for communicating the request to. The information sharing manager 1812 may manage pathways for communication of requests based on credit levels of users. In this example, the information sharing manager 1812 may determine that User 00001's credit level and/or other criteria meets a predetermined criteria such that a pathway is utilized to communicate the request originating at the computing device 1804A to a computing device (e.g., computing device 1808A) associated with User 00001 (e.g., user 1810A). For example, a setting at the information sharing manager 1812 may indicate that the credit level of a user must exceed 700 in order for a request to be communicated in the category of "Automobile Sales". It is also noted that the computing device 1802 or another device may have suitable information (e.g., an identifier of the computing device associated with User 00001)) for communicating a request to a computing device of the user identified as User 00001. The computing device 1808A may receive the request, and the request may be presented to the user 1810A (i.e., the user identified as User 00001) via a suitable user interface such as a display. Subsequently, the user 1810A may enter a response to the request for communication to the originator of the request, i.e., user 1806A at the computing device 1804A (the user associated with identifier User 00001). In this example, the user 1810A may be aware of an automobile that matches or nearly matches the purchase interest of the user 1806A. The user 1810A response may be input with information about a potential seller of an automobile. For example, the input may be "I am aware of a seller of a 2017 Honda Accord in your area. Attached are pictures of the vehicle". The response may be communicated by any suitable technique such as via the computing device 1802 and/or other devices or network(s). Also, suitable contact information may be exchanged such that the two users may communicate to continue an exchange about the potential automobile sale. In an example, contact information (e.g., email addresses, phone numbers, and the like) may only be exchanged if authorized by the user 1806A in accordance with a suitable technique. The user's 1810A credit level may be increased based on his or her helpfulness with the request in accordance with embodiments of the present disclosure. Continuing the example, the user 1810A may continue as a consultant during an automobile purchase and provide response to condition information about an automobile, its price (e.g., negotiated price), and the like.

Continuing the example of User 00001, a request in the category of "Automobile Sales" may be received via a particular website. In this particular example, the website for the company "Fred's Car Dealership" may be configured to receive requests. For example, the website may be configured to display or otherwise present a user interface (e.g., a text box) such that a user may enter a request. The request may subsequently be sent to the User 00001 in accordance with examples and embodiments disclosed herein.

Continuing with the example of Table 2, User 00001 may receive requests that are in the category of "Boat Sales". Similar to received requests in the category of "Automobile Sales," User 00001 may provide information related to sales, but rather the information may be about finding or selling a boat, rather than an automobile.

Continuing with the example of Table 2, User 00002 may receive requests in the category "Word Processing Help" via word processing application. For example, a requester may enter the input "How to add images from a PDF file?". The request may be communicated to User 00002 for response in accordance with embodiments and examples disclosed herein. Similarly, a request may be entered into a spreadsheet application, and the request may be subsequently communicated to User 00002 for response in accordance with embodiments and examples disclosed herein.

Continuing with the example of Table 2, User 00003 may receive requests in the category "Movie Trivia" via word processing application. For example, a requester may enter a question about an Academy Award winner of a particular year. The question may be entered into a web search engine application or its website, or a social media application or its website. The request may be communicated to User 00003 for response in accordance with embodiments and examples disclosed herein.

Continuing with the example of Table 2, User 00004 may receive requests in the category "Science" via word processing application. For example, a requester may enter a question about astronomy. The question may be entered into a web search engine application or its website, or a social media application or its website. The request may be communicated to User 00004 for response in accordance with embodiments and examples disclosed herein.

Continuing with the example of Table 2, User 00005 may receive requests in the category "University Entrance Information" via word processing application. For example, a requester may enter a question about grade and standardized test results averages for entrance into a particular university. The question may be entered into a web search engine application or its website, or a social media application or its website. The request may be communicated to User 00005 for response in accordance with embodiments and examples disclosed herein.

Figure 19:
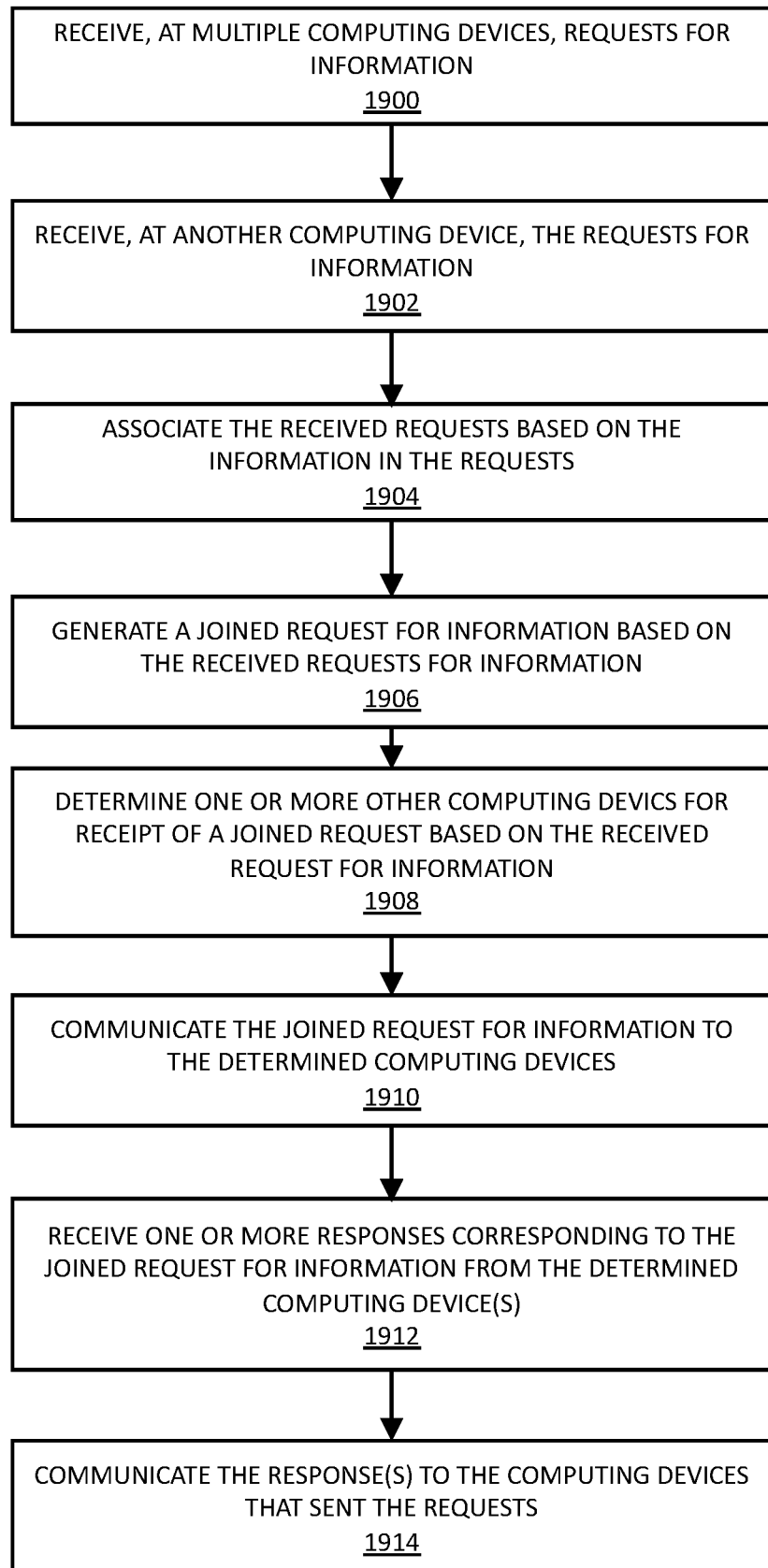
FIG. 19 is a flowchart of an example method for requesting information among computing devices in a network in accordance with embodiments of the present disclosure.

FIG. 19 illustrates a flowchart of an example method for requesting information among computing devices in a network in accordance with embodiments of the present disclosure. The example method is described by example as being implemented by the system 1800 shown in FIG. 18, but it should be understood that the method may be implemented by any other suitable system.

Referring to FIG. 19, the method includes receiving 1900, at multiple different computing devices, requests for information. For example, in FIG. 18 two or more users among users 1806A-1806N may each enter into their respective computing device a request for information. The different requests may be entered at the same time or different times. For example, the users may each interact with their respective computing device to request information about how to correct a particular error occurring on a particular computer application. As an example, two or more users may have a problem with converting a word processing document of one type to another file type, such as PDF, in a particular word processing application. The users may each interact with their respective computing device to enter their question or other indication of a request for information. For example, a user may enter text indicating the request, identify a category (e.g., "Word Processing Application"), a screenshot showing an error condition or other indicator, the like, and combinations thereof. The computing device of each user may subsequently communicate the entered request to another computing device, such as computing device 1802 for processing in accordance with embodiments of the present disclosure.

The method of FIG. 19 includes receiving 1902, at another computing device, the requests for information. Continuing the aforementioned example, the computing device 1802 may receive the communicated requests for information about converting a word processing document of one type to another file type, such as PDF, in a particular word processing application. These requests may be communicated to first computing device 1802, via network 1809, from the two computing devices among 1806A-1806N that received the requests as input. In this example, the pathways of these requests are indicated by arrows 1814A and 1814B. It is noted that although only two pathways are shown in this example, it should be understood that multiple different pathways representative of separate communications for requests for information may be communicated to a computing device, such as computing device 1802. In this example as described herein, the pathways are merged or joined at the computing device 1802 to form one or more joined requests for information based on the information or content in the requests.

The method of FIG. 19 includes associating 1904 the received requests based on the information in the requests. Continuing the aforementioned example, the information sharing manager 1812 of the computing device 1802 shown in FIG. 18 may associate received requests based on the information in the requests associated with pathways 1814A and 1814B. In accordance with embodiments, the information sharing manager 1812 may determine whether content in the received request one of matches or meets a similarity criterion or criteria; and may associate the received requests to each other in response to determining that the content in the received requests matches or meets the similarity criterion or criteria. For example, text in the requests may be the same or have similar terms or phrase(s) such that the requests are the same or meet a predetermined similarity criterion or criteria. For requests that are the same or that meet the predetermined similarity criterion or criteria, the first computing device 1802 may generate a joined request for information based on these requests. In other examples, the requests may be associated if they have been identified by their respective users as being in the same or similar categories.

The method of FIG. 19 includes generating 1906 a joined request for information based on the received requests for information. Continuing the aforementioned example, the information sharing manager 1812 may generate a joined request for information based on the received requests for information received on pathways 1814A and 1814B. In an example, a joined request for information may be a request for information that includes content contained in: one of the received requests that have been associated together (as in step 1904 for example), or some of all of the received requests that have been associated together (as in step 1904 for example). In another example, a joined request for information may be a request for information that includes content derived from one, some, or all of a combination of the received requests that have been associated together (as in step 1904 for example). Continuing the example about users requesting information about how to correct a particular error occurring on a particular computer application, a joined request generated based on these requests may include the entered text from only one of the requests. This is because this text may be sufficient context for a responder to understand the request since all of these requests related to the same question. In another example, a joined request may include content from two or more different requests. In the example about users requesting information about how to correct a particular error occurring on a particular computer application, a joined request may include the text contained in one received request and an image file contained in another received request. As an example, a joined request may include the text "How do I convert a Word document to a PDF file?" contained in one request, and may also include an image file showing an error message after an attempt by a user to convert a Word document to a PDF file. This combined information of the text of one request and an image included in another request may be helpful to a responder with providing an accurate response.

In an example of content in a joined request being derived from one, some, or all of a combination of the received requests that have been associated together, the joined request may be generated by applying one or more techniques to content of one or more of the received requests to generate different or altered content for inclusion in the joined request based on the received request(s). For example, the information sharing manager 1812 may apply a spell correction or grammar correction technique to text in one or more received requests for inclusion of the corrected text in the joined request. In another example, a language translation technique may be applied to improve readability of language in text, reduce redundancies (e.g., to improve efficiency of a responder in reading the text in a joined request), re-order presentation of text, or otherwise to improve the understanding of a joined request by a responder.

The method of FIG. 19 includes determining 1908 one or more other computing devices for receipt of a joined request based on the received request for information. Continuing the aforementioned example, the information sharing manager 1812 may determine one or more other computing devices for receipt of a joined request. The information sharing manager 1812 may determine recipients of the joined request in accordance with any suitable examples and embodiments for determining a recipient of a request as disclosed herein. As an example, one or more of the received requests may be associated with a category type, such as "Word Processing Help". In this example, the information sharing manager 1812 may determine to communicate the joined request of the aforementioned examples (e.g., the examples about how to correct a particular error occurring on a particular computer application) along a pathway to computing devices (e.g., among computing devices 1808A-1808N) that are associated with users (e.g., users 1810A-1810N) associated with the category type "Word Processing Help" and that users that also have a credit level above a particular credit level (e.g., above credit level 700). The information sharing manager 1812 may determine that one or more of the users 1810A-1810N meet these criteria and subsequently determine which among the computing devices 1808A-1808N are associated with these determined users.

The method of FIG. 19 includes communicating 1910 the joined request for information to the determined computing devices. Continuing the aforementioned example, the computing device 1802 may communicate, to the computing device(s) among the computing devices 1808A-1808N, the joined request. For example, the computing device 1802 may send the joined request to one or more of the computing devices 1808A-1808N that were determined in step 1908. As an example, the joined request may be communicated to the determined computing device(s) along a pathway in accordance with any suitable examples and embodiments for communicating a request. For example, the joined request may be communicated to one or more computing devices 1808A-1808N via one or more pathways. An example is shown in FIG. 18 as pathway 1814C to one of the computing devices 1808A-1808N, although it should be understood that duplicates of the joined request may be communicated to two or more of the computing devices 1808A-1808N in accordance with embodiments of the present disclosure.

The method of FIG. 19 includes receiving 1912 one or more responses corresponding to the joined request for information from the determined computing device(s). Continuing the aforementioned example, users 1810A-1810N at computing devices 1808A-1808N that are recipients of the joined request may be presented with content of the joined request, and subsequently enter input responsive to the joined request. In accordance with embodiments, a credit level of a user of one of the recipient computing devices 1808A-1808N may have his or her credit level adjusted based on a received response. The information sharing manager 1812 may adjust the credit level in accordance with embodiments of the present disclosure. Further, the information sharing manager 1812 may manage pathways from one or more of the computing devices 1804A-1804N and/or to one or more of the computing devices 1808A-1808N based on credit levels of one or more of the users 1810A-1810B in accordance with embodiments of the present disclosure. In accordance with embodiments, the information sharing manager 1812 may dynamically change pathway(s) based on a change to a credit level of one or more of the users 1808A-1808N. The entered responses at computing devices 1808A-1808N may be communicated to the computing device 1802 for receipt at information sharing manager 1812. The responses may include the input from the users at the recipient computing devices 1808A-1808N.

The method of FIG. 19 includes communicating 1914 the response(s) to the computing devices that sent the requests. Continuing the aforementioned example, the computing device may communicate the response(s) received from the computing devices 1808A-1808N to the computing devices among 1804A-1804N that sent the requests. The recipient computing devices 1804A-1804N may present the response(s) to respective users 1806A-1806N.

Further, regarding the method of FIG. 19, it is noted that credit levels of users 1810A-1810N that provided a response to the joined request may change based on their responses in accordance with embodiments of the present disclosure. Therefore, pathways to these users and others among users 1810A-1810N may dynamically change based on the change in credit levels. Additional requests for information to the groups of users 1810A-1810N may accordingly be directed based on these changed pathways. In accordance with embodiments, credit levels may be adjusted for response ratings received from users that receive responses from users 1810A-1810N.

Figure 20:
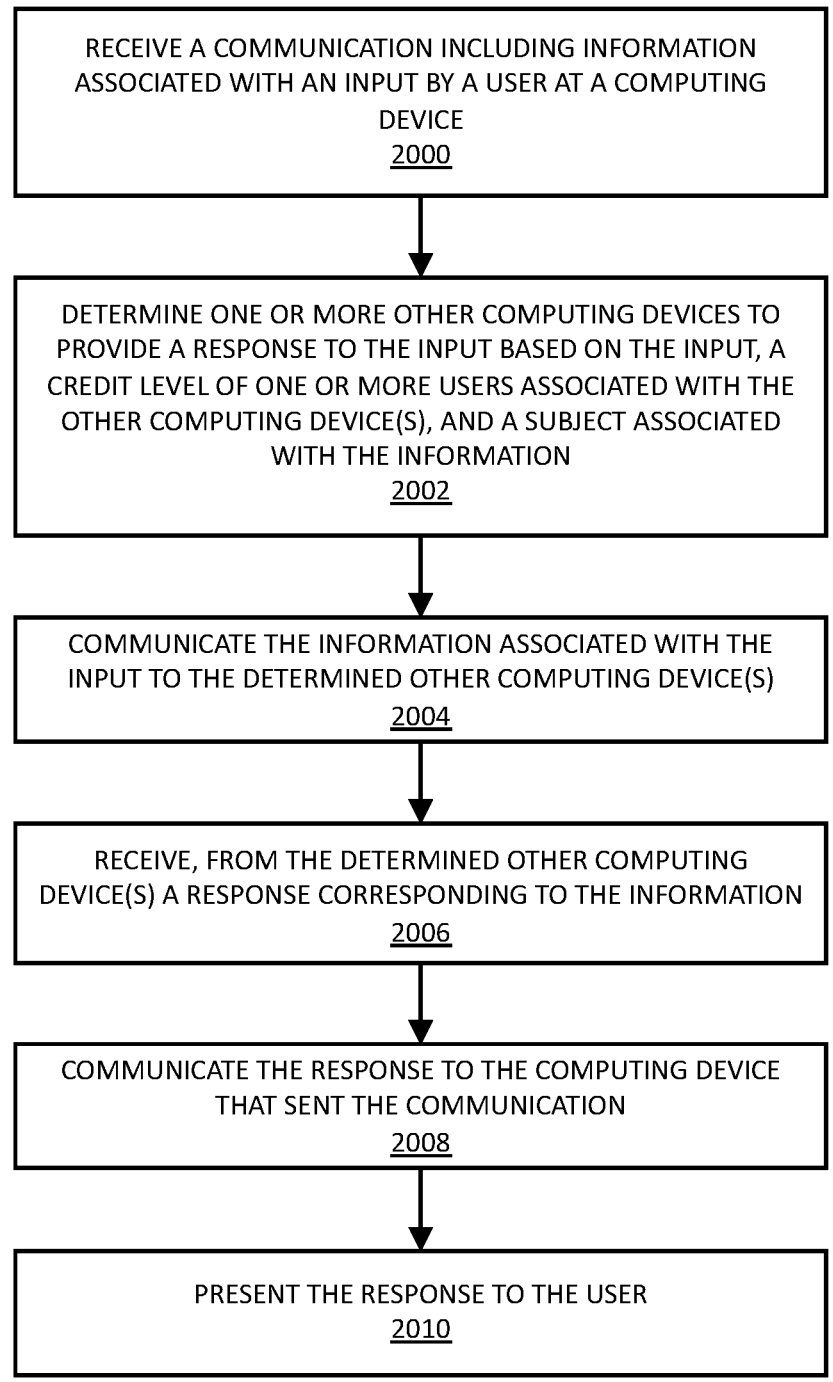
FIG. 20 is a flowchart of another example method for requesting information among computing devices in a network in accordance with embodiments of the present disclosure.

FIG. 20 illustrates a flowchart of another example method for requesting information among computing devices in a network in accordance with embodiments of the present disclosure. The example method is described by example as being implemented by the system 1800 shown in FIG. 18, but it should be understood that the method may be implemented by any other suitable system.

Referring to FIG. 20, the method includes receiving 2000 a communication including information associated with an input by a user at a computing device. For example, the user 1806A may enter into her or his respective computing device 1804A a request for information. As an example, the input may be entered into a search engine application (e.g., the GOOGLE® search engine application, the BING® search engine application, or the like residing on a desktop computer, a laptop computer, a tablet computer, a smartphone, or the like). As an example, the input may be entered into a text box of a search engine application for search of the Internet for content (e.g., websites) as will be understood by those of skill in the art, and also the input may be part of a request for information in accordance with embodiments of the present disclosure. In this example, a website search can be conducted by a search engine and the search results returned as understood by those of skill in the art, and also the input may be part of a request in accordance with embodiments of the present disclosure. In another example, the input may be entered into a social media application such as the FACEBOOK® application, the INSTAGRAM® application, or the like. The input entered into the application may be suitably communicated to the computing device 1802, where the input is received by the information sharing manager 1812. The computing device 1802 may be, for example, a server configured to manage and process user search engine input, user social media input, and the like.

The method of FIG. 20 includes determining 2002 one or more other computing devices to provide a response to the input based on the input, a credit level of one or more users associated with the other computing device(s), and a subject associated with the information. Continuing the aforementioned example, the information sharing manager 1812 may determine that the received input is a request for information. For example, the input may be entered into a social media application and include text posed as a question. In this example, based on the context and the text being in the form of a question, the information sharing manager 1812 may deduce that the input is a request for information. In another example, the information sharing manager 1812 may assume that the input is a request for information if input into a search engine application. In another example, the user may enter input to explicitly indicate that it is a request for information, such as by selecting input on the application for indicating that entered text or other input is a request for information from other users. In accordance with embodiments, the method of claim 20 may include analyzing the information associated with the input to determine the subject associated with the information. In another example, a subject of the input may be determined based on an explicit selection of subject by the user and/or by analysis of the input and context by the information sharing manager 1812. For example, natural language processing may be applied to determine that the subject of the input text "I need help with connecting to a local printer to print a document" relates to the subject of "Computer assistance". The subject may be suitably correlated to a category that is the same or similar in accordance with embodiments of the present disclosure. Based on the input, credit levels of other users, and the subject (which may correlate to a category as disclosed herein), the information sharing manager 1812 may determine one or more other computing devices (e.g., one or more of computing devices 1808A-1808N) to provide a response to the input in accordance with embodiments of the present disclosure. For example, as disclosed herein the request may be sent to computing device(s) of those user(s) associated with the category and who meet a particular credit level.

The method of FIG. 20 includes communicating 2004 the information associated with the input to the determined other computing device(s). Continuing the aforementioned example, the information may be communicated to the determined other computing device(s). For example, the communication may be an email, a text, a telephone call, or the like, and the communication may contain the information of the request or a suitable translation thereof such that the recipient user can understand the request. In an example, the information of the request may be presented to a recipient user on an application residing on the computing device such as, but not limited to, a search engine application, a social media application, or the like. For example, the user may log onto a search engine application and be registered for receiving requests from other users and for receiving credits in accordance with embodiments of the present disclosure. In another example, the user may log onto a social media application and be registered for receiving requests from other users and for receiving credits in accordance with embodiments of the present disclosure.

The method of FIG. 20 includes receiving 2006, from the determined other computing device(s) a response corresponding to the information. Continuing the aforementioned example, the user(s) at one or more of the computing devices 1808A-1808N may enter the input, and the computing device(s) may suitable communicate the response(s) to the computing device 1802 in accordance with embodiments of the present disclosure.

The method of FIG. 20 includes communicating 2008 the response to the computing device that sent the communication. Continuing the aforementioned example, the requester at computing device 1804A may receive the response. Further, the method of FIG. 20 includes presenting 2010 the response to the respective user. The results may be suitably presented on the user's computing device via, for example, a search engine interface or a social media interface. Further, for example, the user may input a review that can change the credit level of the responder(s) in accordance with embodiments of the present disclosure. In accordance with embodiments disclosed herein, the information sharing manager 1812 may manage one or more pathways for requesting information from the computing device(s) 1808A-1808N based on credit levels of users associated with the computing device(s) 1808A-1808N, and dynamically change the pathway(s) based on a change to the credit level(s) of the user(s) 1810A-1810N.

In accordance with embodiments, requests for establishing a connection for information may be received and processed by systems and methods disclosed herein. Example communication connections include, but are not limited to, a connection between users' computing devices for voice communications, a connection between users' computing devices for text communications, a connection between users' computing devices for video communications, the like, and combinations thereof. Example voice communication includes connection by a voice over Internet protocol (VoIP) technique. Example text communication includes connection by a text messaging technique (e.g., short messaging service (SMS)). Example video communication includes connection by a video conferencing technique. As an example, computing devices of users may be connected for communication based on analysis of a request for information entered by one of the users. A computing device for connection may be determined based on analysis of a request entered at another computing device and a credit level of a user at the computing device for connection. The request may be communicated to the computing device for connection, and a connection may be made upon acceptance of the request. Further, analysis data associated with the communication connection between the devices may be received, and a credit level of a user of the computing device for connection adjusted based on the analysis data.

As an example, FIG. 18 shows an example system 1800 that may receive requests for establishing a connection for information, that may establish the connection, and that may further implement the request in accordance with embodiments of the present disclosure. Referring to FIG. 18, the user 1806A may enter input into computing device 1804A a request for information. The request may be a request for establishing a communication connection for receipt of the information. The computing device 1804A may communicate the request to computing device 1802. The information sharing manager 1812 of computing device 1802 may determine one or more among computing devices 1808A-1808N based on analysis of the request and a credit level of one or more among users 1810A-1810N. The computing device 1802 may subsequently establish a communication connection between the computing device 1804A and the determined computing device(s) 1808A-1808N. In an example, the computing device 1802 may function as a voice over Internet protocol (VoIP) server or may coordinate with a VoIP server 1814 to establish a VoIP connection between the computing device 1804A and one or more of the determined computing device(s) 1808A-1808N. The user 1806A operating computing device 1804A and the user(s) 1810A-1810N at the determined computing device(s) 1808A-1808N may conduct voice communication via the VoIP connection. Particularly, the users may discuss the request via the VoIP connection. In another example, the computing device 1802 may function as a text messaging server or may coordinate with a text messaging server to establish text communication between the users to communicate about the request. In these examples, the identity of the users to each other may be kept confidential (e.g., telephone numbers are not disclosed among the users).

Figure 21:
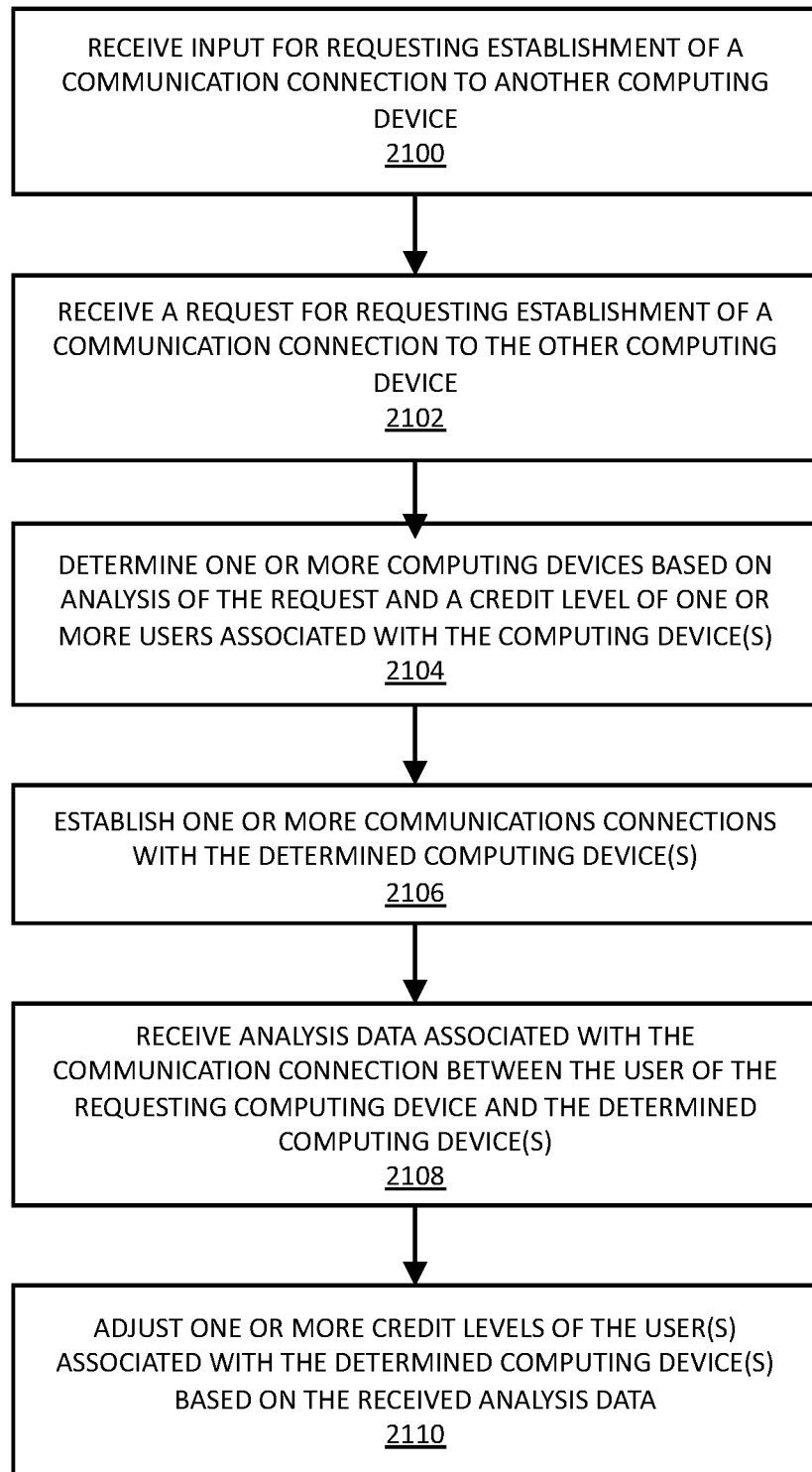
FIG. 21 is a flowchart of an example method for establishing a communication connection between computing devices based a request for information in accordance with embodiments of the present disclosure.

FIG. 21 illustrates a flowchart of an example method for establishing a communication connection between computing devices based a request for information in accordance with embodiments of the present disclosure. The example method is described by example as being implemented by the system 1800 shown in FIG. 18, but it should be understood that the method may be implemented by any other suitable system.

Referring to FIG. 21, the method includes receiving 2100 input for requesting establishment of a communication connection to another computing device. For example, the computing device 1804A may be interacted with to establish a communication connection between the computing device 1804A and one or more other computing devices. For example, the computing device 1804A may be a smartphone, a tablet computer, or the like having an application residing thereon that is configured to display one or more icons that may be selected by the user 1806A to request that a communication connection to another computing device is established to request information from another user. For example, the icon(s) may be associated with a particular category or subject. Upon selection of the icon(s), the computing device 1804A may communicate the request to the computing device 1802 for processing by the information sharing manager 1812. The request may include, for example, identification of the user 1806A and/or computing device 1804A, and identification of the category or subject associated with the selected icon(s). As an example, an application residing on the computing device 1804A may be configured to store identification of one or more categories or subjects, and may present icons representing the category(ies) or subject(s) when the application is running. The user may select, for example, a category or subject, and subsequently the application may control the request to be sent to the computing device 1802 in response to the selection.

The method of FIG. 21 includes receiving 2102 a request for requesting establishment of a communication connection to the other computing device. Continuing the aforementioned example, the computing device 1802 may receive the request from computing device 1804A. The information sharing manager 1812 may receive the request. The computing device 1802 may store the request in memory.

The method of FIG. 21 includes determining 2104 one or more computing devices based on analysis of the request and a credit level of one or more users associated with the computing device(s). Continuing the aforementioned example, the information sharing manager 1812 may determine that the received communication relates to a request for a communication connection. For example, the communication may indicate that it is a request for a communication connection. In another example, the information sharing manager 1812 may deduce that the input is a request for a communication connection based on identification of the user 1806A and/or computing device 1804A, and identification of the category or subject. In accordance with embodiments, the method of claim 20 may include analyzing the information associated with the input to determine the subject associated with the information. The subject may be suitably correlated to a category that is the same or similar in accordance with embodiments of the present disclosure. Based on the credit levels of other users and the subject (which may correlate to a category as disclosed herein), the information sharing manager 1812 may determine one or more other computing devices (e.g., one or more of computing devices 1808A-1808N) to establish a communication connection. For example, the information sharing manager 1812 may initiate a communication connection with one or more computing devices of users associated with the category and who meet a particular credit level.

The method of FIG. 21 includes establishing 2106 one or more communication connections with the determined computing device(s). Continuing the aforementioned example, the computing device 1802 may initiate a VoIP connection between the computing device 1804A and the determined computing device(s) among computing devices 1808A-1808N. For example, the computing device 1802 may operate as a VoIP server and include functionality for using suitable identifiers (e.g., VoIP numbers) of the computing device 1802 and the determined computing devices among computing devices 1808A-1808N to initiate a VoIP connection. In an example, the computing device 1802 may use the VoIP number of the computing device 1804A and the VoIP number of one of the determined computing devices to set up a one-to-one VoIP connection. In another example, the computing device 1802 may use the VoIP number of the computing device 1804A and the VoIP numbers of two or more of the determined computing devices to set up a conference VoIP connection. Alternative to the computing device 1802 operating as a VoIP server, the computing device 1802 may engage with the VoIP server 1814 shown in FIG. 18 to establish the VoIP connection.

In another example of establishing a communication connection, the computing device 1802 may initiate a text-based communication connection between the computing device 1804A and the determined computing device(s) among computing devices 1808A-1808N. For example, the computing device 1802 may operate as a text messaging server and include functionality for using suitable identifiers (e.g., telephone numbers) of the computing device 1802 and the determined computing devices among computing devices 1808A-1808N to initiate a text messaging connection. In an example, the computing device 1802 may use the telephone number of the computing device 1804A and the telephone number of one of the determined computing devices to set up a one-to-one text messaging connection. In another example, the computing device 1802 may use the telephone number of the computing device 1804A and the telephone numbers of two or more of the determined computing devices to set up a conference text messaging connection. Alternative to the computing device 1802 operating as a text messaging server, the computing device 1802 may engage with a text messaging server to establish the text messaging connection.

In accordance with embodiments, the users of the computing devices that are connected via the communication connection may communicate with each other. For example, the user of the requesting computing device (e.g., computing device 1804A) may request information from the user(s) of the determined computing device(s). In response to the request, the user(s) of the determined computing device(s) may respond to the request by providing answers, asking for more details about the request, and the like.

The method of FIG. 21 includes receiving 2108 analysis data associated with the communication connection between the user of the requesting computing device and the determined computing device(s). Continuing the aforementioned example, the information sharing manager 1812 may receive and analyze data associated with the communication connection. Example analysis data includes data indicative of a responsiveness of a user of one or more of the determined computing devices to a communication from a requester. For example, in a VoIP connection responsiveness data may include the total time period from when a call is placed to a responder until the responder answers or replies to the call, an indication whether a responder answers or replies to the call, and the like. In a texting messaging connection for example, responsiveness data may include the total time period from when a text message is sent to a responder until the responder replies to the text, an indication whether a responder answers or replies to the text, and the like. In these examples, the analysis data is indicative of a timeliness of a user to a request for a communication connection.

In accordance with embodiments, analysis data may be indicative of a quality of a user's response with respect to the communication connection. For example, a requester who is part of a communication connection may provide feedback regarding the quality of the responder who is part of the communication connection. As an example, feedback may include a rating (e.g., quality on a scale of 1-10 (1 being poor, and 10 being excellent)). In another example, the information sharing manager 1812 may apply a natural language understanding technique to content (e.g., words and/or phrases) of a communication connection to determine the quality of a communication from a responder.

The method of FIG. 21 includes adjusting 2110 one or more credit levels of the user(s) associated with the determined computing device(s) based on the received analysis data. Continuing the aforementioned example, a credit level of the responder (e.g., user 1810) may be changed or adjusted based on the determined or indicated quality of the responder's communication over the communication connection and/or the analysis data. Further, in accordance with embodiments of the present disclosure, a managed pathway of communication may be managed and may be dynamically changed based on the credit level and the analysis data. Further, in accordance with embodiments of the present disclosure, the information sharing manager 1812 may direct other requests for establishing communication connections for information based on the dynamically changed weighted pathways.

In accordance with embodiments, a user or requester may use a computing device to communicate a request particular to a specified geographic location to one or more other users. The user may enter input into his or her computing device for specifying or selecting the geographic location. As an example, the user may specify the geographic location by selecting the geographic location from a listing presented by the computing device. For example, the user may access an application residing on the computing device, and the application may present a list of geographic locations. The presented geographic locations may be those locations associated with other users that can receive requests associated with those locations. In an example, subsequent to selection of a geographic location, the application may present identification of one or more other users associated with the geographic location. In another example, a user may select the geographic location and also enter a request to communicate. Subsequently, the request may be sent to other users who are associated with the selected geographic location. The other users may be users that also meet a credit level criterion. The communication may be sent to the user(s) associated with the selected geographic location and that meet the credit level criterion along a pathway in accordance with embodiments of the present disclosure. Subsequently, for example, the responding user(s) may reply with information that may be sent to the requester. In another example, the responding user(s) may accept initiation of a communication connection with the requester.

Figure 22:
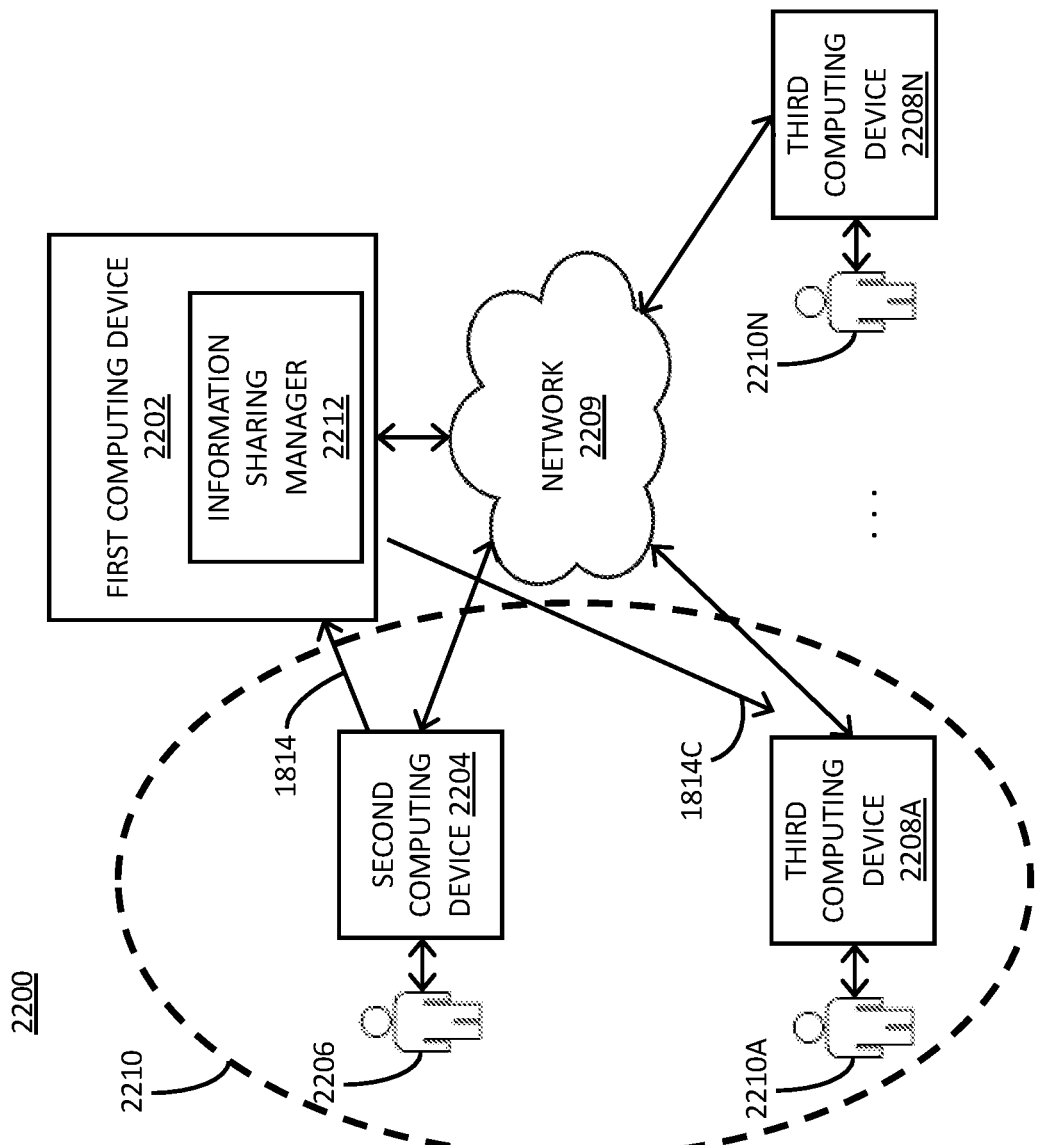
FIG. 22 is a schematic diagram of an example system 2200 within which various components may function in accordance with embodiments of the present disclosure.

As an example of communicating requests particular to a specified geographic location, FIG. 22 illustrates a schematic diagram of an example system 2200 within which various components may function in accordance with embodiments of the present disclosure. Referring to FIG. 22, the system 2200 includes a number of computing devices, such as first computing device 2202, a second computing device 2204 associated with a user 2206A, and multiple third computing devices 2208A-2208N each associated with a different user 2210A-2210N. The computing devices 2202, 2204, and 2208A-2208N may be configured to communicate with each other via one or more communications networks 2209. Although a limited number of computing devices are shown in FIG. 18, it should be understood that there can be any number of computing devices that can communicate with each other via the network(s) 2209. For example, there are 1-N computing devices 2208, and N may be any suitable number of computing devices. Users 2206 and 2210A-2210N may interact with their respective computing device to enter input, such as input described by examples provided herein.

As an example for the embodiments shown and described for FIG. 22, a computing device may be configured to communicate text, images, video, or other data to another computing device as will be understood by those of skill in the art. Also, as will be understood by those of skill in the art, a user may use the user interface of his or her associated computing device for interacting with the computing device. For example, an application may reside on a computing device and the associated user may be able to interact with a user interface presented by the application as will be understood by those of skill in the art.

It is noted that each user shown in FIG. 22 may have specialized expertise, information, and knowledge. As an example, user 2210A may have specialized expertise, information, and knowledge about a particular geographic area defined by the oval shape 2210. It is noted that the geographic area 2210 is shaped as an oval in this example, however this should not be viewed as limiting. Alternatively, the geographic area may be any suitable two-dimensional (2D) or three-dimensional (3D) shape. The shape may be, for example, specified by one or more coordinates (e.g., GPS coordinates). In another example, the shape may be specified by a distance or distances in different directions extending from a point. A computing device, such as computing device 2202, may maintain data in its memory that associates users (e.g., user 2210A-2210N) with geographic areas for routing requests associated with those geographic areas to respective users. In accordance with embodiments, the computing device may communicate a request to a user associated with a specific geographic location if the user meets a predetermined credit level criterion.

It is a function of the system 2200 to facilitate and promote the networking of users 2206 and 2210A-2210N for the sharing and exchange of such information, knowledge, and expertise about a specified geographic location, such as geographic area 2210. More particularly, it is a function of the system 2200 to serve requests for users located within the specific geographic location for other users' information, knowledge, and expertise, and to communicate the requests to other selected users. In addition, it is a function of the system 2200 to promote responses from the other users to requests. Further, the system 2200 can provide for the receipt of others' specialized information, knowledge, and expertise of others in a timely manner while also promoting the others to provide such specialized information, knowledge, and expertise. Details about the implementation of these and other functions may be implemented by the system 2200 are described herein. Also, other example systems and methods for implementing these and other functions are described herein.

The computing devices may be any suitable computing device configured to communicate with the network(s) 2209 and communicate with other computing devices the network(s) 2209. The network(s) 2209 may be a wired network, a wireless network or combination thereof. Example computing devices include, but are not limited to, a smartphone, a desktop computer, a laptop computer, a smart phone, a personal digital assistant (PDA), a tablet computer, a smart television, a television, and the like.

In embodiments, the first computing device 2202 may be a server configured to enable other computing devices 2204 and 2208A-2208N to interact with each other as described herein. Also, it should be understood that the functionality of the first computing device 2202 may be implemented by one or more computing devices, such as multiple servers either distributed or operating together in a server farm. Further, the computing devices 2204 and 2208A-2208N may each include an associated display device such as, a screen for displaying information. A user of a computing device may access a browsing application such as, but not limited to, GOOGLE® Chrome, Internet Explorer, Mozilla Firefox, and so forth on the computing device. In another example, the computing device 2202 may be an application server configured to manage and interact with applications residing on computing devices 2204 and 2208A-2208N.

In an example use, a user 2206 may request information from other computing devices 2202, 2208A-2208N in the network(s) 2209 by using computing device 2204. For example, a user interface of computing device 2204 may be configured to present an interface for user 2206 to enter information for communicating a request to the first computing device 2202 and for specifying a geographic area. In an example, the second computing device 2204 may receive input from the user 2206. The input may specify a geographic area. As an example, the user 2206 may specify the geographic area by indicating or selecting an area within which the user 2206 is located. For example, the user may enter input that specifies an area within a particular distance (e.g., 50 yards) of the user's location. In this example, the computing device 2204 may determine this geographic area based on a GPS location of the computing device 2204 and the area within the particular distance of the GPS location. The computing device 2204 may determine or be assisted by another computing device in determining the coordinate boundary of the geographic area based on the GPS location and specified distance.

In another example of specifying a geographic location, the computing device 2204 may identify one or more geographic areas that are selectable via a user interface. Example geographic areas include, but are not limited to, the geographic area of an athletic complex or park (e.g., athletic field, stadium, and immediately surrounding area such as parking lot and walking areas), the geographic area of a shopping mall or other retail center or building, a restaurant and its immediately surrounding area, a hiking trail, park, recreational area (e.g., lake, river, beach, or the like), a city downtown or other urban gathering area, and the like. These geographic areas may have been previously identified and defined by others. An application residing on the computing device 2204 may, for example, identifying these geographic areas, their names, and general information about these areas. Other users specifying these areas may be one or more of users 2208A-2208N who may desire to be recipients of information requests about the specified geographic areas.

In another example of specifying a geographic location, the computing device 2204 may identify a communications network to which the computing device 2204 may connect. For example, the communications network may be a wireless network (e.g., a WI-FI® network or BLUETOOTH™ network) or a local area network (LAN) to which the computing device 2204 may connect or is connected to. Based on identification of one of these local networks that the computing device 2204 may connect to or is connected to, the computing device 2204 may determine that the computing device 2204 is located within the communications reach of the identified network, thus within a geographic area within reach of the local network.

In embodiments, a local network may be managed by a third party such as, but not limited to, an administrator (e.g., owner) of the grounds or facilities co-located with the local network. The administrator may use a computing device to register the grounds or facilities with a service provider that provides the aforementioned application residing on the computing device 2204. Further, for example, the geographic area associated with the grounds or facilities may be defined and identification of grounds or facilities stored at the computing device 2202. When operating, the application residing on computing device 2204 may determine that the computing device 2204 is within the specified geographic area and present identification of the geographic area and its associated identified grounds or facilities to the user 2206. The user 2206 may interact with the user interface of the computing device 2204 to select the specified geographic area and/or the identified grounds or facilities. This selection may be made in order to send a request to other users associated with the specified geographic area and/or the identified grounds or facilities in accordance with embodiments of the present disclosure.

Continuing the aforementioned examples and embodiments of a user specifying a geographic area, the user's input may also include a request for information. The request may be associated with the geographic area specified by the user. For example, the geographic area may be within an athletic complex such as a baseball, football, or soccer stadium. When operating and authorized by the user, an application residing on the computing device 2204 may determine whether the computing device 2204 is located within the geographic area associated with the athletic complex. In this instance when operating and authorized by the user, a user interface (e.g., display) of the computing device 2204 may be controlled to present identification of the athletic complex and/or its geographic area. The user 2206 may interact with the user interface to select the athletic complex and/or its geographic area. Further, the user 2206 may interact with the user interface to enter a request for information from other users associated with the athletic complex and/or its geographic area, or for a communication connection with other users associated with the athletic complex and/or its geographic area. The request may be communicated to users associated with the athletic complex and/or its geographic area and also who meet a predetermined credit level criterion in accordance with embodiments of the present disclosure. In an example, the athletic complex may be within the geographic area 2210. The user 2210A may meet the requirements of being associated with geographic area 2210 and having a credit level that meets the criterion. In this instance, the request may be communicated to the computing device 2208A of the user 2210A. The computing device 2208A may present the request and the user 2210A may enter a response and/or approve the communication connection in accordance with embodiments of the present disclosure. Example requests in this example scenario of an athletic complex include, but are not limited to, queries about locations of food, drinks, restroom facilities, emergency personnel or facilities, and the like. Other example requests in this scenario of an athletic complex include, but are not limited to, requests for player statistics, game statistics, photos or video of a game play, or other information or content about a game held at the athletic complex.

In another example scenario of a specified geographic area, the geographic area may specify the area of a retail center or building. The user 2210A may meet the requirements of being associated with geographic area of the retail center or building and having a credit level that meets the criterion. In this instance, the request may be communicated to the computing device 2208A of the user 2210A. The computing device 2208A may present the request and the user 2210A may enter a response and/or approve the communication connection in accordance with embodiments of the present disclosure. Example requests in this example scenario of a retail center or building include, but are not limited to, queries about locations of food, drinks, stores, products for sale, review information for stores and products for sale in the stores, restroom facilities, emergency personnel or facilities, and the like.

In another example scenario of a specified geographic area, the geographic area may specify the area of a restaurant. The user 2210A may meet the requirements of being associated with geographic area of the restaurant and having a credit level that meets the criterion. In this instance, the request may be communicated to the computing device 2208A of the user 2210A. The computing device 2208A may present the request and the user 2210A may enter a response and/or approve the communication connection in accordance with embodiments of the present disclosure. Example requests in this example scenario of restaurant include, but are not limited to, queries about locations of seating, restroom facilities, emergency personnel or facilities, and the like.

In another example scenario of a specified geographic area, the geographic area may specify the area of a downtown or other urban center. The user 2210A may meet the requirements of being associated with geographic area of the retail center or building and having a credit level that meets the criterion. In this instance, the request may be communicated to the computing device 2208A of the user 2210A. The computing device 2208A may present the request and the user 2210A may enter a response and/or approve the communication connection in accordance with embodiments of the present disclosure. Example requests in this example scenario of a downtown or other urban center include, but are not limited to, queries about locations of food, drinks, stores, products for sale, restroom facilities, emergency personnel or facilities, and the like.

In accordance with embodiments, a user may be associated with a geographic area in various ways. For example, the user may register as a responder with the service provider that provides the aforementioned application residing on computing device 2204. The user may access a website or the like of the service provider to register and identify as a service provider for a specified geographic area. Subsequently for example, to receive requests associated with the specified geographic area, the user must meet a predetermined credit level criterion and also be associated with the specified geographic area. As an example, the credit level of the user may be adjusted based on his or her responses to requests associated with the geographic area in accordance with embodiments disclosed herein.

Table 3 below shows an example of various users that are each identified and associated with one or more credit levels, achievement levels groups, and geographic areas. This data may be, for example, stored in a suitable database accessible by an information sharing manager 2212 of the computing device 2202 for use in implementing functionality in accordance with embodiments of the present disclosure.

TABLE 3

| User ID | Category Type | Credit Level | Achievement Level Group | Geographic Area |
|---|---|---|---|---|
| User 00001 | Hotel | 900 | Black | Hotel and its grounds |
| User 00002 | Athletic Complex | 800 | Black | Athletic complex and its parking area |
| User 00003 | Retail Center | 500 | Brown | Retail center and its parking area |
| User 00004 | Restaurant | 600 | Brown | Restaurant |
| User 00005 | Urban area | 750 | Black | Streets of a downtown area |

In Table 3 for example, User 00001 has a credit level of 900 in the "Hotel" category. Also, User 00001 is associated with the geographic area of a particular hotel and its grounds as indicated in the table. As an example use case, the information sharing manager 2212 may receive a request for information along with a category type hotel from another user (i.e., the requester) within the geographic area of a particular hotel and its grounds. The requester may specify that the request is for the hotel category and that it is for users above a credit level of 500, for example. The request may be routed to the computing device of User 00001, because this user meets these criteria. An example requester may be for recommendations of restaurants near the hotel. Based on User's 00001 response, the credit level of User 00001 may change in accordance with embodiments of the present disclosure.

Figure 23:
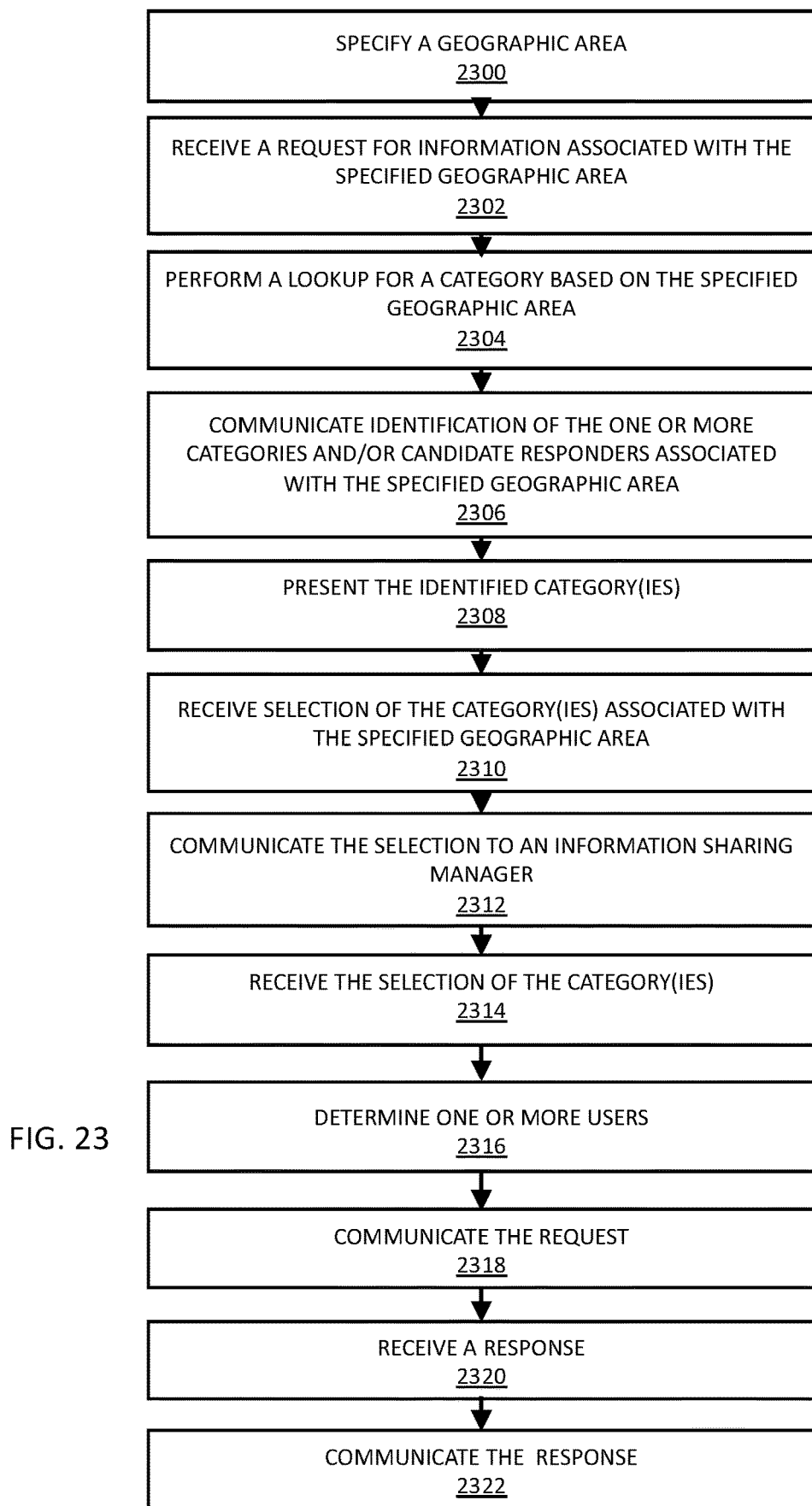
FIG. 23 is a flowchart of an example method for requesting information from computing devices within a specified geographic area in accordance with embodiments of the present disclosure.

FIG. 23 illustrates a flowchart of an example method for requesting information from computing devices within a specified geographic area in accordance with embodiments of the present disclosure. The example method is described by example as being implemented by the system 2200 shown in FIG. 22, but it should be understood that the method may be implemented by any other suitable system.

Referring to FIG. 23, the method includes specifying 2300 a geographic area. For example in FIG. 22, an application may reside on computing device 2204 and may receive input from the user 2206 for specifying the geographic area 2210. In an example, the user 2206 may interact with computing device 2204 to open the application. When opened, the application may determine a coordinate position of computing device 2204 and may communicate the coordinate position to the computing device 2202, which is a server providing support functions for the application. In another example, the user 2206 may interact with the application to specify the geographic area (e.g., within a restaurant, athletic complex, or the like) by selecting or otherwise identifying a name for the geographic area. Subsequently, the computing device 2204 may communicate identification of the specified geographic area to the computing device 2202.

The method of FIG. 23 includes receiving 2302, from a computing device associated with a user, a request for information associated with the specified geographic area. Continuing the aforementioned example, the computing device 2202 may receive the communication from the computing device 2204 that identifies the specified geographic area. The information sharing manager 2212 may receive identification of the specified geographic area.

The method of FIG. 23 includes performing 2304 a lookup for a category based on the specified geographic area. Continuing the aforementioned example, the information sharing manager 2212 of the computing device 2202 may perform a lookup for any categories associated with the specified geographic area. The information sharing manager 2212 may maintain a listing of geographic areas and one or more categories may be associated with each geographic area. For example, the geographic area 2210 may be identified in the listing and associated with one or more categories such as restaurant and/or athletic complex. Further, for example, one or more candidate responders may be associated with each category associated within a listed geographic area. As an example, the User 00004 shown in Table 3 may be associated with the "Restaurant" category for the geographic area of a particular restaurant. In this case, a communication at the computing device 2202 that identified the geographic area of the particular restaurant may be received, and in response the information sharing manager 2212 may perform a lookup to find that the "Restaurant" category is associated with the identified geographic area. Further, the information sharing manager 2212 may find in the lookup that User 00004 is associated with the "Restaurant" category, and that User 00004 has a credit level of 600 for this category. It is noted that multiple categories may be associated with a single geographic area. For example, a retail center geographic area may be associated with both the categories "Retail Center" and "Restaurant".

The method of FIG. 23 includes communicating 2306, to the computing device, identification of one or more categories and/or candidate responders associated with the specified geographic area. Continuing the aforementioned example, the computing device 2202 may communicate to computing device 2204 identification of one or more categories and/or candidate responders associated with the identified geographic area. For example, the communication to the computing device 2204 may indicate that the "Restaurant" category and User 00004 are associated with the identified geographic area.

The method of FIG. 23 includes presenting 2308, at the computing device, the identified category(ies) that are associated with the specified geographic area. Continuing the aforementioned example, in response to receipt of the communication, the computing device 2204 may present identification of the category(ies) and/or candidate responder(s) associated with the identified geographic area. For example, the application residing at the computing device 2204 may control the computing device's 2204 display to display identification of the specified geographic area along with an indication of the category(ies). The indicated category(ies) may be selectable by the user 2206. Therefore, the application enables the user 2206 to specify a geographic area (or it may be otherwise identified as disclosed herein) and subsequently receive identification of one or more categories that have been associated with the specified geographic area. These may be presented to the user for selection for directing a communication request to candidate users associated with the selected category(ies) and associated with the specified geographic area.

The method of FIG. 23 includes receiving 2310 selection of the category(ies) associated with the specified geographic area and communicating 2312 the selection to an information sharing manager. Continuing the aforementioned example, the user 2206 may interact with computing device 2204 to select one or more of the presented category(ies) associated with the previously-specified geographic area. The user 2206 may make the selection in order to have a request for information and/or communication connection made to one or more candidate responders in accordance with embodiments of the present disclosure. These candidate responders may be those responders who are associated with the geographic area (e.g., such as in Table 3), who are associated with the selected category(ies) (e.g., such as in Table 3), and who meet a predetermined credit level criterion as disclosed herein.

The method of FIG. 23 includes receiving 2314, at the information sharing manger, the selection of the category(ies) associated with the specified geographic area. Continuing the aforementioned example, the information sharing manager 2212 receives information about the selected category(ies) associated with the specified geographic area. The method of FIG. 23 include determining 2316 one or more users who are associated with the geographic area, who are associated with the selected category(ies), and who meet a predetermined credit level criterion as disclosed herein. Continuing the aforementioned example, the information sharing manager 2212 may determine one or more users to communicate the request and/or communication connection request to in accordance with embodiments of the present disclosure. For example, the information sharing manager 2212 may determine one or more users who are associated with the geographic area, who are associated with the selected category(ies), and who meet a predetermined credit level criterion as disclosed herein. In the example of Table 3, the User 00004 may meet these qualifications, and the information sharing manager 2212 may determine that User 00004 meets these qualifications based on geographic area 2210 being specified, the category "Restaurant" being selected, and User 00004 exceeding a predetermined credit level (e.g., the User's 00004 credit level being above the predetermined credit level of 500 in the "Restaurant" category). Other candidate users may also meet these qualifications.

The method of FIG. 23 includes communicating 2318 the request to one or more computing devices of the determined user(s). Continuing the aforementioned example, the User 00004 may be at computing device 2208A, and the computing device 2202 may send the request to the computing device 2208A, because it is associated with User 00004. The computing device 2208A may present the request in accordance with embodiments of the present disclosure. Further, the user 2210A (e.g., the user associated with identifier User 00004) may interact with the computing device 2208A to accept or decline the request.

The method of FIG. 23 includes receiving 2320 a response corresponding to the request for information from the determined computing device(s) and communicating 2322 the response to the computing device of the requester. Continuing the aforementioned example, the requester at computing device 2324 may receive the response. Further, the method of FIG. 23 includes presenting 2326 the response to the respective user. The results may be suitably presented on the user's computing device via, for example, a search engine interface or a social media interface. Further, for example, the user may input a review that can change the credit level of the responder(s) in accordance with embodiments of the present disclosure. In accordance with embodiments disclosed herein, the information sharing manager 1812 may manage one or more pathways for requesting information from the computing device(s) 2208A-2208N based on credit levels of users associated with the computing device(s) 2208A-2208N, and dynamically change the pathway(s) based on a change to the credit level(s) of the user(s) 2210A-2210N. In accordance with embodiments, a communication connection between the computing device 2204 of the requester (i.e., user 2206) and the computing device 2208A of the user 2210A (User 00004 in Table 3) may be established in response to acceptance of the request by the user 2210A.

In example use case, a user may be using an application on his or her device while within a clothing store. The application may be operable with a remote server. In this example, the user may be user 2206, the application may reside on computing device 2204, and the server may be the computing device 2202 shown in FIG. 22. The information sharing manager 2012 may store in its memory the coordinates of the clothing store such that the geographic area of the clothing store is defined or specified by the coordinates. The computing device 2204 and its user 2206 may be within the geographic area of the clothing store. The application on the computing device 2204 may operate to recognize that the computing device 2204 is within the geographic area of the clothing store. For example, the computing device 2202 may communicate to the computing device 2204 the coordinates or other indicator of the geographic area of the clothing store, and the application on the computing device 2204 may determine that the computing device 2204 is within the geographic area of the clothing store based on the communicated coordinates. In another example, the computing device 2204 may communicate its location to the computing device 2202, and the information sharing manager 2212 may determine that the computing device 2204 is within the geographic area of the clothing store based on the communicated location information. Subsequently after determining at either the computing device 2202 or 2204 that computing device 2204 is within the geographic area of the clothing store, the second computing device 2204 may be presented with information about one or more categories associated with the geographic area of the clothing store. For example, the application on computing device 2204 may display the one or more categories associated with the geographic area. The categories may be display responsive to the computing device 2204 being in the geographic area. In an example, the categories may only be displayed in response to the computing device 2204 being located within the specified geographic area. In accordance with embodiments, the application may prevent display of categories associated with geographic areas where the computing device 2204 is not located. These actions can address privacy concerns. In addition, the identity of the user may be prevented from being communicated to the computing device 2202. Example categories for the clothing store include, but are not limited to, "Clothes Purchasing Assistance" and "Nearby Activities". Continuing the example, the user 2206 may interact with the computing device 2204 to select a displayed category associated with the geographic area. In response to the selection of the category, the computing device 2204 may communicate to the computing device 2202 indication (or request including the indication) of the selected category and that the computing device 2204 is within the geographic area of the clothing store. In response to receipt of the indication at the computing device 2202, the information sharing manager 2212 may determine one or more candidate responders for responding to the indication or request from the computing device 2204 in accordance with embodiments of the present disclosure. Such candidate responders may be responders meeting a predetermined credit level criterion. A candidate responder's computing device may receive the request and reply by sending information or initiating an anonymous communication connection with the computing device 2204 (e.g., a VoIP call in which neither of the computing devices nor the users are identified; a text messaging session in which neither of the computing devices nor the users are identified; or the like). By responding or not responding, a candidate responder may increase or decrease his or her credit level for responding to requests associated with the particular category associated with the particular geographic area. By improving his or her credit level, a responder may increase his or her likelihood of receiving later requests for responding to requests associated with the particular category associated with the particular geographic area. By decreasing his or her credit level, a responder may reduce or eliminate his or her likelihood of receiving later requests for responding to requests associated with the particular category associated with the particular geographic area. Further, due to adjustments in credit levels, pathways to candidate responders for requests may be dynamically changed in accordance with embodiments of the present disclosure. In this example in the case of the "Clothing Purchasing Assistance" category being selected, a responder may provide information about purchasing considerations in the clothing store (e.g., fashion ideas, sales information, product information, and the like). In another example in the case of the "Nearby Activities" category being selected, a responder may provide information about nearby activities such as nearby restaurants, nearby theatres, walking or hiking trails, and the like.

In another example use case, a user may be using an application on his or her device while touring a city. In this example, the user may be located within a city. The user's computing device may send to the server information indicating that the user's computing device is within the geographic area of the city and identify the category "Tourism Information" in order to request information about touring the city. Candidate responders may include responders associated with the category, geographic area, and that have a credit level meeting a criterion. A responder receiving the request may respond with the requested information and/or initiate a communication connection with the requester in accordance with embodiments of the present disclosure.

In accordance with embodiments, a user, such as user 2206 shown in FIG. 22, may interact with his or her computing device, such as computing device 2204, to enter information for identifying his or her geographic area. For example, an application on the computing device 2204 may display a map of a geographic area surrounding the computing device 2204. The user 2206 may suitably interact with the computing device 2204 and the display map particularly to specify a geographic area. For example, the user 2206 may be a passenger in an automobile or bus that is stopped or delayed in traffic. The user 2206 may be seeking to request information about the cause of the stopped or delayed traffic, or to report the traffic stoppage or delay. Subsequently, the user 2206 may interact with the computing device's 2204 application to communicate identification of the specified geographic area and a subject "Traffic" to indicate the user's intention to request information about the identified subject with regard to the specified geographic area. The computing device 2202 may receive the request and the information sharing manager 2212 may communicate a request to candidate responder to request information and/or a communication connection. Candidate responders may include responders meeting a predetermined credit level with regard to a geographic area that is the same, nearby (e.g., same county, nearby county, same state, with a predetermined distance, or the like), or overlapping with the geographic area specified by user 2206. In another example, candidate responders may include responders meeting a credit level with regard to the identified category or similar to the identified category.

In accordance with embodiments, requesters may provide credits as an offer for candidate responders to respond to their requests for information and/or communication connections. For example, a responder may enter manually or have automatically associated with requests a credit offering for a responder to respond to a received request. This offer may make it more likely for the responder to respond is he or she knows that he or she will receive a credit amount in return for a response. In one example, the requester may specify the exact credit amount. In another example, the requester may subscribe to a service that handles the provision of credits to responders in exchange with subscription terms with the requester.

In accordance with embodiments, an initial requester may communicate an initial request in accordance with examples disclosed herein for communicating a request. Subsequently, a first responder may receive the request and provide information for responding to the request. The information may information responsive to the request and/or a request for additional information such as more details to the request from the initial requester (e.g., it may be more specificity). Subsequently, the initial request and additional information from the first responder may be formed into another request. This other request may be communicated to candidate responders in accordance with examples and embodiments disclosed herein. These other candidate responders may respond and the response sent to the initial requester and/or the first responder in accordance with embodiments.

In accordance with embodiments, a request may be received and queued to communicate to responders who later qualify for receiving the request. These responders may not yet be registered to receive the request or they may later improve their credit level such that they meet the requirements for receiving the request. Further, for example, the request may stay with the potential responder for response at a later time and for continued response as more information about the request become available. For example, someone may send a request to know if a particular model of car is now available at a car dealership. In another example, someone may ask if there is a long wait at his/her favorite restaurant for lunch. The request may be queued up and answered later by a responder. There may be multiple responders. In another example, someone may send a request for entertainment news (e.g., news about his/her most anticipated upcoming movie, or a particular entertainer (e.g., singer, actor, director, etc.). Others may join in the request as described elsewhere in this application.

In accordance with embodiments, a user may interact with a computing device to specify a geographic area as described by examples provided herein. The computing device may be, for example, the computing device 2202 shown in FIG. 22. The user may be the owner or an administrator of the geographic area, such as a restaurant, shopping area, or the like. The user may interact with the computing device to set up an account, register the geographic area with the computing device 2202, and set restrictions and/or requirements for other users to find and utilize data and features associated with the geographic area. For example, the other users may be required to register, to be an associate, or customer of the owner or administrator. Subsequently, the users may use his or her computing device to recognize the geographic area and to select a category to send a request in accordance with embodiments of the present disclosure. For example, the owner or administrator may employee, contract with, or otherwise permit users to be candidate responders to respond to requests that specify the geographic area. In embodiments, a requester may be required to purchase permission to find the geographic area and to utilize the data and features associated with the geographic area.

In accordance with embodiments, weighted pathways of requests identifying a specified geographic area may be managed based on credit levels of users who have been permitted to access the data and features associated with the geographic area. For example, users with higher credit levels may be given priority of communicating their requests over users with lower credit levels. In an example, a requester having a high credit level may have his or her request sent to a responder with a high credit level, rather than a low credit level. These pathways can adjust dynamically based on adjustments of credit levels of the requesters and responders.

In accordance with embodiments, weighted pathways may dynamically change based on whether a requester or responder is located inside or outside the specified geographic area. A credit level of a requester or responder inside the specified geographic area may be weighted higher in the case that he or she is inside the specified geographic area.

In accordance with embodiments, requests and communications associated with a specified geographic area may be opened only during a specified time period. For example, the requests and communications may only be enabled while a particular event (e.g., sporting event) is occurring at the specified geographic area. Subsequent to the specified time period, all or some requests or communications associated with the geographic area during the specified time period may be prevented or otherwise controlled. In an example, during the event requests or communications may be limited to requesters and/or responders located within the geographic area. Further, for example, subsequent to the event, requests or communications may be permitted for requesters and/or responders located both within and outside the geographic area. In this way, by changing request, response, and communication capabilities based on a geographic area, pathways can be dynamically controlled. Further for example, a credit level of a requester and/or responder with respect to the geographic area may be increased or decreased based on a location of the requester and/or responder with respect to the geographic area. For example, a responders credit level with respect to requests about the geographic area may be increased based on a time that the requesters was within the geographic area during the specified time period. For example, the longer the requester was within the geographic area, the higher his or her credit level may be increased, and conversely the requester may have this credit level lower if he or she was only within the geographic area for some of the specified time period. A computing device of a responder may provide location information so that the computing device (e.g., computing device 2202) may maintain a record of how much time the computing device of the responder was within the specified geographic area. For privacy concerns, the record may be limited to only the time the responder was in the specified geographic area and only maintained upon appropriate permissions of the responder. Example use cases include, but are not limited to, a responder being a sports event attendee, volunteer, or other participant at the sports event, and the responder may provide commentary, player statistics, weather forecast information, traffic information, photos/videos, and the like to requesters to enhance the requester's enjoyment of the sports event.

In another example use case, a responder may operate as a concierge while a requester is visiting a city or other tourist destination. A requester may interact with the responder in accordance with embodiments of the present disclosure to plan a trip and to receive information and/or communications from the responder during the trip. The responder may provide the requester with information to enhance the requester's enjoyment of the trip such as by provide suggestions and information about weather forecast information, traffic information, activities, dining, and the like.

In accordance with embodiments, a computing device of a requester may present to the requester a map indicating one or more specified geographic areas in relation to a current position of the requester. For example, a display of the computing device may be controlled to display specified geographic area(s) along with an indicator of the current position of the computing device to indicate the assumed position of the requester carrying the computing device. As the requester moves, the indicated position of the requester may be updated accordingly. Further, in accordance with embodiments, the display may indicate categories and/or candidate responders associated with the presented geographic area(s). For example, the indicated geographic areas may be suitably labeled with text or other indicators of associated categories and/or candidate responders. In an example, a requester may interact with a presented geographic area, and the user interface may present the associated categories and/or candidate responders in response thereto. Subsequently, the user may select one or more of the presented categories and candidate responders to communicate a requester to the associated responder in accordance with embodiments of the present disclosure. In response to the selection, a request may be communicated to the requester in accordance with embodiments of the present disclosure.

In accordance with embodiments, a request to a candidate responder who is determined to the receive the request may be communicated to the candidate responder based on upon a managed dynamic pathway. For example, a candidate responder may be currently unavailable when a request is received at a server such as computing device 2202. In another example, a candidate responder may have multiple different pathways for receiving a request (e.g., via phone call, email, text, etc.). Such conditions for the availability of the candidate requester may be stored in memory by the information sharing manager 2212. In response to receipt of a request, the information sharing manager 2212 may determine that the responder is a candidate to receive the request. Subsequently, the information sharing manager 2212 may check the condition for the candidate requester to receive the request. In an example of the candidate responder being currently unavailable, the request may either be held the computing device 2202 until receipt of notification that the candidate responder is available. Once available, the request may be communicated to the candidate responder. In another example of the candidate responder being currently unavailable, the computing device 2202 may send the request to a different responder who is a candidate for the request. Subsequently, one or both candidate responders may respond, and one or both responses may be communicated to the requester. In this way, communication pathways to the responder may change in response to a current status of the availability of the responder.

In an example of a candidate responder having multiple different ways for receiving a request, the information sharing manager 2212 may receive a request and determine that the responder is a candidate for responding to the request. Subsequently, the information sharing manager 2212 may determine that there are multiple different ways (e.g., via phone call, email, text, etc.) identified in memory for communicating the request to the candidate responder. Further, the memory may indicate different criterion for communicating the request via one or more of the different ways for communicating to the candidate responder. For example, the criterion may indicate an ordering of sending communications to the candidate requester via the different ways for communicating with the requester. In an example, the criterion may indicate that the request may be communicated to the requester via phone call, email, and text. Further, in this example, the criterion may indicate that the request is to be sent by email and text initially, followed by a phone call with the request a predetermined time period later. In another example, the criterion may indicate that the request is to be sent by two (2) phone calls. In this example, the criterion specifies that the request is sent by phone call to one phone number initially, and subsequently followed up by a phone call to the second phone number in response to the first phone call request not being replied to within a predetermined time period. The responder may update this information. Further, for example, the responder may interact with the information sharing manager to set timings of availability and priority of the different ways of communicating to the responder. In this way, communication pathways to the responder may change in response to a current status of the ways of communicating with the responder.

In accordance with embodiments, pathways for communicating requests may be changed depending on a credit level of a requester and/or a credit offering provided by a requester. For example, a requester may indicate in the request and/or the information sharing manager 2212 may store in memory a credit level associated with the requester and/or a credit offering to responders for responding to requests. In an example, a credit level may be associated with a requester. In this example, the credit level may be an indicator of reviews of the responders about credit payment of the requester to the responder, credits available by the requester to send to the responder in exchange for a response, the like, and combinations thereof. Further for example, the requester may indicate in a request sent to the computing device 2202 a credit offering for a requester to respond to the request. The credit level of a requester and/or a credit offering provided by the requester may be communicated to the candidate responder. This information may assist the candidate responder with making a decision about replying to the request. In addition, for example, the responder may interact with the information sharing manager 2212 to set criteria for sending requests to the responder. In accordance with embodiments, a candidate responder may be determined based on a received request at the information sharing manager 2212. Subsequently, the information sharing manager 2212 may determine whether the candidate requester has set criteria for sending requests to the responder (e.g., minimum requirements of credit level of a requester and/or a credit offering provided by the requester). In response to the information sharing manager 2212 determining that the criteria is not met, the request from the requester may be prevented from being communicated to the candidate responder. In addition for example, in response to the information sharing manager 2212 determining that the criteria is not met, the request from the requester may be communicated to another candidate responder. The other candidate responder may not have met initial qualifications for sending the request, but may be an alternate if the requester does not meet the criteria of the first candidate responder.

In accordance with embodiments, a responder may be associated with no categories, one category, and multiple categories. These categories may be associated with the responder in accordance with embodiments disclosed herein. The responder may be associated with additional categories by different processes disclosed herein to thereby dynamically change a pathway for communication of requests. For example, the responder may request that an additional category be added by specifying the category to the information sharing manager 2212. Initially, in this example, the added category may be associated with a credit level of 0 or other low category level, because the responder is beginning to receive requests in the added category.

In another example, a requester may send a request to the information sharing manager 2212 to associate the category with the responder. The information sharing manager 2212 may determine whether to add the category to the responder in response to the request from the requester. In an example, the information sharing manager 2212 may be add the category if a criteria is met. For example, the criteria may be met based on a history of interaction between one or more requesters and the responder. For example, in response to high reviews by one or more requesters, the category may be added to the responder in response to a request. Another criteria may be met only if the category is in a category related to one that the responder is already associated with. For example, a geographic area may be approved if the responder has satisfactorily responded to requests from one or more adjacent or nearby geographic areas. In another example, a subject may be approved if the responder has satisfactorily responded to requests from one or more similar subjects (e.g., requests about a word processing application may be considered to be similar to requests about a spreadsheet application). In these ways, communication pathways to the responder may change in response to responders being associated with added categories.

In accordance with embodiments, the information sharing manager 2212 may suggest categories to a responder that are similar to current categories of a responder. The information sharing manager 2212 may suggest categories in response to the responder being at a credit level equal or greater than a predetermined credit level. The responder may select whether or not to accept the suggestion.

In accordance with embodiments, a responder may interact with the information sharing manager 2212 to generate a template or guide for a requester to enter or complete their request in response to a category being selected by a requester. For example, a requester may select the category "Restaurants" and a template may have been created by a responder to query the requester to enter responses to the following questions: "What type of cuisine(s) do you prefer?" and "What price range for your meal?". The information sharing manager 2212 may send the template to the requester's computing device in response to receiving the selection of the category. Subsequently, the requester may interact with his or her computing device to enter responses to the template's questions. Subsequently, the requester's computing device may send the responses to the information sharing manager 2212, which may subsequently send the request including the responses to the template's questions to the responder. In this way, the responder may be presented with a directed request for information that may make generation of a responder more efficient.

In accordance with embodiments, a computing device may be configured to present to a user one or more categories in response to selection of an image displayed on the computing device. For example, a computing device may be a smartphone, and the user may interact with the computing device to capture a snapshot of the currently displayed screen. In response to the capture of the snapshot, the computing device may present (e.g., display) a user interface for selecting one or more categories for sending to one or more candidate responders in accordance with embodiments of the present disclosure. The computing device may send a request to the computing device of the information sharing manager 2212, and the request may include the snapshot of the displayed screen and also the selected category. This may provide a context for the responder to respond to the request. For example, the snapshot may include a particular leaf, the selected category may be under a science category, and the text (entered by the user) may be "What type of tree?". In this way, a requester may have an efficient way to place a context for the question. In another example, an application may have an error or bug, and the snapshot may show a result of it. In this example, the request may include the snapshot of it along with the text "How do I fix this bug?".

The various techniques described herein may be implemented with hardware or software or, where appropriate, with a combination of both. For example, the second computing device 106 shown in FIG. 1 may include suitable hardware, software, or combinations thereof configured to implement the various techniques described herein. The methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed subject matter. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed subject matter. When implemented on a general-purpose processor, the program code combines with the processor to provide a unique apparatus that operates to perform the processing of the presently disclosed subject matter.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. A method for sharing of information among a plurality of computing devices in a network, the method comprising:
at a first computing device of the plurality of computing devices:
determining ranking among the plurality of computing devices, wherein at least one among the plurality of computing devices is ranked higher than others among the plurality of computing devices based on response credentials for the plurality of computing devices, wherein the response credentials are based on responses of the at least one among the plurality of computing devices and the others to previous requests for information;
receiving, from a second computing device, a request for information;
determining a weighted pathway to the at least one among the plurality of computing devices based on the ranking of the at least one among the plurality of computing devices being higher than the others among the plurality of computing device;
communicating, to the at least one among the plurality of computing devices, the request for information via the weighted pathway;
receiving, from the at least one among the plurality of computing devices, identification information of a third computing device for communication of the request for information;
establishing a communication pathway between the second computing device and the third computing device;
communicating, to the third computing device via the communication pathway, the request for information;
receiving a response along with content from the third computing device;
communicating the response to the second computing device;
receiving a rating for the response from the second computing device; and
adjusting a response credential of the at least one among the plurality of computing devices based on the rating received from the second computing device.

2. The method of claim 1, further comprising determining the at least one among the plurality of computing devices based on at least one of a geographic location of the second computing device, a time when the request for information is received, and an availability of a user of the second computing device.

3. The method of claim 1,
wherein the request is indicative of a specified geographic area, and
wherein determining ranking among the plurality of computing devices comprises determining an association of the computing devices to the specified geographic area.

4. The method of claim 3, further comprising determining the specified geographic area.

5. The method of claim 4, wherein determining the specified geographic area comprises determining an area within a predetermined distance of the second computing device, the specified geographic area being the area within the predetermined distance of the second computing device.

6. The method of claim 4, further comprising communicating, to the second computing device, an indication of a category associated with the specified geographic area, and
wherein the request for information is associated with the category.

7. The method of claim 6, wherein determining the weighted pathway comprises determining the weighted pathway based on the category.

8. The method of claim 1, further comprising at the first computing device:
receiving indication that the second computing device is located within the specified geographic area; and
communicating, to the second computing device, identification of one or more categories associated with the specified geographic area, and
wherein receiving a request for information comprises receiving identification of the one or more categories.

9. The method of claim 8, wherein determining the weighted pathway is implemented in response to receiving identification of the one or more categories.

10. The method of claim 8, further comprising at the first computing device communicating, to the second computing, information provided by the at least one computing device, wherein the provided information is associated with the specified geographic area.

11. The method of claim 10, further comprising at the first computing device determining presence of the at least one among the plurality of computing devices within the specified geographic area about when the information was provided by the at least one computing device.

12. The method of claim 3, further comprising at the first computing device:
receiving, from the second computing device, an indication of a category to associate with the request for information; and
communicating the identification of the category to the at least one among the plurality of computing devices.

13. The method of claim 12, further comprising:
receiving, from a fourth computing device, a request for information associated with the specific geographic area;
determining that the request for information from the fourth computing device is the same or similar to the request for information from the second computing device; and
in response to determining that the request for information from the fourth computing device is the same or similar, communicating the response to the fourth computing device.

14. The method of claim 3, further comprising managing other weighted pathways for requesting establishment of a communication connection for information from other computing devices to the at least one among the plurality of computing devices, and wherein the managed weighted pathways are based on the one or more user credit levels of the at least one among the plurality of computing devices.

15. The method of claim 14, wherein the managed weighted pathways are based on the received analysis data.

16. The method of claim 14, further comprising dynamically changing the weighted pathway based on the response credential of the at least one computing device.

17. The method of claim 16, further comprising directing other requests for establishing communication connections for information based on the dynamically changed weighted pathway.

18. The method of claim 3, further comprising presenting, at the second computing device, a map that indicates the specified geographic area and a position of the second computing device with respect to the geographic area.

19. A system for sharing of information among a plurality of computing devices in a network, the system comprising:
a first computing device configured to:
determine ranking among the plurality of computing devices, wherein at least one among the plurality of computing devices is ranked higher than others among the plurality of computing devices based on response credentials for the plurality of computing devices, wherein the response credentials are based on responses of the at least one among the plurality of computing devices and the others to previous requests for information;
receive, from a second computing device, a request for information;
determine a weighted pathway to the at least one among the plurality of computing devices based on the ranking of the at least one among the plurality of computing devices being higher than the others among the plurality of computing device;
communicate, to the at least one among the plurality of computing devices, the request for information via the weighted pathway;
receive, from the at least one among the plurality of computing devices, identification information of a third computing device for communication of the request for information;
establish a communication pathway between the second computing device and the third computing device;
communicate, to the third computing device via the communication pathway, the request for information;
receive a response along with content from the third computing device;
communicate the response to the second computing device;
receive a rating for the response from the second computing device; and
adjusting a response credential of the at least one among the plurality of computing devices based on the rating received from the second computing device.

* * * * *